US009900198B2

(12) United States Patent
Nam et al.

(10) Patent No.: US 9,900,198 B2
(45) Date of Patent: Feb. 20, 2018

(54) CHANNEL-STATE-INFORMATION REFERENCE SIGNALS FOR ADVANCED WIRELESS SYSTEMS

(71) Applicant: Samsung Electronics Co., Ltd, Suwon-si (KR)

(72) Inventors: Young-Han Nam, Mountain View, CA (US); Jianzhong Zhang, Mountian View, CA (US); Eko Onggosanusi, Mountain View, CA (US); Taeyoung Kim, Mountain View, CA (US); Hoondong Noh, Mountain View, CA (US); Yang Li, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 14/997,356

(22) Filed: Jan. 15, 2016

(65) Prior Publication Data
US 2016/0248562 A1    Aug. 25, 2016

Related U.S. Application Data

(60) Provisional application No. 62/118,955, filed on Feb. 20, 2015, provisional application No. 62/121,274,
(Continued)

(51) Int. Cl.
*H04W 4/00*   (2009.01)
*H04L 27/26*  (2006.01)
*H04L 5/00*   (2006.01)

(52) U.S. Cl.
CPC ........ *H04L 27/2601* (2013.01); *H04L 5/0051* (2013.01); *H04L 5/0023* (2013.01)

(58) Field of Classification Search
CPC ....................................................... H04W 4/00
See application file for complete search history.

(56) References Cited

U.S. PATENT DOCUMENTS

| | | |
|---|---|---|
| 2011/0176634 A1 | 7/2011 | Yoon et al. |
| 2012/0014477 A1 | 1/2012 | Ko et al. |

(Continued)

FOREIGN PATENT DOCUMENTS

| | | |
|---|---|---|
| WO | 2014051374 A1 | 4/2014 |

OTHER PUBLICATIONS

Evolved Universal Terrestrial Radio Access (E-UTRA); Multiplexing and channel coding (Release 12); 3GPP TS 36.212 V12.2.0—Oct. 2014—91 pages.
(Continued)

*Primary Examiner* — Dang Ton

(57) ABSTRACT

A mobile station includes a receiver configured to receive containing a complex-valued modulation symbol from a base station, a processor configured to extract the complex-valued modulation symbol from the signal, wherein in response to being configured with code-division multiplex-4 (CDM-4), the complex-valued modulation symbol is mapped using a reference signal sequence. A base station includes a processor configured to generate a reference signal sequence for each subcarrier and OFDM symbol, and in response to being configured with code-division multiplex-4 (CDM-4), map a reference signal sequence to the complex-valued modulation symbols. Other embodiments including a method for performing communication on multiple input multiple output (MIMO) radio links are also disclosed.

16 Claims, 25 Drawing Sheets

Related U.S. Application Data filed on Feb. 26, 2015, provisional application No. 62/135,570, filed on Mar. 19, 2015, provisional application No. 62/187,563, filed on Jul. 1, 2015, provisional application No. 62/202,675, filed on Aug. 7, 2015, provisional application No. 62/203,718, filed on Aug. 11, 2015, provisional application No. 62/206,039, filed on Aug. 17, 2015, provisional application No. 62/216,546, filed on Sep. 10, 2015, provisional application No. 62/232,214, filed on Sep. 24, 2015, provisional application No. 62/240,254, filed on Oct. 12, 2015, provisional application No. 62/250,696, filed on Nov. 4, 2015, provisional application No. 62/256,222, filed on Nov. 17, 2015.

(56) References Cited

U.S. PATENT DOCUMENTS

2012/0224555 A1 9/2012 Lee et al.
2014/0098689 A1 4/2014 Lee et al.
2017/0099658 A1* 4/2017 Shattil ............... H04W 72/048

OTHER PUBLICATIONS

Evolved Universal Terrestrial Radio Access (E-UTRA); Physical layer procedures; (Release 11); 3GPP TS 36.213 V11.2.0;—Apr. 2013—175 Pages.

Evolved Universal Terrestrial Radio Access (E-UTRA); Physical channels and modulation (Release 11);3GPP TS 36.211 V11.1.0—Feb. 2013—109 Pages.

International Search Report dated Jul. 22, 2016 in connection with International Application No. PCT/KR2016/001711, 4 pages.

Written Opinion of the International Searching Authority dated Jul. 22, 2016 in connection with International Application No. PCT/KR2016/001711, 8 pages.

* cited by examiner

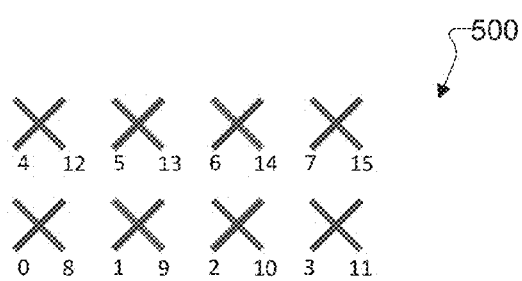
FIG. 5A 6 PORT Config A
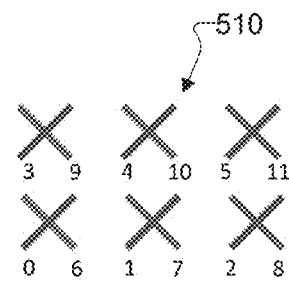
FIG. 5C 12 PORT Config A
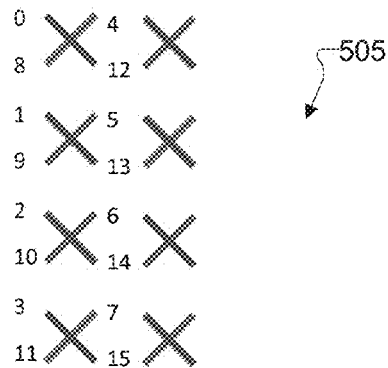
FIG. 5B 16 PORT Config B
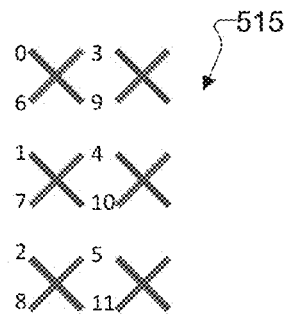
FIG. 5D 12 PORT Config B

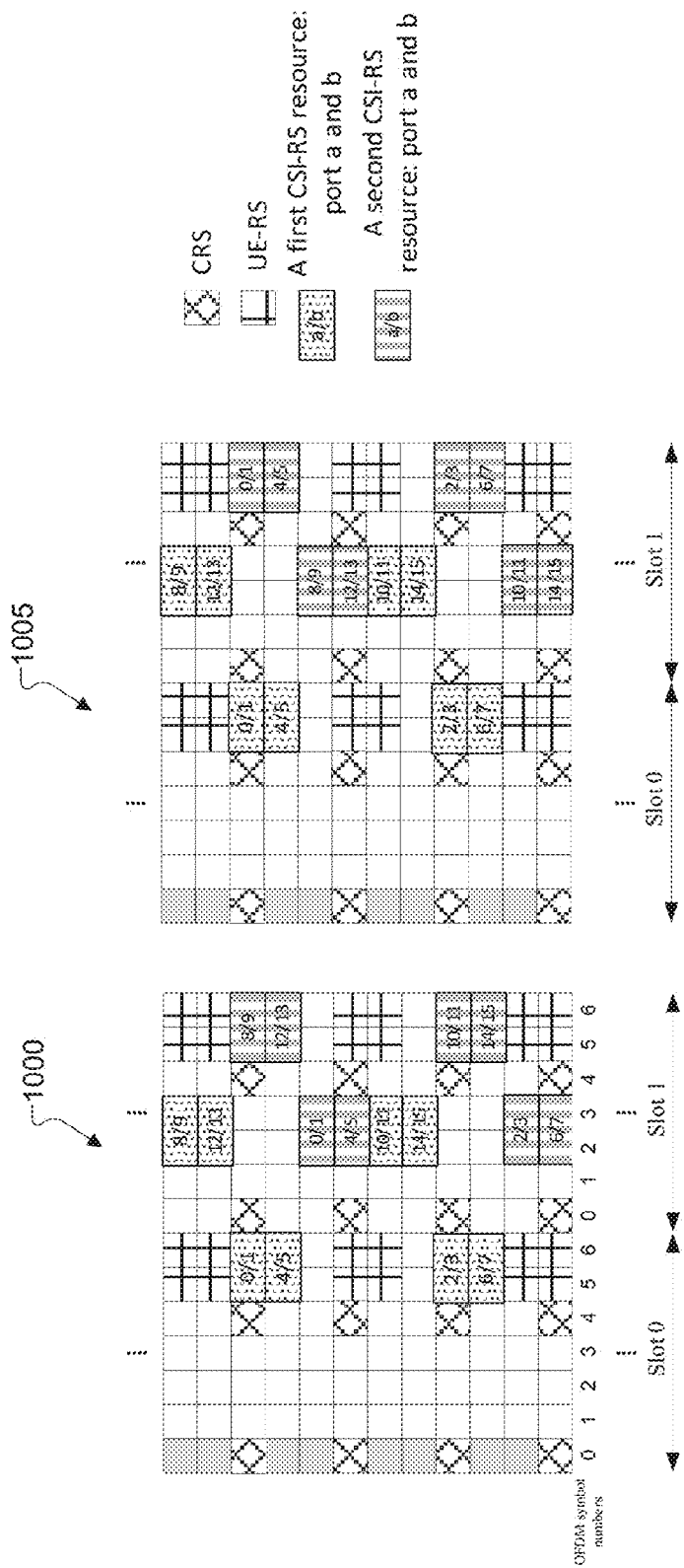
FIG. 10A An alternative 16-port CSI-RS mapping   FIG. 10B An alternative 16-port CSI-RS mapping

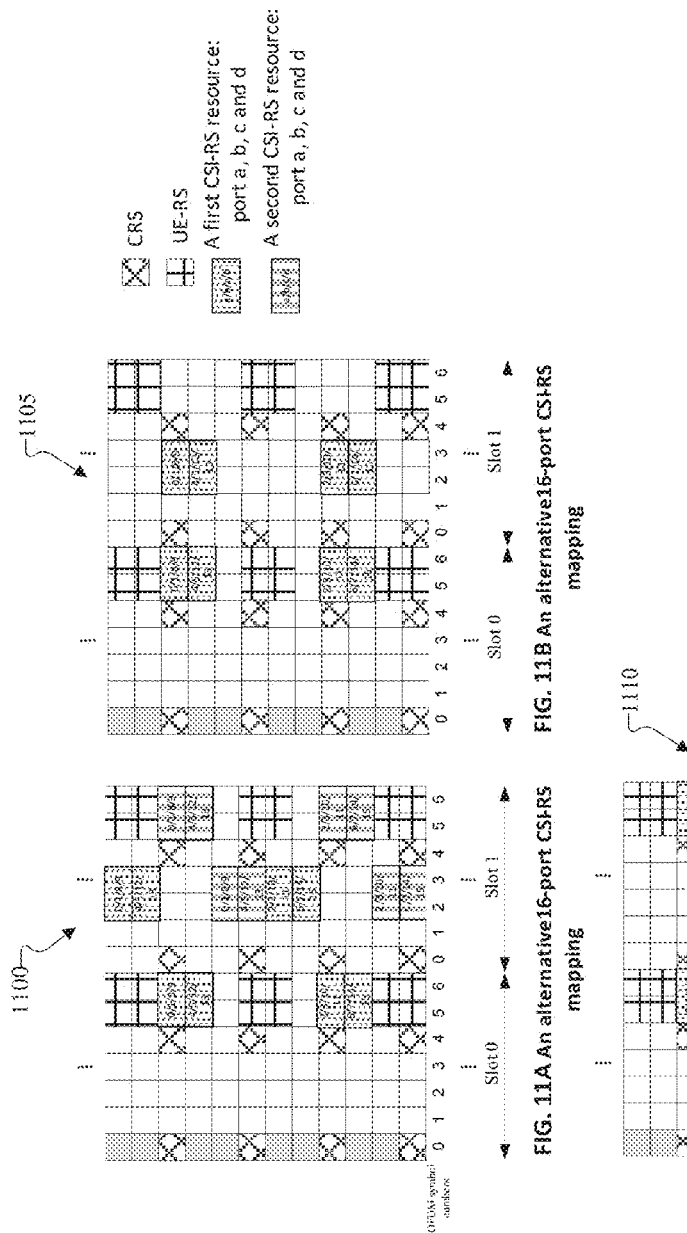
FIG. 11A An alternative 16-port CSI-RS mapping
FIG. 11B An alternative 16-port CSI-RS mapping
FIG. 11C An alternative 16-port CSI-RS mapping (a) An alternative 10-port CSI-RS mapping

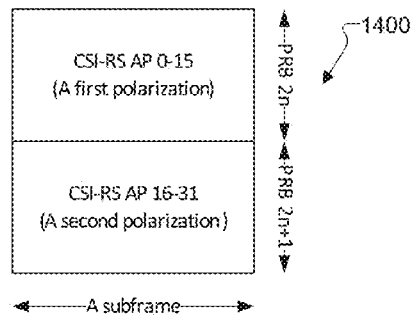
FIG. 14A An alternative 32-port CSI-RS mapping
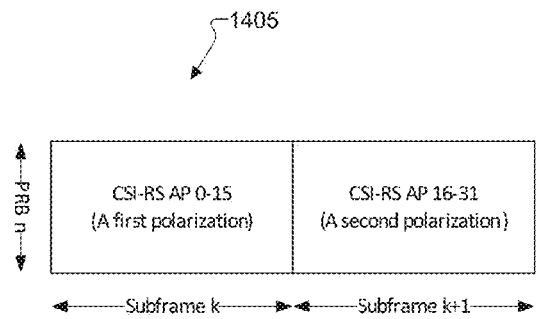
FIG. 14B An alternative 32-port CSI-RS mapping
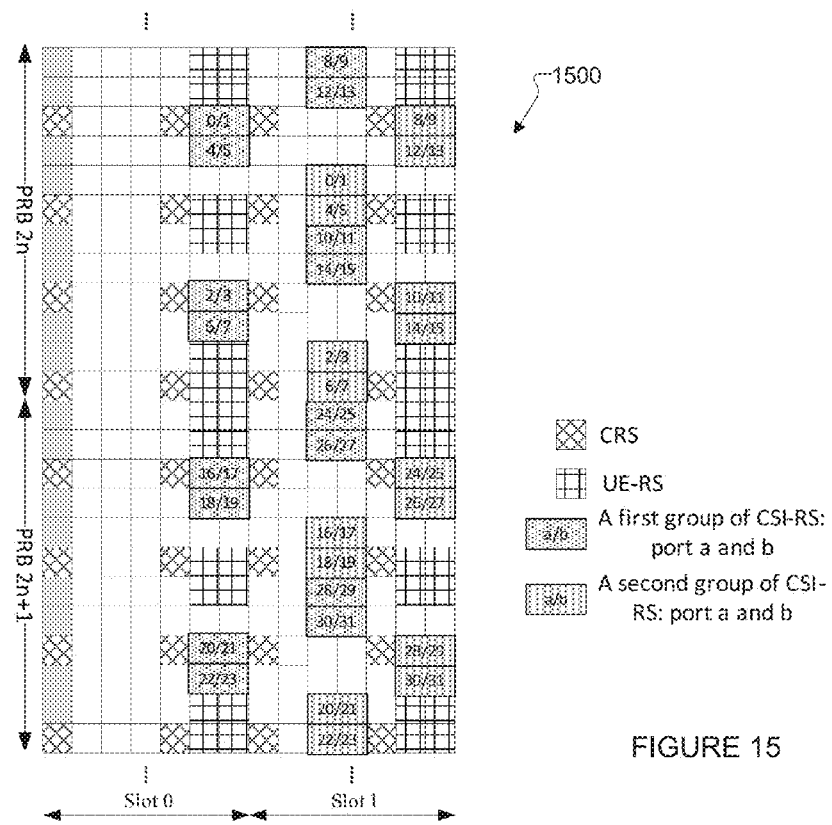
FIGURE 15

FIG. 18B An example mapping

FIG. 18A An example partition

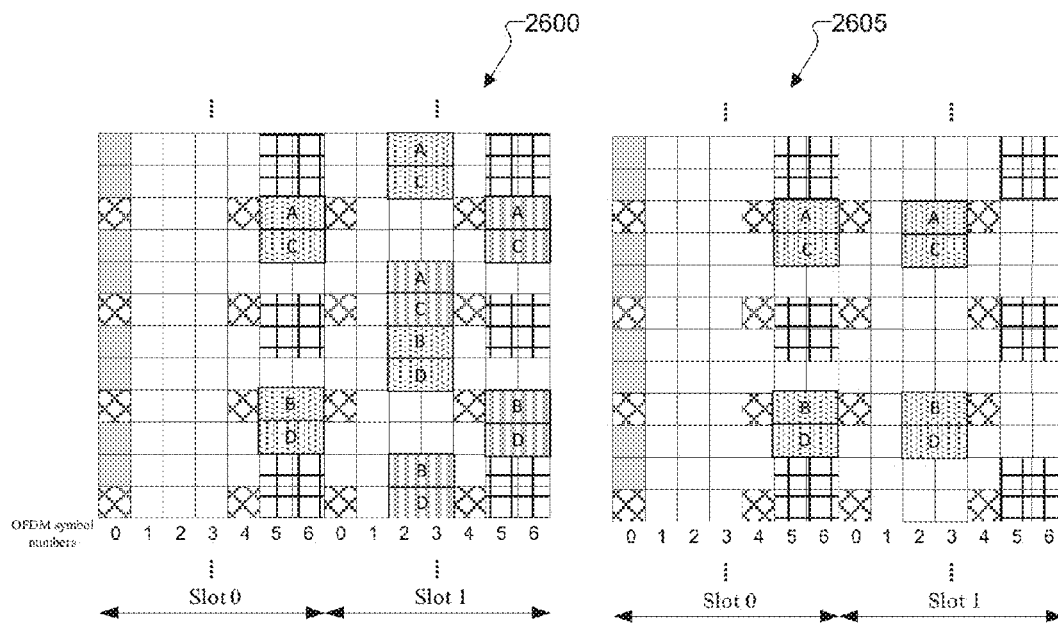
FIG. 26A An alternative 16-port CSI-RS mapping
FIG. 26B An alternative 16-port CSI-RS mapping
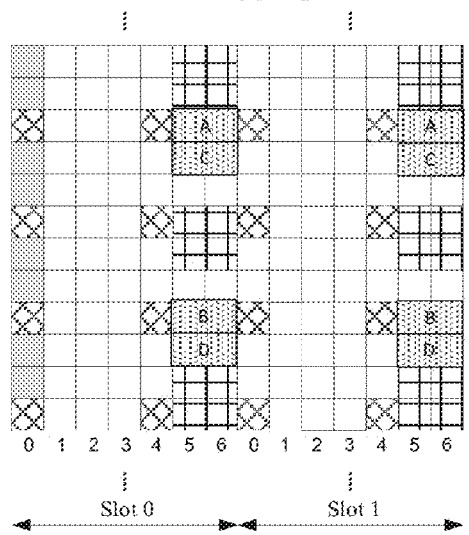
FIG. 26C An alternative 16-port CSI-RS mapping

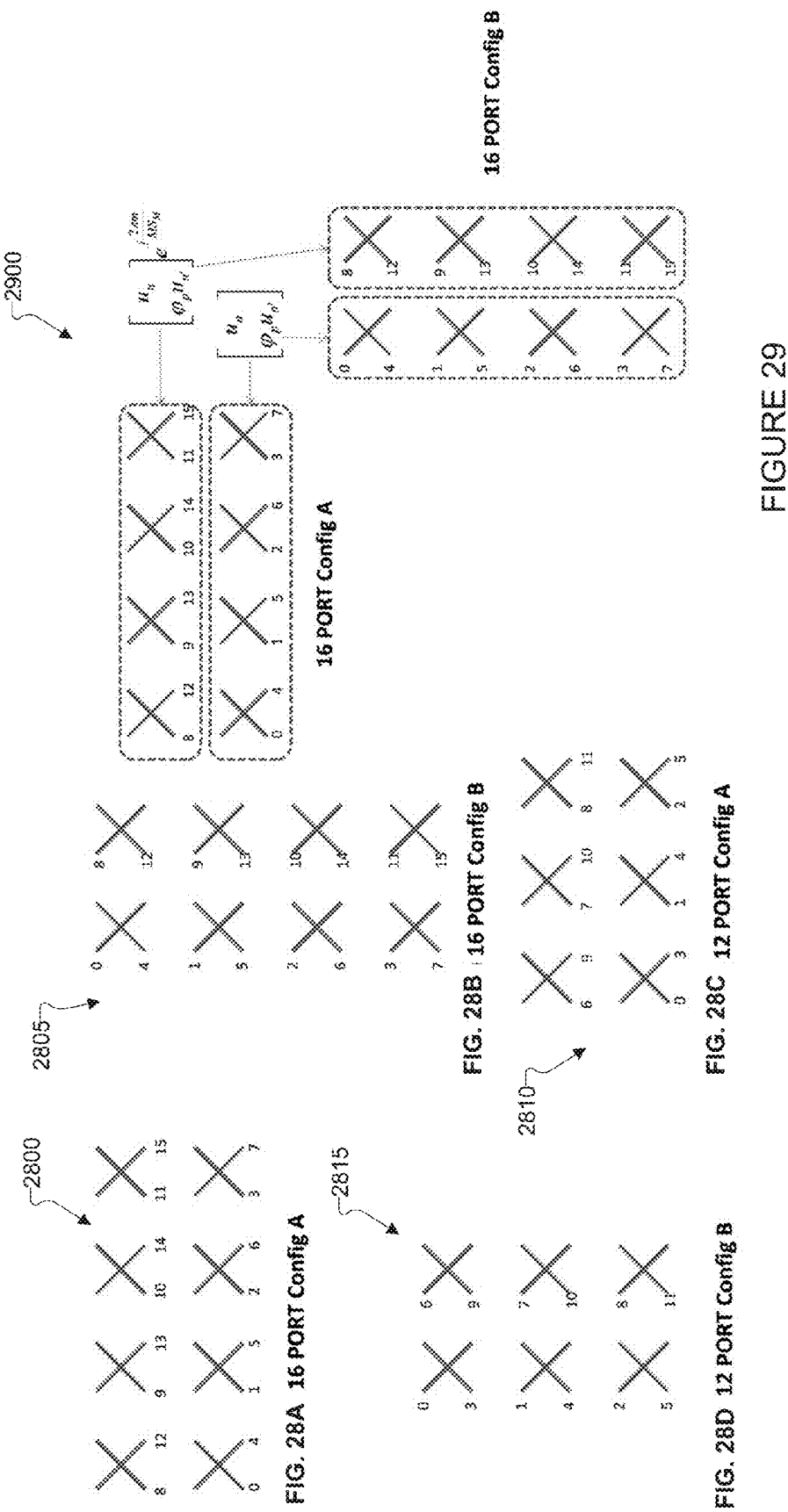

CHANNEL-STATE-INFORMATION REFERENCE SIGNALS FOR ADVANCED WIRELESS SYSTEMS

CROSS-REFERENCE TO RELATED APPLICATION AND CLAIMS OF PRIORITY

This application claims priority under 35 U.S.C. § 119(e) to
U.S. Provisional Patent Application No. 62/118,955 filed on Feb. 20, 2015,
U.S. Provisional Patent Application No. 62/121,274 filed on Feb. 26, 2015,
U.S. Provisional Patent Application No. 62/135,570 filed on Mar. 19, 2015,
U.S. Provisional Patent Application No. 62/187,563 filed on Jul. 1, 2015,
U.S. Provisional Patent Application No. 62/202,675 filed on Aug. 7, 2015,
U.S. Provisional Patent Application No. 62/203,718 filed on Aug. 11, 2015,
U.S. Provisional Patent Application No. 62/206,039 filed on Aug. 17, 2015,
U.S. Provisional Patent Application No. 62/216,546 filed on Sep. 10, 2015,
U.S. Provisional Patent Application No. 62/232,214 filed on Sep. 24, 2015,
U.S. Provisional Patent Application No. 62/240,254 filed on Oct. 12, 2015,
U.S. Provisional Patent Application No. 62/250,696 filed on Nov. 4, 2015, and
U.S. Provisional Patent Application No. 62/256,222 filed on Nov. 17, 2015.
The above-identified provisional patent applications are hereby incorporated by reference in their entirety.

TECHNICAL FIELD

The present disclosure relates generally to a codebook design and structure associated with a two dimensional transmit antennas array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

Embodiments of the present disclosure provide channel-state-information reference signals for advanced wireless systems.

In a first embodiment, a mobile station for receiving on multiple input multiple output (MIMO) radio links. The method includes a receiver configured to receive a signal including a complex-valued modulation symbol $a_{k,l}^{(p')}$ from a base station, a processor configured to extract the complex-valued modulation symbol $a_{k,l}^{(p')}$ from the signal, wherein in response to being configured with code-division multiplex-4 (CDM-4), the complex-valued modulation symbol $a_{k,l}^{(p')}$ is mapped using a reference signal sequence $r_{l,n_s}(m')$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m -$$

$$\begin{cases} k'' & \text{for } p' \in \{15, 16, 19, 20\}, \text{normal cyclic prefix}, N_{ports}^{CSI} = 8 \\ k'' + 6 & \text{for } p' \in \{17, 18, 21, 22\}, \text{normal cyclic prefix}, N_{ports}^{CSI} = 8 \\ 6k'' & \text{for } p' \in \{15, 16, 17, 18\}, \text{normal cyclic prefix}, N_{ports}^{CSI} = 4 \end{cases}$$

$$l = l' +$$

$$\begin{cases} l'' & \text{CSI reference signal configurations } 0-19, \text{normal cyclic prefix} \\ 2l'' & \text{CSI reference signal configurations } 20-31, \text{normal cyclic prefix} \end{cases}$$

$$l'' = 0, 1$$
$$k'' = 0, 1 \text{ for normal cyclic prifix}$$
$$i = 2k'' + l''$$
$$m = 0, 1, \ldots, N_{RB}^{DL} - 1$$
$$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource, $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource, $N_{ports}^{CSI-RS}$ is 8 and the number of CSI-RS resources, $N_{res}^{CSI-RS}$ is 2.

In a second embodiment, a method for receiving on multiple input multiple output (MIMO) radio links is provided. The method includes receiving a signal including a complex-valued modulation symbol $a_{k,l}^{(p')}$ from a base station, and extracting the complex-valued modulation symbol of $a_{k,l}^{(p')}$ from the signal, wherein in response to being configured with code-division multiplex-4 (CDM-4), the complex-valued modulation symbol $a_{k,l}^{(p')}$ is mapped using a reference signal sequence $r_{l,n_s}(m')$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m -$$

$$\begin{cases} k'' & \text{for } p' \in \{15, 16, 19, 20\}, \text{normal cyclic prefix}, N_{ports}^{CSI} = 8 \\ k'' + 6 & \text{for } p' \in \{17, 18, 21, 22\}, \text{normal cyclic prefix}, N_{ports}^{CSI} = 8 \\ 6k'' & \text{for } p' \in \{15, 16, 17, 18\}, \text{normal cyclic prefix}, N_{ports}^{CSI} = 4 \end{cases}$$

-continued $$l = l' + \begin{cases} l'' & CSI \text{ reference signal configurations } 0-19, \text{ normal cyclic prefix} \\ 2l'' & CSI \text{ reference signal configurations } 20-31, \text{ normal cyclic prefix} \end{cases}$$

$$l'' = 0, 1$$

$$k'' = 0, 1 \text{ for normal cyclic prifix}$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource, $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource $N_{ports}^{CSI-RS}$ is 8 and the number of CSI-RS resources, $N_{res}^{CSI-RS}$ is 2.

In a third embodiment, a base station for performing communication on multiple input multiple output (MIMO) radio links is provided. The method includes a processor configured to generate a reference signal sequence for each of a plurality of subcarriers and OFDM symbols, and in response to being configured with code-division multiplex-4 (CDM-4), map a reference signal sequence $r_{l,n_s}(m')$ to a complex-valued modulation symbol $a_{k,l}^{(p')}$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m - \begin{cases} k'' & \text{for } p' \in \{15, 16, 19, 20\}, \text{ normal cyclic prefix, } N_{ports}^{CSI} = 8 \\ k'' + 6 & \text{for } p' \in \{17, 18, 21, 22\}, \text{ normal cyclic prefix, } N_{ports}^{CSI} = 8 \\ 6k'' & \text{for } p' \in \{15, 16, 17, 18\}, \text{ normal cyclic prefix, } N_{ports}^{CSI} = 4 \end{cases}$$

$$l = l' + \begin{cases} l'' & CSI \text{ reference signal configurations } 0-19, \text{ normal cyclic prefix} \\ 2l'' & CSI \text{ reference signal configurations } 20-31, \text{ normal cyclic prefix} \end{cases}$$

$$l'' = 0, 1$$

$$k'' = 0, 1 \text{ for normal cyclic prifix}$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource $N_{ports}^{CSI-RS}$ is 8 and the number of CSI-RS resources, $N_{REs}^{CSI-RS}$ is 2.

In a fourth embodiment, a method for performing communication on multiple input multiple output (MIMO) radio links is provided. The method includes
generating a reference signal sequence for each of a plurality of subcarriers and OFDM symbols; and
in response to being configured with code-division multiplex-4 (CDM-4), mapping a reference signal sequence $r_{l,n_s}(m')$ to a complex-valued modulation symbol $a_{k,l}^{(p')}$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m - \begin{cases} k'' & \text{for } p' \in \{15, 16, 19, 20\}, \text{ normal cyclic prefix, } N_{ports}^{CSI} = 8 \\ k'' + 6 & \text{for } p' \in \{17, 18, 21, 22\}, \text{ normal cyclic prefix, } N_{ports}^{CSI} = 8 \\ 6k'' & \text{for } p' \in \{15, 16, 17, 18\}, \text{ normal cyclic prefix, } N_{ports}^{CSI} = 4 \end{cases}$$

$$l = l' + \begin{cases} l'' & CSI \text{ reference signal configurations } 0-19, \text{ normal cyclic prefix} \\ 2l'' & CSI \text{ reference signal configurations } 20-31, \text{ normal cyclic prefix} \end{cases}$$

$$l'' = 0, 1$$

$$k'' = 0, 1 \text{ for normal cyclic } prifix$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource $N_{ports}^{CSI-RS}$ is 8 and the number of CSI-RS resources, $N_{res}^{CSI-RS}$ is 2.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A to 5D illustrate antenna configurations and antenna numbering according to some embodiments of the present disclosure;

FIGS. 10A and 10B illustrate alternative CSI-RS mapping patterns according to some embodiments of the present disclosure;

FIGS. 11A to 11C illustrate alternative CSI-RS mapping patterns generated according to some embodiments of the present disclosure;

FIGS. 14A to 14B illustrate 32-port CSI-RS mapping patterns according to some embodiments of the present disclosure;

FIG. 15 illustrates an alternative 32-port CSI-RS mapping according to some embodiments of the present disclosure;

FIG. 26A to 26C and FIG. 27 illustrate alternative CSI-RS mapping patterns generated according to some embodiments of the present disclosure;

FIGS. 28A to 28D illustrate antenna configurations and antenna numbering according to some embodiments of the present disclosure;

FIG. 29 illustrates precoder weight application to antenna configurations according to embodiments of the present disclosure;

DETAILED DESCRIPTION

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (1) 3rd generation partnership project (3GPP) TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

Figure 1:
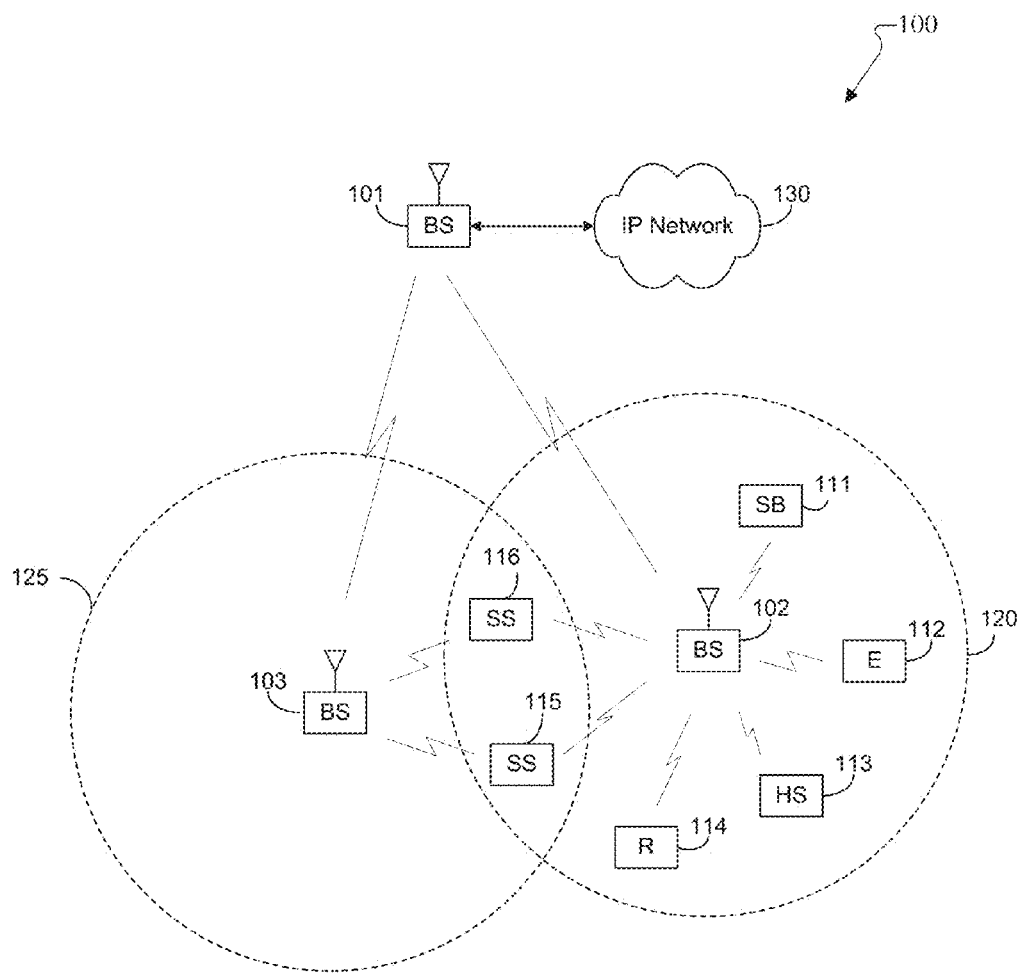
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
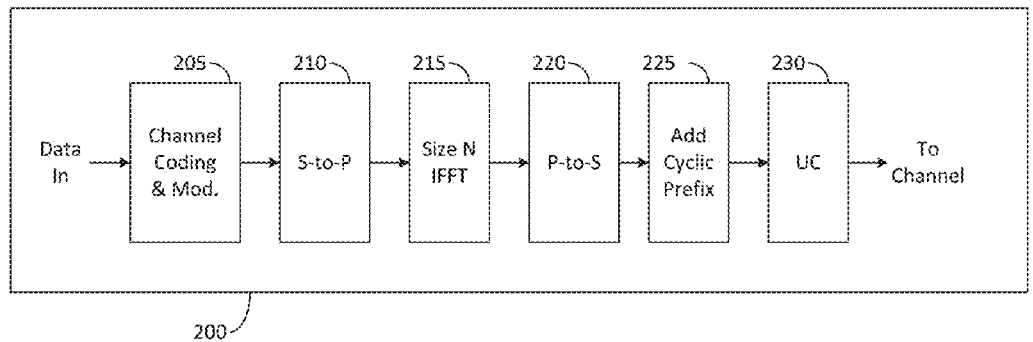
FIGS. 2A and 2B illustrate example wireless transmit and receive paths according to this disclosure.
Figure 2B:
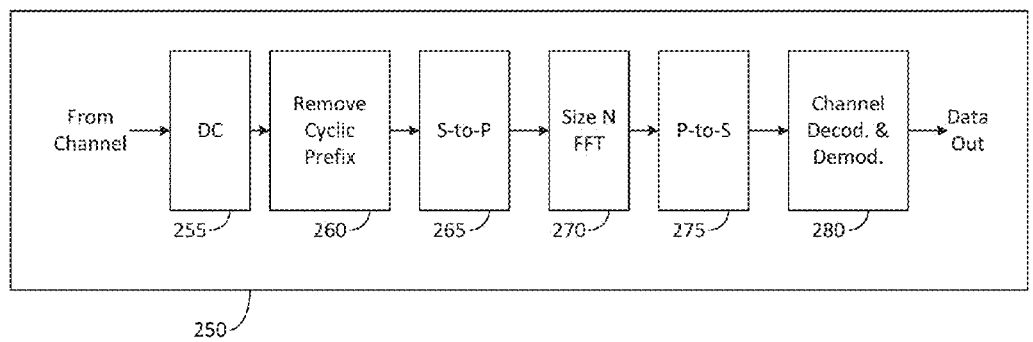

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
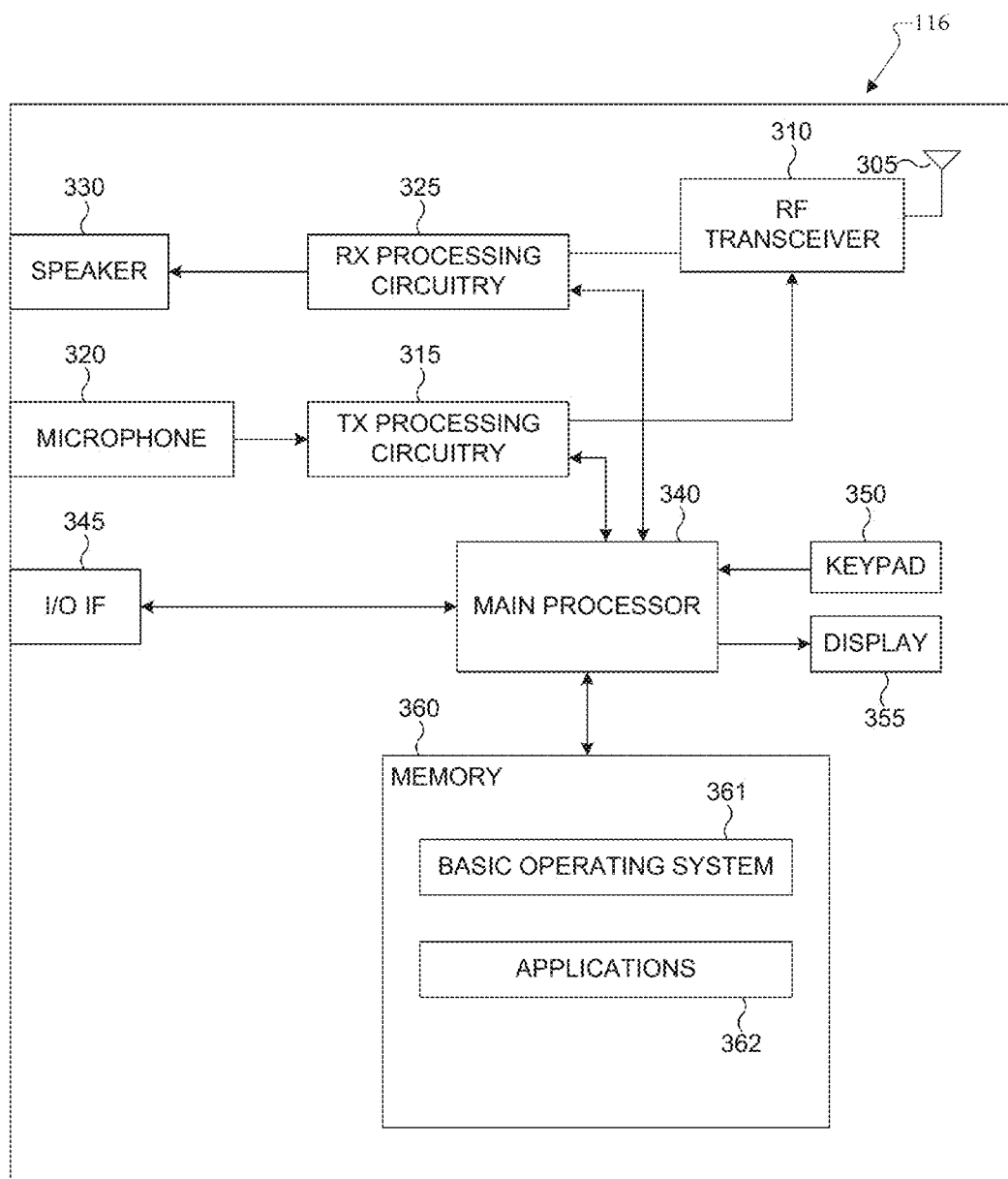
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
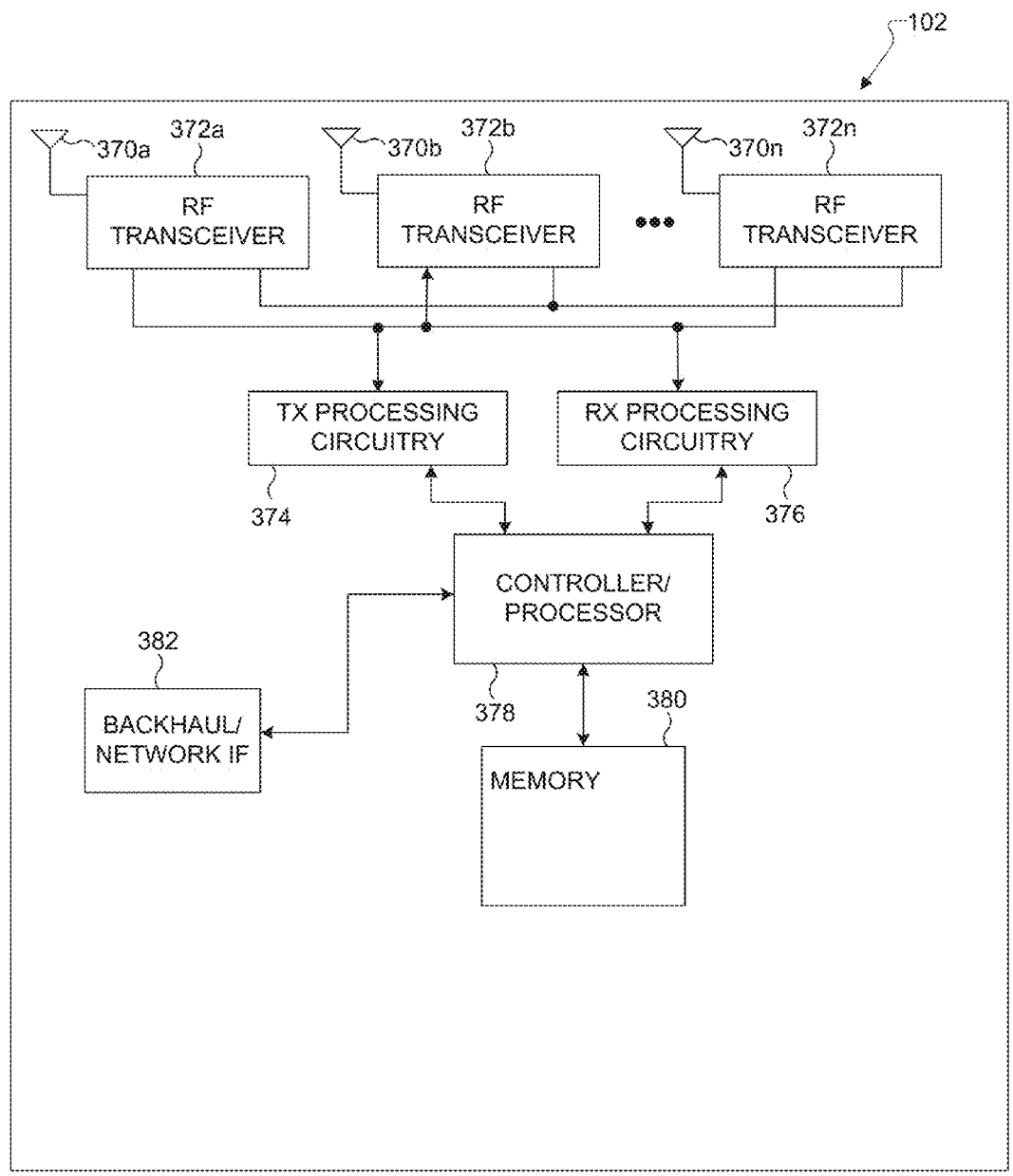
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figures 4A, 4B:
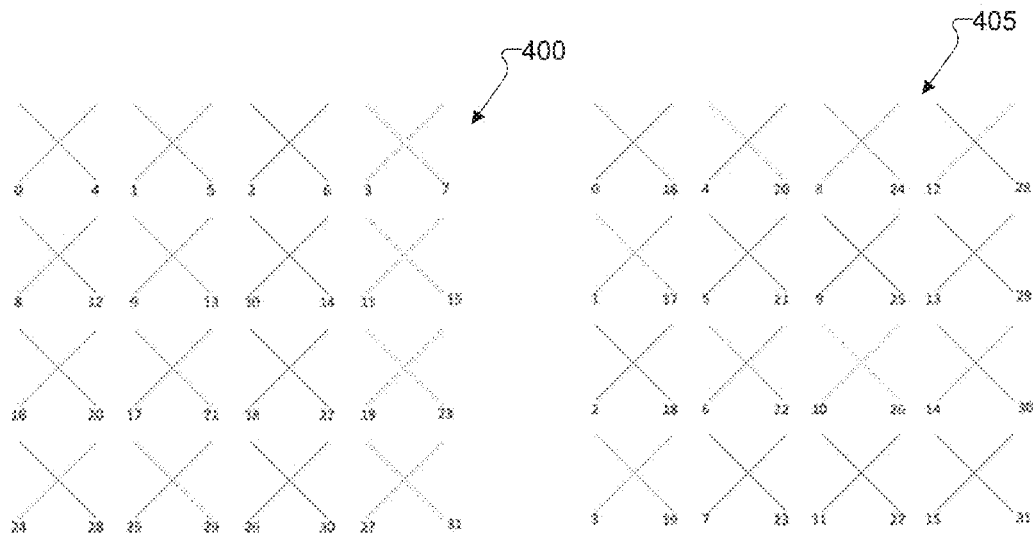
FIGS. 4A to 4C illustrate 4×4 dual-polarized antenna arrays according to embodiments of the present disclosure.
Figure 4C:
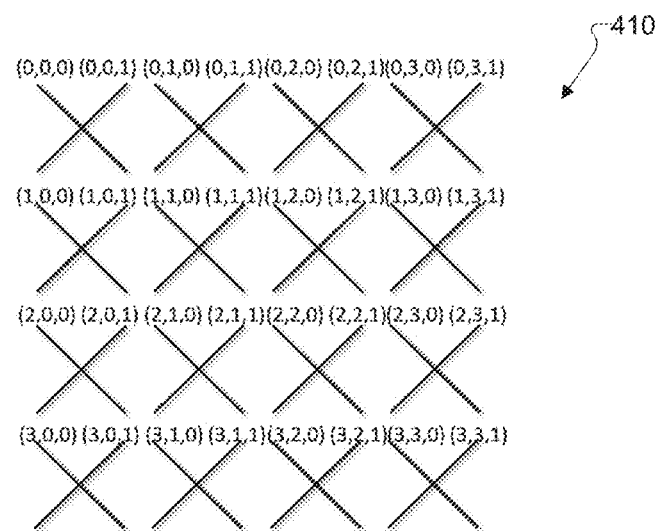

FIGS. 4A to 4C illustrate 4x4 dual-polarized antenna arrays according to embodiments of the present disclosure. FIG. 4A illustrates an antenna port (AP) indexing scheme 400, and FIG. 4B illustrates another antenna port indexing (AP) indexing scheme 405 according to embodiments of the present disclosure. FIG. 4C illustrates an antenna element (or TXRU) numbering scheme 410 according to embodiments of the present disclosure.

In some embodiments, eNB is equipped with 2D rectangular antenna array (or TXRUs), comprising M rows and N columns with P=2 polarized, wherein each element (or TXRU) is indexed with (m, n, p), and m=0, . . . -1, n=0, . . . , N-1, p=0, . . . , P-1, as illustrated in FIGS. 4A and 4B with M=N=4. When FIG. 4C represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 4C.

In most of the embodiments of the present disclosure, a CSI-RS resource refers to a non-zero-power (NZP) CSI-RS resource unless otherwise stated. In the TS36.331 an NZP CSI-RS resource can be configured utilizing a higher-layer information element (IE) CSI-RS-ConfigNZP: the IE CSI-RS-ConfigNZP is the CSI-RS resource configuration using non-zero power transmission that E-UTRAN may configure on a serving frequency.

CSI-RS-ConfigNZP Information Elements

```
-- ASN1START
CSI-RS-ConfigNZP-r11 ::=   SEQUENCE {
    csi-RS-ConfigNZPId-r11        CSI-RS-ConfigNZPId-r11,
    antennaPortsCount-r11         ENUMERATED {an1, an2, an4, an8},
    resourceConfig-r11            INTEGER (0..31),
    subframeConfig-r11            INTEGER (0..154),
    scramblingIdentity-r11        INTEGER (0..503),
    qcl-CRS-Info-r11              SEQUENCE {
        qcl-ScramblingIdentity-r11    INTEGER (0..503),
        crs-PortsCount-r11            ENUMERATED {n1, n2, n4, spare1},
        mbsfn-SubframeConfigList-r11  CHOICE {
            release                       NULL,
            setup                         SEQUENCE {
                subframeConfigList            MBSFN-SubframeConfigList
            }
        }                                                        OPTIONAL  -- Need ON
    }                                                            OPTIONAL, -- Need OR
    ...
}
-- ASN1STOP
```

| CSI-RS-ConfigNZP field descriptions |
| --- |
| antennaPortsCount |
| Parameter represents the number of antenna ports used for transmission of CSI reference signals where an1 corresponds to 1, an2 to 2 antenna ports etc. see TS 36.211 [21, 6.10.5]. |
| qcl-CRS-Info |
| Indicates CRS antenna ports that is quasi co-located with the CSI-RS antenna ports, see TS 36.213 [23, 7.2.5]. EUTRAN configures this field if and only if the UE is configured with qcl-Operation set to typeB. |
| resourceConfig |
| Parameter: CSI reference signal configuration, see TS 36.211 [21, table 6.10.5.2-1 and 6.10.5.2-2]. |
| subframeConfig |
| Parameter: $I_{CSI-RS}$, see TS 36.211 [21, table 6.10.5.3-1]. |
| scramblingIdentity |
| Parameter: Pseudo-random sequence generator parameter, $n_{ID}$, see TS 36.213 [23, 7.2.5]. |

FIGS. 5A to 5D illustrate antenna configurations and antenna numbering according to some embodiments of the present disclosure. In all the four antenna configurations of FIGS. 5A to 5D, cross pol (or X-pol) antenna array is considered, in which a pair of antenna elements in a same physical location are polarized in two distinct angles, e.g., +45 degrees and −45 degrees.

FIGS. 5A and 5B are antenna configurations 500, 505 with 16 CSI-RS ports, comprising 8 pairs of x-pol antenna elements placed in a 2D antenna panel. The 8 pairs can be placed in 2×4 (FIG. 5A) or 4×2 manner (FIG. 2B) on horizontal and vertical dimensions.

FIGS. 5C and 5D are antenna configurations 510, 515 with 12 CSI-RS ports, comprising 6 pairs of x-pol antenna elements placed in a 2D antenna panel. The 8 pairs can be placed in 2×3 (FIG. 5C) or 3×2 manner (FIG. 5D) on horizontal and vertical dimensions.

Antenna Number Assignment

Antennas are indexed with integer numbers, 0, 1, ..., 15 for 16-port configurations (FIGS. 5A and 5B), and 0, ..., 11 for 12-port configurations (FIGS. 5C and 5D).

In fat arrays (such as 12-port config A and 16-port config A), antenna numbers are assigned such that: consecutive numbers are assigned for all the antenna elements for a first polarization, and proceed to a second polarization; and for a given polarization, consecutive numbers are assigned for a first row with progressing one edge to another edge, and proceed to a second row.

For example, in FIG. 5A, antenna numbers 0-7 are assigned for a first polarization, and 8-15 are assigned for a second polarization; and antenna numbers 0-3 are assigned for a first row and 4-7 are assigned for a second row.

Antenna numbers in tall arrays (such as 12-port config B and 16-port config B) are obtained by simply rotating the fat antenna arrays (such as 12-port config A and 16-port config A) by 90 degrees.

PMI Feedback Precoder Generation According to the Antenna Numbering

In some embodiments, when a UE is configure with 12 or 16 port CSI-RS for a CSI-RS resource, the UE is configured to report a PMI feedback precoder according to the antenna numbers in FIGS. 5A to 5D. A rank-1 precoder, $W_{m,n,p}$, which is an $N_{CSIRS} \times 1$ vector, to be reported by the UE has the following form:

$$W_{m,n,p} = [w_0 \ w_1 \ \ldots \ w_{N_{CSIRS}-1}]^t = \frac{1}{\sqrt{N_{CSIRS}}} \begin{bmatrix} v_m \otimes u_n \\ \varphi_p(v_{m'} \otimes u_{n'}) \end{bmatrix},$$

wherein:

$N_{CSIRS}$=number of configured CSI-RS ports in the CSI-RS resource, e.g., 12, 16, etc;

$u_n$ is a N×1 oversampled DFT vector for a first dimension, whose oversampling factor is $S_N$;

$v_m$ is a M×1 oversampled DFT vector for a second dimension, whose oversampling factor is $S_M$;

N≥M, in one alternative, (N,M)∈{(4,2), (4,3)}; in another alternative, (N,M)∈{(4,2), (4,3), (2,2)}; and $\phi_p$ is a co-phase, e.g., in a form of $$e^{j\frac{2\pi p}{4}},$$

p=0, 1, 2, 3.

Here, example set of oversampling factors that can be configured for $S_N$ and $S_M$ are 4 and 8; and m, m'∈{0, 1, ..., $S_M M$}, and n, n'∈{0, 1, ..., $S_N N$}. In a special case, m=m' and n=n'.

Figure 6:
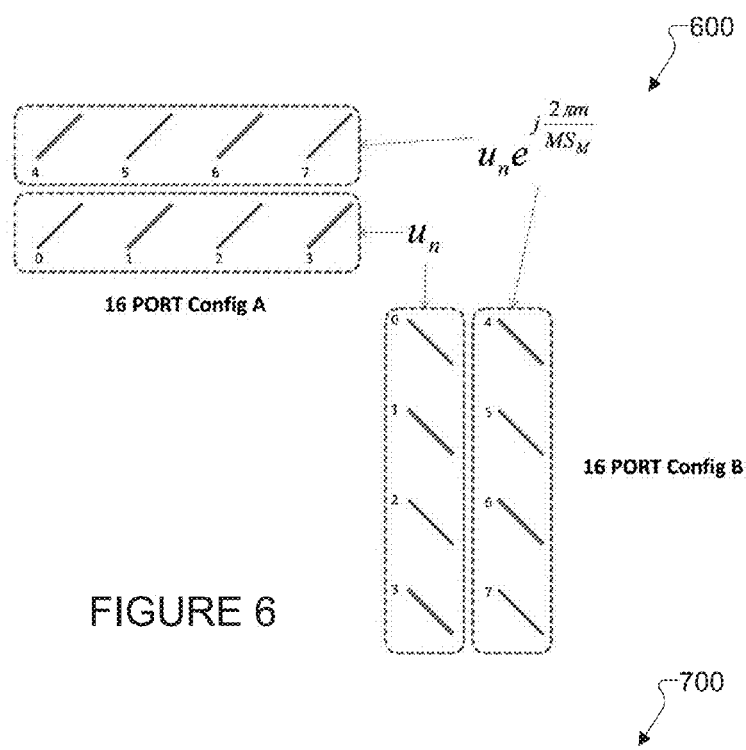
FIG. 6 illustrates that a precoder codebook construction is able to be flexibly used for both fat and tall 2D arrays according to some embodiments of the present disclosure.

FIG. 6 illustrates precoding weight application 600 to antenna configurations of FIGS. 5A to 5D according to embodiments of the present disclosure. The embodiment shown in FIG. 6 is for illustration only. Other embodiments could be used without departing from the scope of the present disclosure.

When any of 16-port config A and B is used at the eNB with configuring $N_{CSIRS}$=16 to the UE, a submatrix $v_n \otimes u_n$ of $W_{m,n,p}$ corresponds to a precoder applied on 8 co-pol elements, whose antenna numbers are 0 through 7. Given the antenna configuration, M=2 and N=4 should be configured for $v_m$ and $u_n$.

If 16-port config A is used, $u_n$ is a 4×1 vector representing a horizontal DFT beam and $v_m$ is a 2×1 vector representing a vertical DFT beam.

If 16-port config B is used, $u_n$ is a 4×1 vector representing a vertical DFT beam and $v_m$ is a 2×1 vector representing a horizontal DFT beam.

With 12 or 16-port configurations, can be written as $$v_m = \begin{bmatrix} 1 & e^{j\frac{2\pi n}{M'}} \end{bmatrix}^t = \begin{bmatrix} 1 & e^{j\frac{2\pi n}{MS_M}} \end{bmatrix}.$$

With 16-port configurations, $u_n$ can be written as:

$$u_n = \begin{bmatrix} 1 & e^{j\frac{2\pi n}{N'}} & e^{j\frac{4\pi n}{N'}} & e^{j\frac{6\pi n}{N'}} \end{bmatrix}^t = \begin{bmatrix} 1 & e^{j\frac{2\pi n}{NS_N}} & e^{j\frac{4\pi n}{NS_N}} & e^{j\frac{6\pi n}{NS_N}} \end{bmatrix}^t.$$

With 12-port configurations, $u_n$ can be written as:

$$u_n = \begin{bmatrix} 1 & e^{j\frac{2\pi n}{N'}} & e^{j\frac{4\pi n}{N'}} \end{bmatrix}^t = \begin{bmatrix} 1 & e^{j\frac{2\pi n}{NS_N}} & e^{j\frac{4\pi n}{NS_N}} \end{bmatrix}^t.$$

Precoding weights to be applied to antenna port numbers 0 through 3 are $u_n$, and the precoding weights to be applied to antenna ports 4 through 7 are $$u_n e^{j\frac{2\pi m}{MS_M}} = u_n e^{j\frac{2\pi m}{M'}}$$

with an appropriate power normalization factor. Similarly, precoding weights to be applied to antenna port numbers 8 through 11 are $u_{n'}$, and the precoding weights to be applied to antenna ports 12 through 15 are $$u_{n'} e^{j\frac{2\pi m'}{MS_M}}$$

with an appropriate power normalization factor. This method of precoding weight application is illustrated in FIG. 6.

It is noted that the precoding weight assignment on the antennas can be similarly illustrated for 12-port config A and B, to the case of 16-port config A and B.

For CQI derivation purpose, UE needs to assume that PDSCH signals on antenna ports {7 ... 6+υ} for υ layers would result in signals equivalent to corresponding symbols transmitted on antenna numbers {0, ..., $N_{CSIRS}$−1}, as given by $$\begin{bmatrix} y^{(0)}(i) \\ \vdots \\ y^{(N_{CSIRS}-1)}(i) \end{bmatrix} = W_{m,n,p}(i) \begin{bmatrix} x^{(0)}(i) \\ \vdots \\ x^{(\upsilon-1)}(i) \end{bmatrix},$$

where $x(i)=[x^{(0)}(i) \ldots x^{(\upsilon-1)}(i)]^T$ is a vector of symbols from the layer mapping in subclause 6.3.3.2 of 3GPPTS36.211, where is the precoding matrix corresponding to the reported PMI applicable to x(i).

Parameter Configuration for Oversampled DFT Codebooks $v_m$ and $u_n$

FIG. 6 illustrates that a precoder codebook construction $$W_{m,n,p} = [w_0 \; w_1 \; \ldots \; w_{N_{CSIRS}-1}]^t = \frac{1}{\sqrt{N_{CSIRS}}} \begin{bmatrix} v_m \otimes u_n \\ \varphi_p(v_{m'} \otimes u_{n'}) \end{bmatrix}$$

can be flexibly used for both fat and tall 2D arrays, with appropriately configuring parameters M and N. (another precoder codebook construction can also be flexibly used).

On the other hand, it is also sometimes desired to allocate a smaller DFT oversampling factor for the vertical dimension than for the horizontal dimension, maybe due to different angle/spread distribution. Hence, configurability of parameters to change the oversampled codebooks, $v_m$ and $u_n$, is desired for that purpose. This motivates the following method.

In some embodiments, a UE is configured to report PMI, which are generated according to a precoding matrix, comprising at least those two oversampled DFT vectors: $v_m$ and $u_n$. For the generation of the PMI, the UE is further configured to select a codebook for $v_m$ and a codebook for $u_n$, wherein each codebook for $v_m$ and $u_n$ is selected from multiple codebook choices. For this purpose, the UE may be configured with a set of parameters by higher layers.

Some example parameters are:

M' and N': to determine the denominator of the exponents for the oversampled DFT vectors $v_m$ and $u_n$:

$$v_m = \begin{bmatrix} 1 & e^{j\frac{2\pi n}{M'}} \end{bmatrix}^t ; \text{and}$$

$$u_n = \begin{bmatrix} 1 & e^{j\frac{2\pi n}{N'}} & e^{j\frac{4\pi n}{N'}} & e^{j\frac{6\pi n}{N'}} \end{bmatrix}^t \text{ or } u_n = \begin{bmatrix} 1 & e^{j\frac{2\pi n}{N'}} & e^{j\frac{4\pi n}{N'}} \end{bmatrix}^t.$$

$P_M$: to select a codebook out of multiple (e.g., 2) codebooks corresponding to $v_n$ and similarly; and $P_N$: for $u_n$.

In one method, M' and N' are directly configured by two higher layer parameters respectively defined for M' and N'. In one such example, M'∈{16,32} and N'∈{16,32}. In another such example, M'∈{8,16,32} and N'∈{8,16,32}.

In another method, a pair M' and N' is configured by a higher layer parameter, namely newParameterToIndicateDenominator. Although this method is less flexible than the previous one, it has a benefit of being able to limit the UE complexity increase. In one such example:

| newParameterToIndicateDenominator | (M', N') |
|---|---|
| A first value | (32, 16) |
| A second value | (16, 32) |

In another method, $P_M$ and $P_N$ correspond to oversampling factors $S_N$ and $S_M$ which is allowed to have a value of either 4 or 8.

In some embodiments, to facilitate the UE CSI reporting operation according to some embodiments of the present disclosure, a CSI resource configuration, i.e., CSI-RS-ConfigNZP comprises an additional field, e.g., newParameterToIndicateDenominator, to indicate DFT oversampling factor as illustrated in the following:

```
CSI-RS-ConfigNZP-r11 ::=    SEQUENCE {
    csi-RS-ConfigNZPId-r11         CSI-RS-ConfigNZPId-r11,
    antennaPortsCount-r11          ENUMERATED {an1, an2, an4, an8, an12, an16},
    newParameterToIndicateDenominator   ENUMERATED {a first value, a second
value, ...},
    ...
}
```

Figure 7:
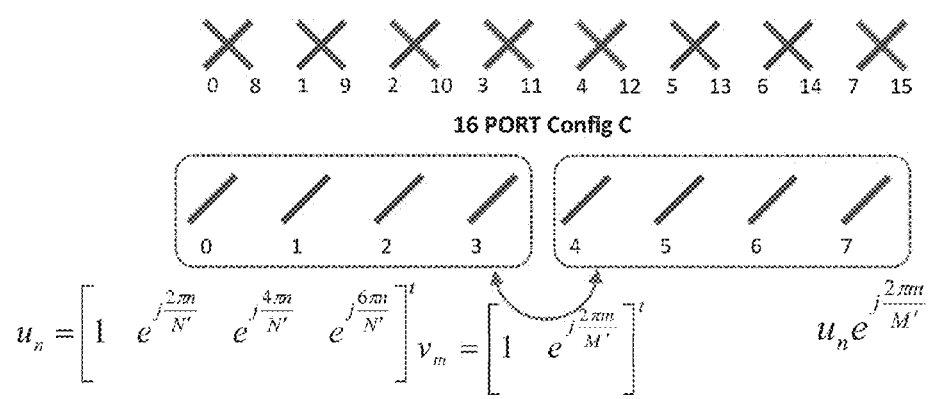
FIG. 7 shows a 1D antenna configuration and application of the precoding matrix according to some embodiments of the present disclosure.

FIG. 7 shows a 1D antenna configuration 700 and application of the precoding matrix according to some embodiments of the present disclosure. The embodiment shown in FIG. 7 is for illustration only. Other embodiments could be used without departing from the scope of the present disclosure.

For this antenna configuration, a rank-1 precoding matrix $W_{n,p}$ can be constructed as:

$$W_{n,p} = [w_0 \; w_1 \; \ldots \; w_{N_{CSIRS}-1}]^t = \frac{1}{\sqrt{N_{CSIRS}}} \begin{bmatrix} u_n \\ \varphi_p u_n \end{bmatrix},$$

wherein:

N=8 ... number of columns;

$u_n$ is a N×1 oversampled DFT vector, whose oversampling factor is $S_N$:

$$u_n = \begin{bmatrix} 1 & e^{j\frac{2\pi n}{N'}} & e^{j\frac{4\pi n}{N'}} & e^{j\frac{6\pi n}{N'}} & e^{j\frac{8\pi n}{N'}} & e^{j\frac{10\pi n}{N'}} & e^{j\frac{12\pi n}{N'}} & e^{j\frac{14\pi n}{N'}} \end{bmatrix}^t;$$

and $N' = S_N$.

It is noted that the rank-1 precoding matrix $W_{m,n,p}$ constructed for the 2D antenna array of FIG. 2 of the following form, can be used for constructing the rank-1 precoding matrix $W_{n,p}$ constructed for the 1D antenna array, with some changes:

$$W_{m,n,p} = [w_0 \; w_1 \; \ldots \; w_{N_{CSIRS}-1}]^t =$$

-continued $$\frac{1}{\sqrt{N_{CSIRS}}} \begin{bmatrix} v_m \otimes u'_n \\ \varphi_p(v_m \otimes u_{n'}) \end{bmatrix} = \frac{1}{\sqrt{N_{CSIRS}}} \begin{bmatrix} u'_n \\ e^{j\frac{2\pi m}{M'}} u'_n \\ \varphi_p u'_n \\ \varphi_p e^{j\frac{2\pi m}{M'}} u'_n \end{bmatrix}, \text{ wherein}$$

$$u'_n = \begin{bmatrix} 1 & e^{j\frac{2\pi n}{N'}} & e^{j\frac{4\pi n}{N'}} & e^{j\frac{6\pi n}{N'}} \end{bmatrix}^t.$$

It can be made $W_{m,n,p} = W_{n,p}$, with constraining $W_{m,n,p}$ in certain ways, some examples of which are shown below:

Ex 1) When M=N=32, $W_{m,n,p} = W_{n,p}$ if m=N/2=4.

Ex 2) When N=32 and M=N/2=16, $W_{m,n,p} = W_{n,p}$ if m=N/4=2.

Dimension-Restricted PMI

Hence, in some embodiments, the 2D codebook constructed for the 2D array of FIGS. 5A to 5D can be used for 1D array of FIG. 7, if the UE is configured to constrain the 2D codebook with:

Ex 1) When M=N=32, the codebook is subset-restricted so that only those precoding matrices corresponding to $W_4$ $$\left(\text{or } v_m = \begin{bmatrix} 1 & e^{j\frac{\pi}{4}} \end{bmatrix}^t\right)$$

are reported.

Ex 2) When N=32 and M=N/2=16, $W_{m,n,p} = W_{n,p}$, the codebook is subset-restricted so that only those precoding matrices corresponding to $W_2$ (or $$v_m = \begin{bmatrix} 1 & e^{j\frac{\pi}{4}} \end{bmatrix}^t)$$

are reported.

The precoding matrix of the subset restricted codebook in this case will be represented by:

$$W = \frac{1}{\sqrt{N_{CSIRS}}} \begin{bmatrix} v_m \otimes u'_n \\ \varphi_p(v_m \otimes u'_n) \end{bmatrix} = \frac{1}{\sqrt{N_{CSIRS}}} \begin{bmatrix} u'_n \\ e^{j\frac{\pi}{4}} u'_n \\ \varphi_p u'_n \\ \varphi_p e^{j\frac{\pi}{4}} u'_n \end{bmatrix},$$

with $v_m = \begin{bmatrix} 1 & e^{j\frac{\pi}{4}} \end{bmatrix}^t$.

In this case, only the first dimension PMI's are reported, and the second dimension PMI's are hard coded and not reported, i.e., the PMI is dimension-restricted. The UE can be configured to report by higher-layer signaling (RRC), the dimension-restricted PMI, in which case the precoding matrix is:

$W_{c,n,p}$, where c is a constant (e.g., 2 or 4 according to the examples above); or alternatively $$W = \frac{1}{\sqrt{N_{CSIRS}}} \begin{bmatrix} v_m \otimes u'_n \\ \varphi_p(v_m \otimes u'_n) \end{bmatrix} = \frac{1}{\sqrt{N_{CSIRS}}} \begin{bmatrix} u'_n \\ e^{j\frac{\pi}{4}} u'_n \\ \varphi_p u'_n \\ \varphi_p e^{j\frac{\pi}{4}} u'_n \end{bmatrix},$$

with $v_m = \begin{bmatrix} 1 & e^{j\frac{\pi}{4}} \end{bmatrix}^t$ and $u'_n = \begin{bmatrix} 1 & e^{j\frac{2\pi n}{N'}} & e^{j\frac{4\pi n}{N'}} & e^{j\frac{6\pi n}{N'}} \end{bmatrix}^t$.

In one method, the UE is configured to report the dimension-restricted PMI if a parameter configured in the higher-layer indicates "1D" configuration; the UE is configured to use the 2D PMI $W_{m,n,p}$ if the parameter indicates "2D" configuration.

In another method, the UE is configured to report the dimension-restricted PMI if a parameter(s) configured in the higher-layer indicates that at least one of M and N is 1; the UE is configured to use the 2D PMI $W_{m,n,p}$ otherwise.

In another method, the UE is configured to report the dimension-restricted PMI if a parameter, say PmiDimensionRestriction is configured in the higher-layer; the UE is configured to use the 2D PMI $W_{m,n,p}$ if the parameter is not configured.

In some embodiments, the UE is configured with a set of codebook subset restriction parameters (including the PMI dimension restriction as well), according to the configured antenna dimension parameters.

In U.S. Provisional Patent Application No. 62/128,196 filed on Mar. 4, 2015, which is hereby incorporated by reference in their entirety, a parameterized codebook is devised. Some of relevant embodiments in the application are reproduced below:

A group of parameters for dimension d comprises at least one of the following parameters: a number of antenna ports $N_d$; an oversampling factor $o_d$; a skip number $s_d$; (for W1) a beam offset number $f_d$; a beam spacing number $p_d$; (for W2) and a number of beams $L_d$.

A beam group indicated by a first PMI $i_{1,d}$ of dimension d (corresponding to $W_d^{(1)}$), is determined based upon these six parameters.

The total number of beams is $N_d \cdot o_d$; and the beams are indexed by an integer $m_d$, wherein beam $m_d$, $v_{m_d}$, corresponds to a precoding vector $$v_{m_d} = \begin{bmatrix} 1 & e^{j\frac{2\pi m_d}{o_d N_d}} & \cdots & e^{j\frac{2\pi m_d(N_d-1)}{o_d N_d}} \end{bmatrix}^t,$$

$m_d = 0, \ldots, N_d \cdot o_d - 1$.

The first PMI of the first dimension $i_{1,d}$, $i_{1,d} = 0, \ldots, N_d \cdot o_d / s_d - 1$, can indicate any of $L_d$ beams indexed by:

$m_a = f_d + s_d \cdot i_{1,d}, f_d + s_d \cdot i_{1,d} + p_d, \ldots, f_d + s_d \cdot i_{1,d} + (L_d-1) p_d$.

These $L_d$ beams are referred to as a beam group.

In some embodiments: the UE is configured with a parameterized KP codebook corresponding to the codebook parameters ($N_d$, $o_d$, $s_d$, $f_d$, $p_d$, $L_d$) where d=1,2 from a master codebook by applying codebook subset restriction. The master codebook is a large codebook with default codebook parameters.

In some embodiments: the UE is configured with at least one of those codebook parameters ($N_d$, $o_d$, $s_a$, $f_a$, $P_a$, $L_a$) and/or PMI dimension restriction for each dimension, when the UE is configured with a set of parameters related to the antenna dimension information, e.g., Q, M and N.

Relationship of Antenna Port Numbers and the Antenna Numbers in FIGS. 5A to 5D (and Later in FIGS. 28A to 28D)

In some embodiments, the antenna numbers in FIGS. 5A to 5D (and FIGS. 28A TO 28D) may correspond to an offset number to antenna port numbers. For instance, antenna number a in FIGS. 5A to 5D (and FIGS. 28A to 28D) may correspond to antenna port number a+α, where a∈{0, ..., 15} and α is an integer.

In one example in which a legacy channel state information-reference signals (CSI-RS) port numbering system is reused for the 2D antenna array, α=15. In this case, antenna numbers 0, 1, ..., 15 in FIGS. 5A to 5D (or FIGS. 28A to 28D) are one to one mapped to antenna port numbers 15, 16, ..., 30.

In another example in which a new CSI-RS port numbers are assigned for the 2D antenna array, starting from the last CSI-RS port number in the legacy 8-CSI-RS port configuration, i.e., CSI-RS port 23, α=24. In this case, antenna numbers 0, 1, ..., 15 in FIGS. 5A to 5D (or FIGS. 28A to 28D) are one to one mapped to antenna port numbers 24, 16, ..., 39.

In still other example in which a new CSI-RS port numbers are assigned for the 2D antenna array, a brand new starting CSI-RS port number is given, e.g., α=200. In this case, antenna numbers 0, 1, ..., 15 in FIGS. 5A to 5D (or FIGS. 28A to 28D) are one to one mapped to antenna port numbers 200, 201, ..., 215.

Figure 8:
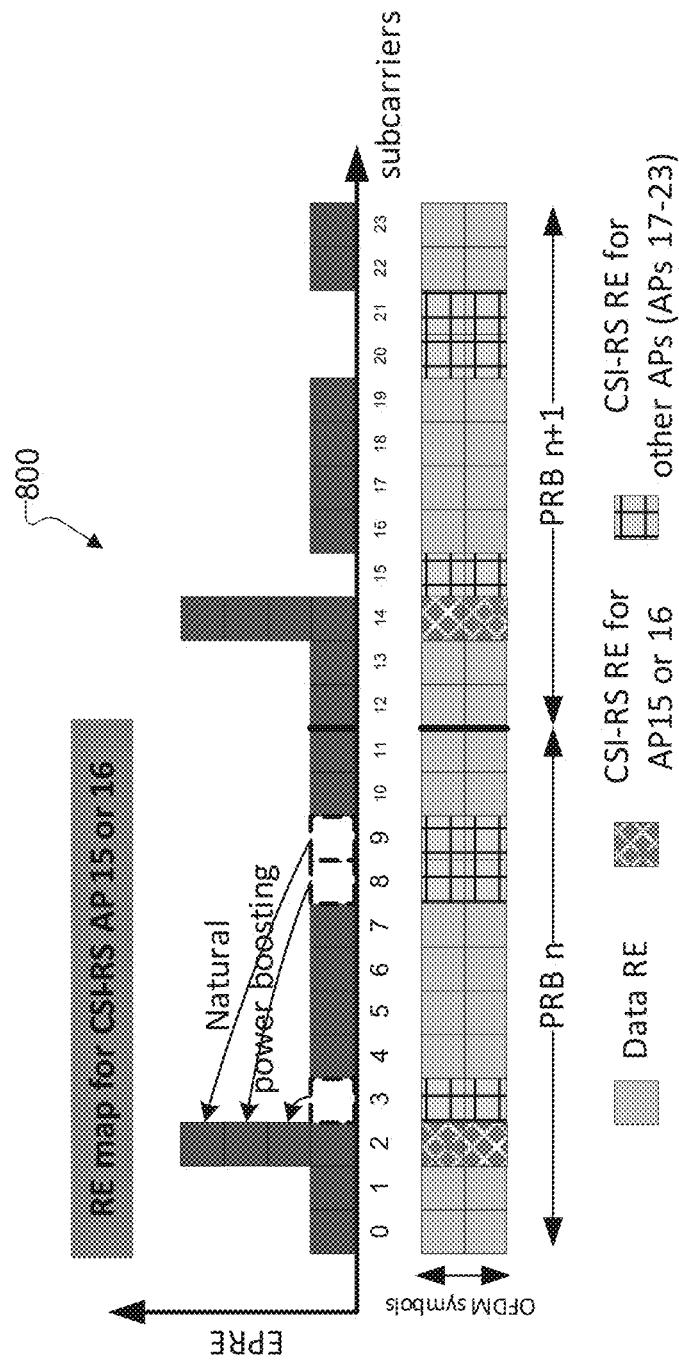
FIG. 8 illustrates CSI-RS EPRE 800 for an antenna port, according to some embodiments of the present disclosure.

FIG. 8 illustrates CSI-RS EPRE 800 for an antenna port, according to some embodiments of the present disclosure.

One of the most important goals for CSI-RS pattern design is to enable eNB's full power utilization. The 3GPP LTE Rel-10 8-port CSI-RS design allows us this, by introducing a CDM CSI-RS. Two-port CSI-RS (e.g., AP 15 and AP 16) are CDM multiplexed in each CSI-RS RE, and four CSI-RS REs are allocated for four groups of two-port CSI-RS per PRB per OFDM symbol, thereby all 8-port CSI-RS are multiplexed per PRB per OFDM symbol. When natural power boosting on CSI-RS REs (i.e., on subcarriers 2 and 14) is applied as shown in FIG. 8, energy of each CSI-RS RE is four times of that of each data RE on that antenna port. The figure also illustrates that eNB can allocate full power (energy) per OFDM symbol per CSI-RS port.

CSI-RS Mapping Pattern and Resource Configuration

In subframes configured for CSI reference signal transmission, the reference signal sequence $r_{l,n_s}(m)$ shall be mapped to complex-valued modulation symbols $a_{k,l}^{(p)}$ used as reference symbols on antenna port p according to:

$$a_{k,l}^{(p)} = w_{l''} \cdot r_{l,n_s}(m')$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l'} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The quantity (k',l') and the necessary conditions on $n_s$ are given by TABLE 1 and TABLE 6.10.5.2-2 in 3GPPTS36.211 for normal and extended cyclic prefix, respectively.

TABLE 1

Mapping from CSI reference signal configuration to (k', l'') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l'') | $n_s$ mod 2 | (k', l'') | $n_s$ mod 2 | (k', l'') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |

TABLE 1-continued

Mapping from CSI reference signal configuration to (k', l'') for normal cyclic prefix

| CSI reference signal config- uration | Number of CSI reference signals configured | | | | | |
|---|---|---|---|---|---|---|
| | 1 or 2 | | 4 | | 8 | |
| | (k', l'') | $n_s$ mod 2 | (k', l'') | $n_s$ mod 2 | (k', l'') | $n_s$ mod 2 |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Figure 9:
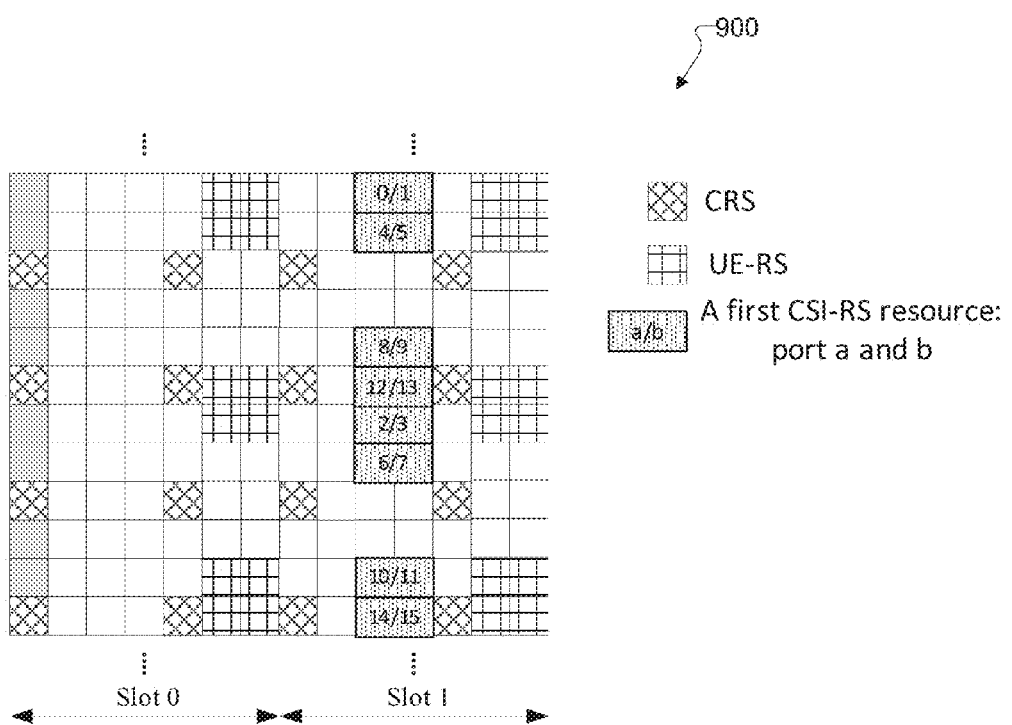
FIG. 9 illustrates an alternative per-PRB-pair 16-port CSI-RS mapping pattern generated according to some embodiments of the present disclosure.

FIG. 9 illustrates an alternative per-PRB-pair 16-port CSI-RS mapping pattern 900 generated according to some embodiments of the present disclosure. The 16 CSI-RS pattern utilizes two 8-port The CSI-RS pattern allows full-power utilization, with allocating all 16-port CSI-RS on two consecutive OFDM symbols. Natural power boosting ratio for this pattern on each AP is 8 times, or 9 dB, because on every PRB no signals are transmitted on 7 REs for each antenna port, for FDM multiplexing of CSI-RS. When natural power boosting ratio is 9 dB, the CSI-RS power is 8 times larger than data power on an antenna port. In this case, imperfectness of hardware may introduce severe inter-modulation distortion and large portion of CSI-RS powers can leak on data REs, resulting in lower error vector magnitude (EVM) on the data REs. To prevent this inter-modulation distortion, one remedy would be to use 6 dB (or 4×) power boosting for CSI-RS, in which case eNB does not use full-power per OFDM symbol per CSI-RS antenna port (it is as good as losing 4 REs' power per PRB).

In some embodiment, this inter-modulation distortion issues are resolved. In an example with MNP=16, in which case the corresponding 16 CSI-RS REs are partitioned into two groups of 8 REs, wherein the first group is mapped onto a pair of two consecutive OFDM symbols; and the second group is mapped onto another distinct pair of two consecutive OFDM symbols. This way, a natural power boosting for CSI-RS is at most 9 dB, which prevents inter-modulation issues from happening.

FIGS. 10A and 10B illustrate alternative CSI-RS mapping patterns 1000, 1005 according to some embodiments of the present disclosure. The embodiment shown in FIG. 10 is for illustration only. Other embodiments could be used without departing from the scope of the present disclosure.

In the embodiments, two groups of 16-port CSI-RS are mapped onto REs in each pair of PRB, each corresponding to a 16-port CSI-RS resource, in such a way that natural power boosting ratio is at most 6 dB (or 4 times), so that inter-modulation distortion is tolerable. The full-power usage and natural power boosting of 6 dB can be done as in the same way as FIG. 8, because 8-port CSI-RS are mapped on a pair of consecutive OFDM symbols (OFDM symbols 5 and 6 in slot 0 and OFDM symbols 2 and 3 in slot 1 in case of the first CSI-RS resource), similarly to the Rel-10 8-port CSI-RS mapping. In the figure, CSI-RS for antenna ports a and b are CDM'ed (code-division multiplexed) on a pair of REs with spreading code of [1 1] and [1 −1].

In FIG. 10B, an eNB can configure both CSI-RS resources the first and the second CSI-RS resources in the same subframe with maintaining power boosting ratio of 6 dB as OFDM symbols 2 and 3 in slot 1 contain CSI-RS for antenna ports 8-15 only. In contrast, In FIG. 10A, the eNB can configure only either of the first and the second 16-port CSI-RS resources in a subframe if to maintain power boosting ratio of 6 dB, as the OFDM symbols 2 and 3 in slot 1 contain CSI-RS for antenna ports 0-15.

One potential issue of FIGS. 10A to 10B is power under-utilization of the antenna ports not having CSI-RS REs on the pair of CSI-RS OFDM symbols. To see this, consider CSI-RS AP 8 on OFDM symbols 5 and 6 in slot 0 in FIG. 10A. In those 4 subcarriers with CSI-RS, no signals are transmitted on CSI-RS AP 8; and hence out of 12 subcarriers in a PRB, 4 subcarriers will have zero power, which result in power under-utilization on AP 8.

FIGS. 11A to 11C illustrate alternative CSI-RS mapping patterns 1100, 1105, and 1110 generated according to some embodiments of the present disclosure. The embodiment shown in FIGS. 11A to 11C are for illustration only. Other embodiments could be used without departing from the scope of the present disclosure.

For each of the first and the second CSI-RS resource in the figure, four REs are grouped together and used for CDM multiplexing of CSI-RS of four APs. For example, when CSI-RS for antenna ports a, b, c, d are CDM multiplexed on those four REs labeled with a/b/c/d, the walsh covers are applied as in the following TABLE 2:

TABLE 2

| Antenna port number | CDM Walsh cover to apply on the four REs |
|---|---|
| a | [+1 +1 +1 +1] |
| b | [+1 −1 +1 −1] |
| c | [+1 −1 −1 +1] |
| d | [+1 +1 −1 −1] |

This pattern allows full-power utilization, and it does not suffer from 9 dB inter-modulation distortion issue.

Figures 12, 13:
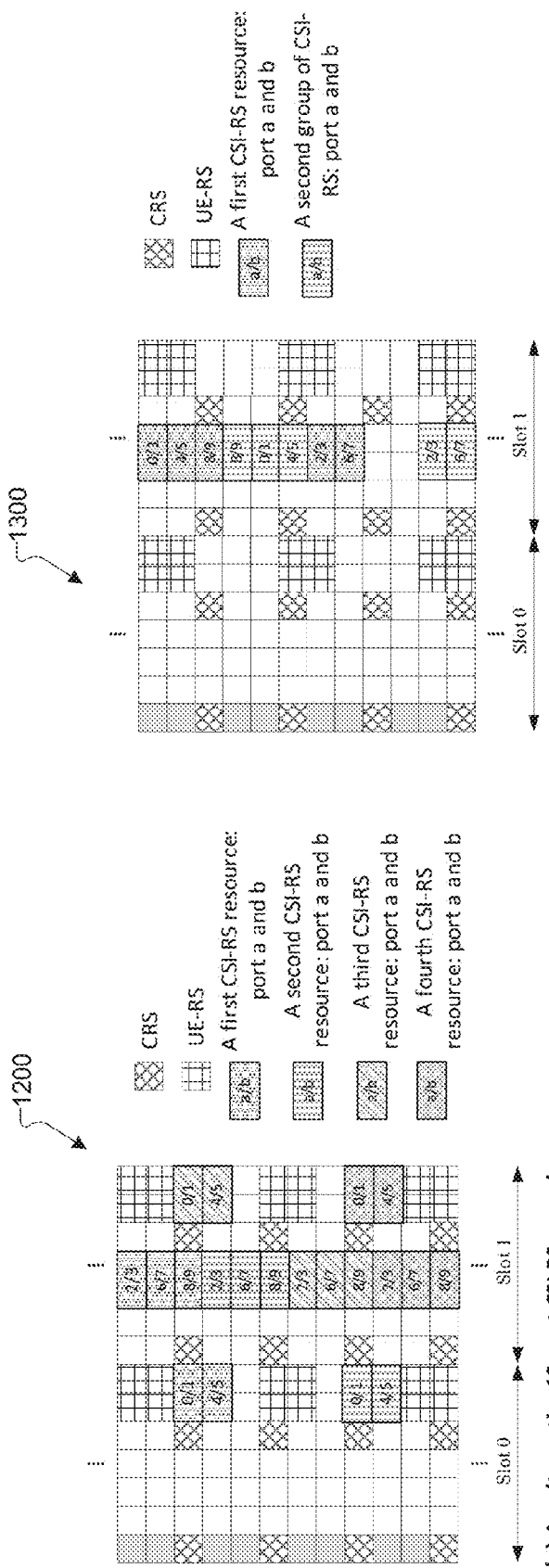
FIG. 12 illustrates an alternative 10-port CSI-RS mapping according to some embodiments of the present disclosure.
FIG. 13 illustrates an alternative 10-port CSI-RS mapping according to some embodiments of the present disclosure.
Figure 16:
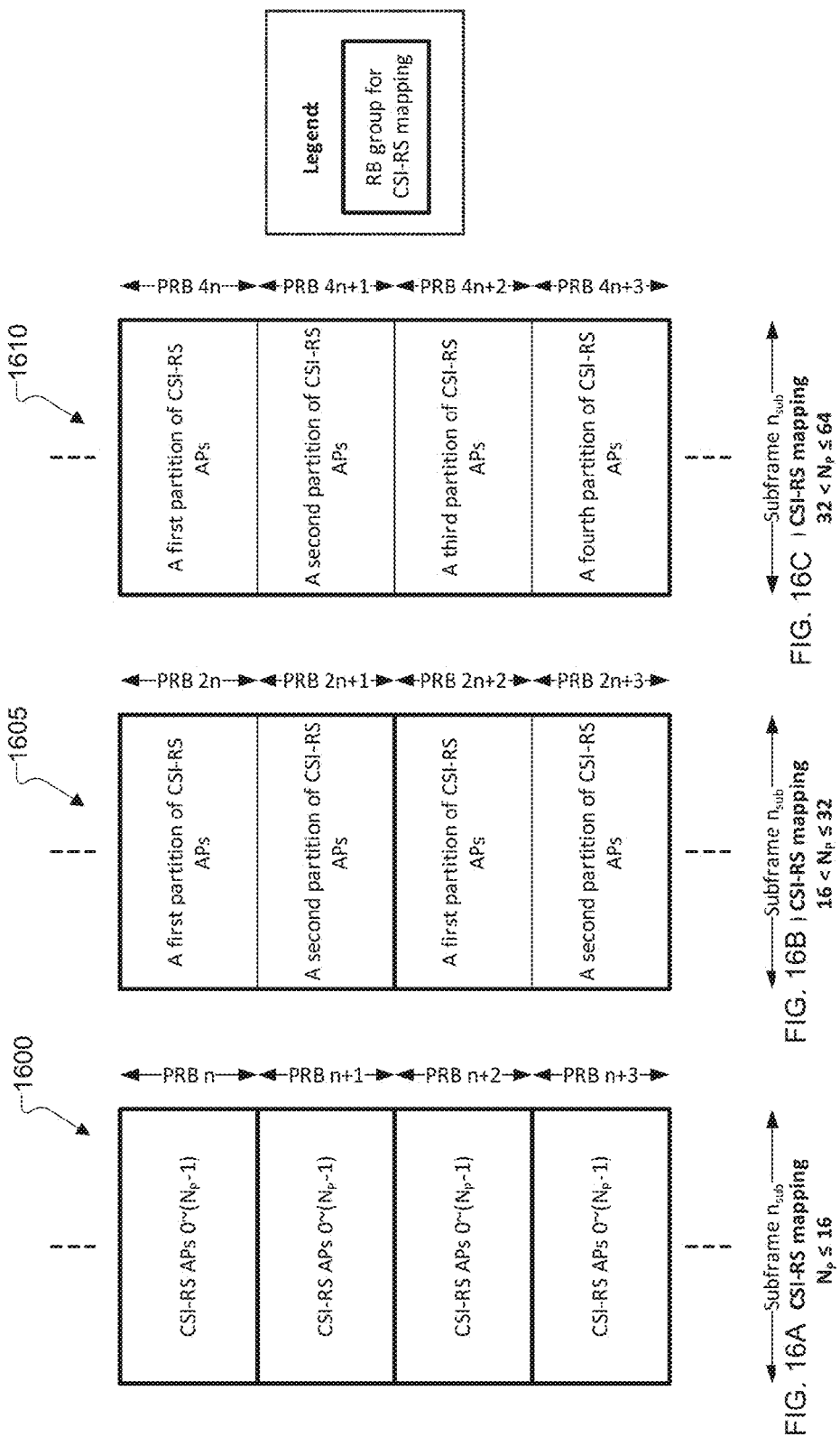
FIGS. 16A to 16C illustrate formation of RB groups for CSI-RS mapping according to some embodiments of the present disclosure.

FIG. 12 illustrates an alternative 10-port CSI-RS mapping 1200 according to some embodiments of the present disclosure. The embodiment shown in FIG. 12 is for illustration only. Other embodiments could be used without departing from the scope of the present disclosure.

In the embodiment, four groups of 10-port CSI-RS are mapped onto REs in each pair of PRB, each corresponding to a 10-port CSI-RS resource. Again, this has power under-utilization issue similarly to the embodiments related to FIG. 8.

FIG. 13 illustrates an alternative 10-port CSI-RS mapping 1300 according to some embodiments of the present disclosure. The embodiment shown in FIG. 13 is for illustration only. Other embodiments could be used without departing from the scope of the present disclosure. One potential issue with this pattern is 7 dB inter-modulation distortion; but this seems to be tolerable.

FIGS. 14A to 14B illustrate 32-port CSI-RS mapping patterns 1400, 1405 according to some embodiments of the present disclosure. The figures are just for illustration purpose, and it should be clear to person skilled in the art that the same principle applies to any even number of CSI-RS ports.

In FIG. 14A, a resource unit to map the 32-port CSI-RS is two frequency-domain consecutive PRB pairs 2n and 2n+1, where n=0, . . . , $N_{RB}^{DL}/2-1$ and $N_{RB}^{DL}$ is total number of PRBs in the DL bandwidth. The 32-port CSI-RS are partitioned into two groups of 16 ports each, and a first and a second groups of CSI-RS are respectively mapped onto PRB pairs 2n and 2n+1. The first group of CSI-RS are transmitted from TXRUs associated with a first polarization and the second group of CSI-RS are transmitted from TXRUs associated with a second polarization.

When CSI-RS antenna ports are indexed as in FIG. 14B, antenna ports 0-15 correspond to the first polarization and antenna ports 16-31 correspond to the second polarization. In this case, CSI-RS for antenna ports 0-15 are mapped onto PRB pair 2n and CSI-RS for antenna ports 16-31 are mapped onto PRB pair 2n+1.

The approach illustrated in FIG. 14B allows that the channel directions (e.g., the first PMI in the Rel-10 LTE 8-Tx codebook) are accurately estimated with the same-pol CSI-RS within each PRB. Co-phase estimation (e.g., the second PMI in the Rel-10 LTE 8-Tx codebook) may not be as reliable as the channel direction estimate; but as co-phase quantization is quite coarse (co-phase is quantized with QPSK alphabet); this is not likely to incur serious performance degradation.

One potential issue of the approach illustrated in FIG. 14A is inter-modulation issue; depending on the CSI-RS mapping pattern in each PRB, the natural boosting ratio for each CSI-RS port can be more than 6 dB.

In FIG. 14B, a resource unit to map the 32-port CSI-RS is two consecutive subframes n and n+1, where n is a subframe number. The 32-port CSI-RS are partitioned into two groups of 16 ports each, and a first and a second groups of CSI-RS are respectively mapped onto PRB pairs in subframe n and n+1. The first group of CSI-RS are transmitted from TXRUs associated with a first polarization and the second group of CSI-RS are transmitted from TXRUs associated with a second polarization.

When CSI-RS antenna ports are indexed as in FIG. 4B, antenna ports 0-15 correspond to the first polarization and antenna ports 16-31 correspond to the second polarization. In this case, CSI-RS for antenna ports 0-15 are mapped onto subframe n and CSI-RS for antenna ports 16-31 are mapped onto subframe n+1.

The approach illustrated in FIG. 14B allows that the channel directions (e.g., the first PMI in the Rel-10 LTE 8-Tx codebook) are accurately estimated with the same-pol CSI-RS within a single subframe. Co-phase estimation (e.g., the second PMI in the Rel-10 LTE 8-Tx codebook) may not be as reliable as the channel direction estimate. However, as co-phase quantization is quite coarse (co-phase is quantized with QPSK alphabet), and hence this method is not likely to incur serious performance degradation.

FIG. 15 illustrates an alternative 32-port CSI-RS mapping 1500 according to some embodiments of the present disclosure (e.g., FIG. 14A). CSI-RS for antenna ports 0-15 are mapped onto PRB 2n according to a mapping pattern, and CSI-RS for antenna ports 16-31 are mapped onto PRB 2n according to the same mapping pattern.

RB Group for CSI-RS Mapping

FIGS. 16A to 16C illustrate formation of RB groups for CSI-RS mapping 1600, 1605 and 1610 according to some embodiments of the present disclosure. Number of PRB pairs to comprise an RB group may be determined dependent upon $N_P$, wherein $N_P$ is the number of CSI-RS ports corresponding to a CSI-RS resource.

In some embodiments, in subframes configured for CSI reference signal transmission, the reference signal sequence $r_{l,n_s}(m)$ shall be mapped to complex-valued modulation symbols $a_{k,l}^{(p)}$ used as reference symbols on antenna port p according to:

$$a_{k,l}^{(p)} = w_{l''} \cdot r_{l,n_s}(m')$$

where $$l = 2 + l''$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

When $N_P \leq 16$, an RB group comprises 1 PRB pair. In this case $N_P$ port CSI-RS are mapped onto the one PRB pair.

Figure 17:
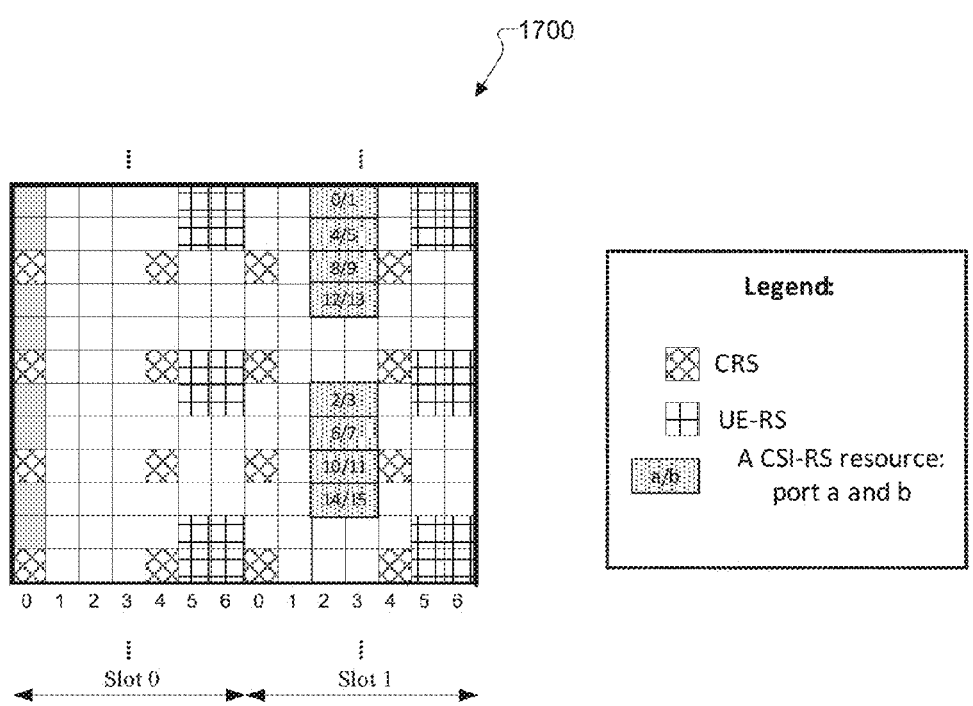
FIG. 17 illustrates an example CSI-RS mapping pattern constructed according to some embodiments of the present disclosure.
Figure 18:
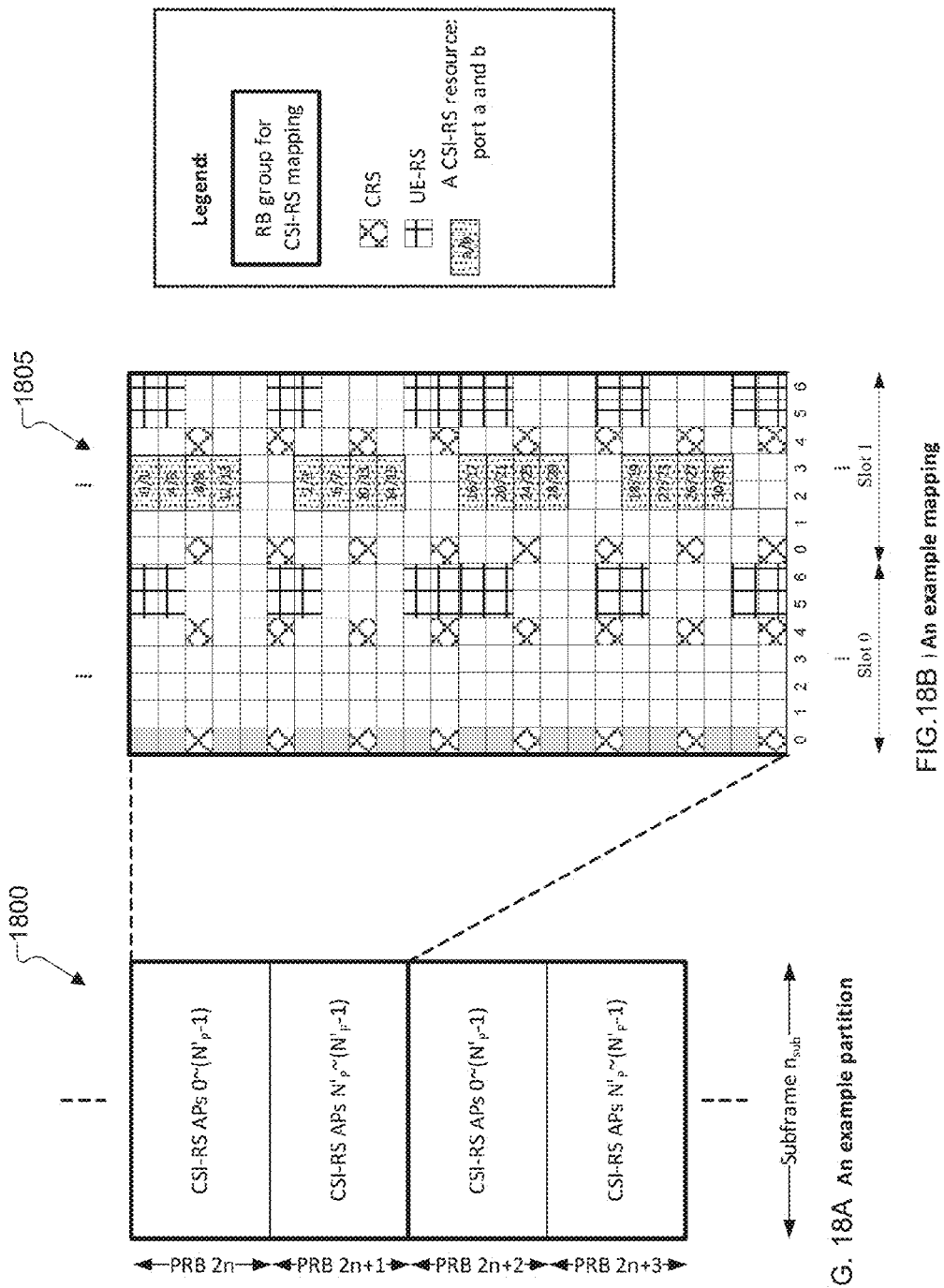
FIGS. 18A to 18B illustrate an example formation of RB group for CSI-RS mapping according to some embodiments of the present disclosure.
Figure 19:
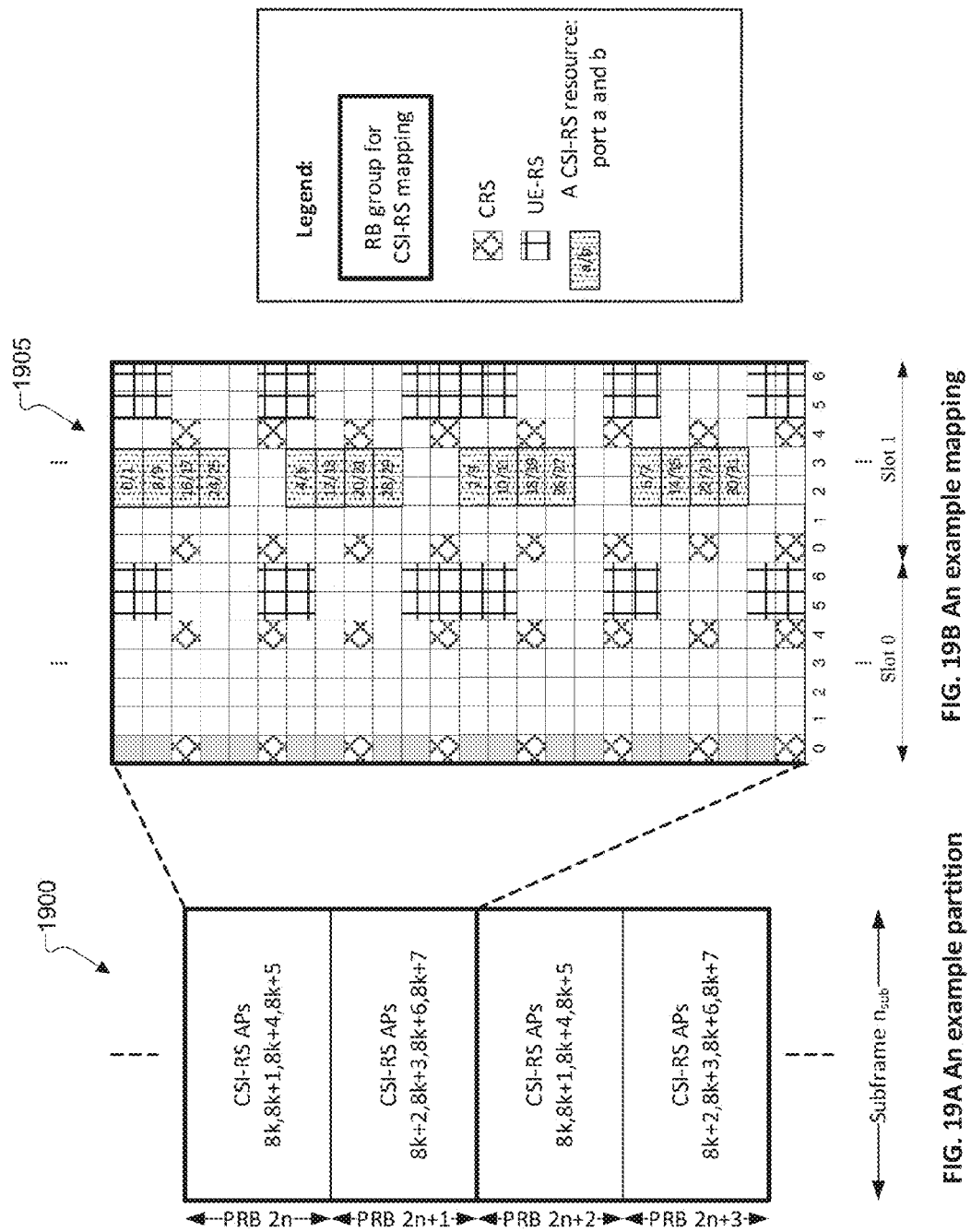
FIGS. 19A and 19B illustrate example formations of RB groups for CSI-RS mapping according to some embodiments of the present disclosure.
Figure 20:
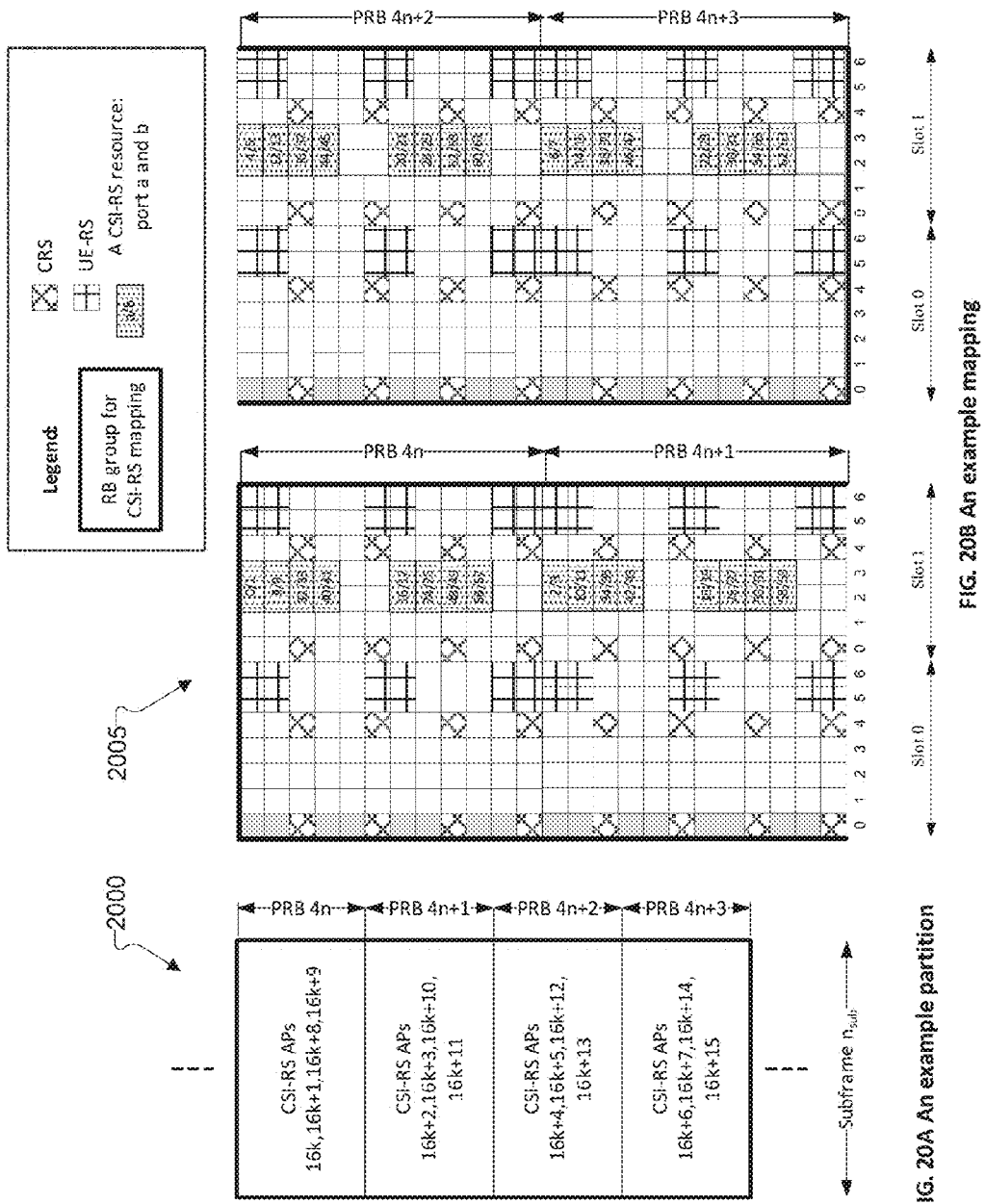
FIGS. 20A and 20B illustrate example formations of RB groups for CSI-RS mapping 4 according to some embodiments of the present disclosure.

FIG. 17 illustrates an example CSI-RS mapping pattern 1700 constructed according to some embodiments of the present disclosure. The embodiment shown in FIG. 17 is for illustration only. Other embodiments could be used without departing from the scope of the present disclosure.

In FIG. 17, each RB group comprises a single PRB pair, on which the 16 CSI-RS are mapped onto 16 REs on OFDM symbol 2 and 3 in slot 1, as illustrated in FIG. 17 12. In one method, the CSI-RS antenna port numbers 0, . . . , 15 in FIG. 17 correspond to LTE CSI-RS antenna port numbers p=15, 16, . . . , 30. In subframes configured for CSI reference signal transmission, the reference signal sequence $r_{l,n_s}(m)$ shall be mapped to complex-valued modulation symbols $a_{k,l}^{(p)}$ used as reference symbols on antenna port p, with $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -2 & \text{for } p \in \{23, 24\}, \text{ normal cyclic prefix} \\ -8 & \text{for } p \in \{25, 26\}, \text{ normal cyclic prefix} \\ -3 & \text{for } p \in \{27, 28\}, \text{ normal cyclic prefix} \\ -9 & \text{for } p \in \{29, 30\}, \text{ normal cyclic prefix} \end{cases}$$

$$w_{l''} = \begin{cases} 1 & p \in \{15, 17, 19, 21, 23, 25, 27, 29\} \\ (-1)^{l''} & p \in \{16, 18, 20, 22, 24, 26, 28, 30\} \end{cases}$$

FIGS. 18A to 18B illustrate an example formation of RB group 1800, 1805 for CSI-RS mapping—for $16 < N_P \leq 32$. The embodiment shown in FIGS. 18A to 18B are for illustration only. Other embodiments could be used without departing from the scope of the present disclosure.

When $16 < N_P \leq 32$, an RB group comprises 2 PRB pairs. $N_P$ port CSI-RS are partitioned into two groups of equal or similar number of CSI-RS antenna ports, and a first and a second group of CSI-RS are respectively mapped onto a first and a second PRB pairs (i.e., PRB 2n and 2n+1 or PRBs 2n+3 and 2n+4) comprising a RB group as illustrated in FIG. 11B.

In FIG. 18A, the first group comprises the first half number of CSI-RS (i.e., CSI-RS ports 0, ..., N'$_P$−1) and the second group comprises the second half number of CSI-RS (i.e., CSI-RS ports N'$_P$, N$_P$−1), wherein N'$_P$=N$_P$/2.

FIG. 18B illustrates an example 32-port CSI-RS mapping onto the RB group, according to the CSI-RS partition illustrated in FIG. 18A. The CSI-RS antenna port numbers p=15, 16, ..., 46 correspond to p'=0, ..., 31 in FIG. 18B, wherein p=15+p'. In these figure, two 8-port CSI-RS resources in each PRB pair are selected for mapping 16-port CSI-RS comprising a group of the partition. In FIG. 18B, the first 16 consecutively numbered ports are mapped onto the first PRB pair, and the second 16 consecutively numbered ports are mapped onto the second PRB pair. For one such CSI-RS mapping, the 32 CSI-RS are mapped onto 32 REs on OFDM symbol 2 and 3 in slot 1. In subframes configured for CSI reference signal transmission, the reference signal sequence $r_{l,n_s}(m)$ shall be mapped to complex-valued modulation symbols $a_{k,l}^{(p)}$ used as reference symbols on antenna port p, with:

FIGS. 19A and 19B illustrate example formations of RB groups 1900, 1905 for CSI-RS mapping for 16<N$_P$≤32 according to some embodiments of the present disclosure. The embodiment shown in FIGS. 19A and 19B are for illustration only. Other embodiments could be used without departing from the scope of the present disclosure.

In FIGS. 19A and 19B, the first group comprises CSI-RS ports corresponding to 8k, 8k+1, 8k+4 and 8k+5; and the second group comprises CSI-RS ports corresponding to 8k+2, 8k+3, 8k+6 and 8k+7, wherein k=0, ceil(N$_P$/8). This mapping can balance out the number of CSI-RS REs per PRB comprising a CSI-RS RB group, so that the least number of legacy CSI-RS resources are affected by the proposed CSI-RS mapping.

FIG. 19B illustrates an example 32-port CSI-RS mapping onto the RB group, according to the CSI-RS partition illustrated in FIG. 19B. The CSI-RS antenna port numbers p=15, 16, ..., 46 correspond to p'=0, ..., 31 in FIG. 19B, wherein p=15+p'. In these figure, two 8-port CSI-RS resources in each PRB pair are selected for mapping 16-port CSI-RS comprising a group of the partition. In FIG. 19B, CSI-RS ports p'=0, 1, 4, 5, 8, 9, 12,13, 16, 17, 20, 21, 24, 25, 28, 29 are mapped onto the first PRB pair, and CSI-RS ports p'=2, 3, 6, 7, 10, 11, 14, 15, 18, 19, 22, 23, 26, 27, 30, 31 are mapped onto the second PRB pair. For one such CSI-RS $$k = k' + 24m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -2 & \text{for } p \in \{23, 24\}, \text{ normal cyclic prefix} \\ -8 & \text{for } p \in \{25, 26\}, \text{ normal cyclic prefix} \\ -3 & \text{for } p \in \{27, 28\}, \text{ normal cyclic prefix} \\ -9 & \text{for } p \in \{29, 30\}, \text{ normal cyclic prefix} \end{cases}$$

$$k = k' + 24m + 12 + \begin{cases} -0 & \text{for } p \in \{31, 32\}, \text{ normal cyclic prefix} \\ -6 & \text{for } p \in \{33, 34\}, \text{ normal cyclic prefix} \\ -1 & \text{for } p \in \{35, 36\}, \text{ normal cyclic prefix} \\ -7 & \text{for } p \in \{37, 38\}, \text{ normal cyclic prefix} \\ -2 & \text{for } p \in \{39, 40\}, \text{ normal cyclic prefix} \\ -8 & \text{for } p \in \{41, 42\}, \text{ normal cyclic prefix} \\ -3 & \text{for } p \in \{43, 44\}, \text{ normal cyclic prefix} \\ -9 & \text{for } p \in \{45, 46\}, \text{ normal cyclic prefix} \end{cases}$$

$$w_{l'} = \begin{cases} 1 & p \in \{15, 17, 19, 21, 23, 25, 27, 29, 31, 33, 35, 37, 39, 41, 43, 45\} \\ (-1)^{l'''} & p \in \{16, 18, 20, 22, 24, 26, 28, 30, 32, 34, 36, 38, 40, 42, 44, 46\} \end{cases}$$

It is noted that these embodiments are just for illustration, and the same methods can be used for other number of CSI-RS ports N$_P$, such as when 32<N$_P$≤64, with portioning the number of CSI-RS ports into four groups of consecutively indiced CSI-RS ports.

mapping, the 32 CSI-RS are mapped onto 32 REs on OFDM symbol 2 and 3 in slot 1. In subframes configured for CSI reference signal transmission, the reference signal sequence $r_{l,n_s}(m)$ shall be mapped to complex-valued modulation symbols $a_{k,l}^{(p)}$ used as reference symbols on antenna port p, with:

$$k = k' + 24m + \begin{cases} -0 & \text{for } p \in \{15, 16\}, \text{ normal cyclic prefix} \\ -6 & \text{for } p \in \{19, 20\}, \text{ normal cyclic prefix} \\ -1 & \text{for } p \in \{23, 24\}, \text{ normal cyclic prefix} \\ -7 & \text{for } p \in \{27, 28\}, \text{ normal cyclic prefix} \\ -2 & \text{for } p \in \{31, 32\}, \text{ normal cyclic prefix} \\ -8 & \text{for } p \in \{35, 36\}, \text{ normal cyclic prefix} \\ -3 & \text{for } p \in \{39, 40\}, \text{ normal cyclic prefix} \\ -9 & \text{for } p \in \{43, 44\}, \text{ normal cyclic prefix} \end{cases}$$

$$k = k' + 24m + 12 + \begin{cases} -0 & \text{for } p \in \{17, 18\}, \text{ normal cyclic prefix} \\ -6 & \text{for } p \in \{21, 22\}, \text{ normal cyclic prefix} \\ -1 & \text{for } p \in \{25, 26\}, \text{ normal cyclic prefix} \\ -7 & \text{for } p \in \{29, 30\}, \text{ normal cyclic prefix} \\ -2 & \text{for } p \in \{33, 34\}, \text{ normal cyclic prefix} \\ -8 & \text{for } p \in \{37, 38\}, \text{ normal cyclic prefix} \\ -3 & \text{for } p \in \{41, 42\}, \text{ normal cyclic prefix} \\ -9 & \text{for } p \in \{45, 46\}, \text{ normal cyclic prefix} \end{cases}$$

$$w_{l'} = \begin{cases} 1 & p \in \{15, 17, 19, 21, 23, 25, 27, 29, 31, 33, 35, 37, 39, 41, 43, 45\} \\ (-1)^{l''} & p \in \{16, 18, 20, 22, 24, 26, 28, 30, 32, 34, 36, 38, 40, 42, 44, 46\} \end{cases}$$

FIGS. 20A and 20B illustrates example formations 2000, 2005 of RB groups for CSI-RS mapping—for $32 < N_P \leq 64$ according to some embodiments of the present disclosure. The embodiment shown in FIGS. 20A and 20B are for illustration only. Other embodiments could be used without departing from the scope of the present disclosure.

In FIG. 20A, the first group comprises CSI-RS ports corresponding to 16k, 16k+1, 16k+8 and 16k+9; the second group comprises CSI-RS ports corresponding to 16k+3, 16k+4, 16k+10 and 16k+11; the third group comprises CSI-RS ports corresponding to 16k+5, 16k+6, 16k+12 and 16k+13; the fourth group comprises CSI-RS ports corresponding to 16k+7, 16k+8, 16k+14 and 16k+15, wherein k=0, ceil($N_P$/16). This mapping can balance out the number of CSI-RS REs per PRB comprising a CSI-RS RB group, so that the least number of legacy CSI-RS resources are affected by the proposed CSI-RS mapping.

FIG. 20B illustrates an example 32-port CSI-RS mapping onto the RB group, according to the CSI-RS partition illustrated in FIG. 20A. The CSI-RS antenna port numbers p=15, 16, . . . , 78 correspond to p'=0, . . . , 63 in FIG. 20B, wherein p=15+p'. In these figure, two 8-port CSI-RS resources in each PRB pair are selected for mapping 16-port CSI-RS comprising a group of the partition. For one such CSI-RS mapping, the 64 CSI-RS are mapped onto 64 REs on OFDM symbol 2 and 3 in slot 1. In subframes configured for CSI reference signal transmission, the reference signal sequence $r_{l,n_s}(m)$ shall be mapped to complex-valued modulation symbols $a_{k,l}^{(p)}$ used as reference symbols on antenna port p, with:

$$k = k' + 48m + \begin{cases} -0 & \text{for } p \in \{15, 16\}, \text{ normal cyclic prefix} \\ -6 & \text{for } p \in \{23, 24\}, \text{ normal cyclic prefix} \\ -1 & \text{for } p \in \{31, 32\}, \text{ normal cyclic prefix} \\ -7 & \text{for } p \in \{39, 40\}, \text{ normal cyclic prefix} \\ -2 & \text{for } p \in \{47, 48\}, \text{ normal cyclic prefix} \\ -8 & \text{for } p \in \{55, 56\}, \text{ normal cyclic prefix} \\ -3 & \text{for } p \in \{63, 64\}, \text{ normal cyclic prefix} \\ -9 & \text{for } p \in \{71, 72\}, \text{ normal cyclic prefix} \end{cases}$$

$$k = k' + 48m + 12 + \begin{cases} -0 & \text{for } p \in \{17, 18\}, \text{ normal cyclic prefix} \\ -6 & \text{for } p \in \{25, 26\}, \text{ normal cyclic prefix} \\ -1 & \text{for } p \in \{33, 34\}, \text{ normal cyclic prefix} \\ -7 & \text{for } p \in \{41, 42\}, \text{ normal cyclic prefix} \\ -2 & \text{for } p \in \{49, 50\}, \text{ normal cyclic prefix} \\ -8 & \text{for } p \in \{57, 58\}, \text{ normal cyclic prefix} \\ -3 & \text{for } p \in \{65, 66\}, \text{ normal cyclic prefix} \\ -9 & \text{for } p \in \{73, 74\}, \text{ normal cyclic prefix} \end{cases}$$

$$k = k' + 48m + 24 + \begin{cases} -0 & \text{for } p \in \{19, 20\}, \text{ normal cyclic prefix} \\ -6 & \text{for } p \in \{27, 28\}, \text{ normal cyclic prefix} \\ -1 & \text{for } p \in \{35, 36\}, \text{ normal cyclic prefix} \\ -7 & \text{for } p \in \{43, 44\}, \text{ normal cyclic prefix} \\ -2 & \text{for } p \in \{51, 52\}, \text{ normal cyclic prefix} \\ -8 & \text{for } p \in \{59, 60\}, \text{ normal cyclic prefix} \\ -3 & \text{for } p \in \{67, 68\}, \text{ normal cyclic prefix} \\ -9 & \text{for } p \in \{75, 76\}, \text{ normal cyclic prefix} \end{cases}$$

$$k = k' + 48m + 32 + \begin{cases} -0 & \text{for } p \in \{21, 22\}, \text{ normal cyclic prefix} \\ -6 & \text{for } p \in \{29, 30\}, \text{ normal cyclic prefix} \\ -1 & \text{for } p \in \{37, 38\}, \text{ normal cyclic prefix} \\ -7 & \text{for } p \in \{45, 46\}, \text{ normal cyclic prefix} \\ -2 & \text{for } p \in \{53, 54\}, \text{ normal cyclic prefix} \\ -8 & \text{for } p \in \{61, 62\}, \text{ normal cyclic prefix} \\ -3 & \text{for } p \in \{69, 70\}, \text{ normal cyclic prefix} \\ -9 & \text{for } p \in \{77, 78\}, \text{ normal cyclic prefix} \end{cases}$$

The subframe configuration period T CSI-RS and the subframe offset $\Delta_{CSI\text{-}RS}$ for the occurrence of CSI reference signals are listed in TABLE 3. The parameter $I_{CSI\text{-}RS}$ can be configured separately for CSI reference signals for which the UE shall assume non-zero and zero transmission power. Subframes containing CSI reference signals shall satisfy $(10n_f+\lfloor n_s/2 \rfloor - \Delta_{CSI\text{-}RS}) \bmod T_{CSI\text{-}RS}=0$.

TABLE 3

CSI reference signal subframe configuration

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
|---|---|---|
| 0-4 | 5 | $I_{CSI\text{-}RS}$ |
| 5-14 | 10 | $I_{CSI\text{-}RS}$-5 |
| 15-34 | 20 | $I_{CSI\text{-}RS}$-15 |
| 35-74 | 40 | $I_{CSI\text{-}RS}$-35 |
| 75-154 | 80 | $I_{CSI\text{-}RS}$-75 |

In some embodiments, a composite CSI-RS resource is configured to a UE, with signaling a number ($N_R$) of up-to-8-port component CSI-RS resources in the higher layer. The number of CSI-RS ports for the composite CSI-RS resource is denoted by $N_{CSIRS}$, for example, $N_{CSI\text{-}RS}$=8, 12 or 16.

This composite CSI-RS resource can be used for non-precoded (NP) CSI-RS operation and also for beamformed CSI-RS transmissions, e.g., for enhanced virtual sectorization (EVS) operation.

In one method, for EVS, these $N_R$ component CSI-RS resources may be configured for supporting $N_R$ virtual sectors. When configured with these $N_R$ component CSI-RS resources for beamformed CSI-RS based operations, the UE would report selected resource index (which may be also called as beam index, or BI) and CSI (PMI/CQI/RI) estimated on the selected CSI-RS resource.

In one method, the UE is configured to aggregate these $N_R$ component CSI-RS resources to comprise a composite $N_{CSIRS}$ port CSI-RS resource. The antenna ports in the component resources can sequentially be mapped to the antenna ports in the composite resource. It is noted that this resource/port aggregation can apply for both NP and BF CSI-RS.

The following contents may be agreed:
CSI reporting with PMI
A CSI process can be configured with either of two CSI reporting classes, A or B (FFS: both A and B):
Class A, UE reports CSI according to W=W1W2 codebook based on {[8],12,16} CSI-RS ports
In one method, if the UE is configured with CSI reporting class A, the UE is configured to apply resource/port aggregation.

In one example, $N_R$=4 and each CSI-RS resource comprises 4-port CSI-RS; then the $N_{CSIRS}$=16 CSI-RS ports of the composite CSI-RS resource can be mapped from the antenna ports in the four component resources according to TABLE 4:

TABLE 4

Antenna port mapping of the composite resource from the component resources

| Antenna ports in the component resources, p' | Antenna ports in the composite resources, p |
|---|---|
| 15, 16, 17, 18 on the 1$^{st}$ resource | 15, 16, 17, 18 |
| 15, 16, 17, 18 on the 2$^{nd}$ resource | 19, 20, 21, 22 |
| 15, 16, 17, 18 on the 3$^{rd}$ resource | 23, 24, 25, 26 |
| 15, 16, 17, 18 on the 4$^{th}$ resource | 27, 28, 29, 30 |

In one example, $N_R$=4 and each CSI-RS resource comprises 2-port CSI-RS; then the $N_{CSIRS}$=8 CSI-RS ports of the composite CSI-RS resource can be mapped from the antenna ports in the four component resources according to TABLE 5:

TABLE 5

Antenna port mapping of the composite resource from the component resources

| Antenna ports in the component resources, p' | Antenna ports in the composite resources, p |
|---|---|
| 15, 16 on the 1$^{st}$ resource | 15, 16 |
| 15, 16 on the 2$^{nd}$ resource | 17, 18 |
| 15, 16 on the 3$^{rd}$ resource | 19, 20 |
| 15, 16 on the 4$^{th}$ resource | 21, 22 |

In another example, $N_R$=2 and each CSI-RS resource comprises 8-port CSI-RS; then the $N_{CSIRS}$=16 CSI-RS ports of the composite CSI-RS resource can be mapped from the antenna ports in the four component resources according to TABLE 6:

TABLE 6

Antenna port mapping of the composite resource from the component resources

| Antenna ports in the component resources, p' | Antenna ports in the composite resources, p |
|---|---|
| 15-22 on the 1$^{st}$ resource | 15-22 |
| 15-22 on the 2$^{nd}$ resource | 23-30 |

In one example, $N_R$=3 and each CSI-RS resource comprises 4-port CSI-RS; then the $N_{CSIRS}$=12 CSI-RS ports of the composite CSI-RS resource can be mapped from the antenna ports in the four component resources according to TABLE 7:

TABLE 7

Antenna port mapping of the composite resource from the component resources

| Antenna ports in the component resources, p' | Antenna ports in the composite resources, p |
|---|---|
| 15, 16, 17, 18 on the 1$^{st}$ resource | 15, 16, 17, 18 |
| 15, 16, 17, 18 on the 2$^{nd}$ resource | 19, 20, 21, 22 |
| 15, 16, 17, 18 on the 3$^{rd}$ resource | 23, 24, 25, 26 |

In one example, $N_R$ is up to 8 and an i-th CSI-RS resource comprises $N_{CSIRS,i}$-port CSI-RS; then the antenna port numbers of the composite CSI-RS resource can be determined with the antenna ports numbers in the component resources and component resource indices according to TABLE 8. In a special case, $N_{CSIRS,i}$'s are all the same as $N_{CSIRS}$=1, 2, 4, 8 for all i.

Example 1

If two 8-port CSI-RS are aggregated to comprise a 16-port CSI-RS, REs for antenna ports 15-23 of the first component CSI-RS resource are used to map antenna ports 15-23 of the aggregated CSI-RS resource, and REs for antenna ports 15-23 of the second component CSI-RS resource are used to map antenna ports 24-30 of the aggregated CSI-RS resource.

Example 2

If two 8-port CSI-RS are aggregated to comprise a 12-port CSI-RS, REs for antenna ports 15-21 of the first component CSI-RS resource are used to map antenna ports 15-21 of the aggregated CSI-RS resource, and REs for antenna ports 15-21 of the second component CSI-RS resource are used to map antenna ports 21-26 of the aggregated CSI-RS resource.

(k', l')'s for CSI-RS RE mapping is obtained per component CSI-RS resource n, according to TABLE 1, and are denoted as $(k'_n, l'_n)$.

l indices for the antenna ports in a composite CSI-RS resource corresponding to component CSI-RS resource n are obtained according to:

$$l = l'_n + \begin{cases} l'' & CSI \text{ reference signal configurations 0-19, normal cyclic prefix} \\ 2l'' & CSI \text{ reference signal configurations 20-31, normal cyclic prefix ; and} \\ l'' & CSI \text{ reference signal configurations 0-27, extended cyclic prefix} \end{cases}$$

$$l'' = 0, 1.$$

k indices for the antenna ports in a composite CSI-RS resource corresponding to component CSI-RS resource n are obtained according to:

$$k = k'_n + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

TABLE 8

Antenna port numbers after CSI-RS resource aggregation

| Component CSI-RS resource index n | Antenna port numbers in the component resource, p' | Antenna port numbers in the aggregated resource, p |
|---|---|---|
| 1 | $15, 16, \ldots, 14 + N_{CSIRS, 1}$ | $15, 16, \ldots, 14 + N_{CSIRS, 1}$ |
| 2 | $15, 16, \ldots, 14 + N_{CSIRS, 2}$ | $15 + N_{CSIRS, 1}, \ldots, 14 + \Sigma_{i=1}^{2} N_{CSIRS, i}$ |
| 3 | $15, 16, \ldots, 14 + N_{CSIRS, 3}$ | $15 + \Sigma_{i=1}^{2} N_{CSIRS, i}, \ldots, 14 + \Sigma_{i=1}^{3} N_{CSIRS, i}$ |
| 4 | $15, 16, \ldots, 14 + N_{CSIRS, 4}$ | $15 + \Sigma_{i=1}^{3} N_{CSIRS, i}, \ldots, 14 + \Sigma_{i=1}^{4} N_{CSIRS, i}$ |
| 5 | $15, 16, \ldots, 14 + N_{CSIRS, 5}$ | $15 + \Sigma_{i=1}^{4} N_{CSIRS, i}, \ldots, 14 + \Sigma_{i=1}^{5} N_{CSIRS, i}$ |
| 6 | $15, 16, \ldots, 14 + N_{CSIRS, 6}$ | $15 + \Sigma_{i=1}^{5} N_{CSIRS, i}, \ldots, 14 + \Sigma_{i=1}^{6} N_{CSIRS, i}$ |
| 7 | $15, 16, \ldots, 14 + N_{CSIRS, 7}$ | $15 + \Sigma_{i=1}^{6} N_{CSIRS, i}, \ldots, 14 + \Sigma_{i=1}^{7} N_{CSIRS, i}$ |
| 8 | $15, 16, \ldots, 14 + N_{CSIRS, 8}$ | $15 + \Sigma_{i=1}^{7} N_{CSIRS, i}, \ldots, 14 + \Sigma_{i=1}^{8} N_{CSIRS, i}$ |

The total number of CSI-RS ports in a composite resource is $\Sigma_{i=1}^{8} N_{CSIRS,i}$. In some embodiments, UE is not expected to be configured more than $\Sigma_{i=1}^{8} N_{CSIRS,i}=16$ antenna ports.

In a special case where $N_{CSIRS}$ are the same across all the CSI-RS resources, TABLE 8 reduces to TABLE 9. It is also noted that the total 8 number of CSI-RS resources in these embodiments are just for illustration, and the principles of the embodiments can be easily extended with arbitrary total number of CSI-RS resources.

TABLE 9

Antenna port numbers after CSI-RS resource aggregation

| Component CSI-RS resource index n | Antenna port numbers in the component resource, p' | Antenna port numbers in the aggregated resource, p |
|---|---|---|
| 1 | 15, 16, . . . , 14 + $N_{CSIRS}$ | 15, 16, . . . , 14 + $N_{CSIRS}$ |
| 2 | 15, 16, . . . , 14 + $N_{CSIRS}$ | 15 + $N_{CSIRS}$, . . . , 14 + 2$N_{CSIRS}$ |
| 3 | 15, 16, . . . , 14 + $N_{CSIRS}$ | 15 + 2$N_{CSIRS}$, . . . , 14 + 3$N_{CSIRS}$ |
| 4 | 15, 16, . . . , 14 + $N_{CSIRS}$ | 15 + 3$N_{CSIRS}$, . . . , 14 + 4$N_{CSIRS}$ |
| 5 | 15, 16, . . . , 14 + $N_{CSIRS}$ | 15 + 4$N_{CSIRS}$, . . . , 14 + 5$N_{CSIRS}$ |
| 6 | 15, 16, . . . , 14 + $N_{CSIRS}$ | 15 + 5$N_{CSIRS}$, . . . , 14 + 6$N_{CSIRS}$ |
| 7 | 15, 16, . . . , 14 + $N_{CSIRS}$ | 15 + 6$N_{CSIRS}$, . . . , 14 + 7$N_{CSIRS}$ |
| 8 | 15, 16, . . . , 14 + $N_{CSIRS}$ | 15 + 7$N_{CSIRS}$, . . . , 14 + 8$N_{CSIRS}$ |

In one method, CDM-4 is applied across (2a−1)-th and (2a)-th CSI-RS resources, wherein a is a positive integer. When each CSI-RS resource comprises 2 CSI-RS ports, the 2 pairs of 2 CSI-RS REs are used for multiplexing the 2 pairs of 2 CSI-RS ports, with CDM-4. When each CSI-RS resource comprise 4 CSI-RS ports whose CSI-RS are mapped on 2 subcarriers, the 2 pairs of 2 CSI-RS REs on their respective b-th subcarriers of the two resources are used for multiplexing the 2 pairs of 2 CSI-RS ports, with CDM-4, where b=1, 2. When each CSI-RS resource comprise 8 CSI-RS ports whose CSI-RS are mapped on 4 subcarriers, the 2 pairs of 2 CSI-RS REs on their respective b-th subcarriers of the two resources are used for multiplexing the 2 pairs of 2 CSI-RS ports, with CDM-4, where b=1, 2, 3, 4.

In one method, whether or not to apply CDM-4 is configured by higher layer.

In one method, application of CDM-4 is allowed only for the case where each CSI-RS resource comprising a composite CSI-RS resource comprises 2 CSI-RS ports.

In subframes configured for CSI reference signal transmission, the reference signal sequence $r_l$ (m) shall be mapped to complex-valued modulation symbols $a_{k,l}^{(p)}$ used as reference symbols on antenna port p, according to:

$$a_{k,l}^{(p)} = w_p(i) \cdot r_{l,n_s}(m'),$$

where:

$i = 2k'' + l''$ $l'' = 0, 1$ $m = 0, 1, \ldots, N_{RB}^{DL} - 1$ $m' = m + \left\lfloor \dfrac{N_{RB}^{max,DL} - N_{RB}^{DL}}{2} \right\rfloor$ k" indices corresponding to k for each antenna port in a component CSI-RS resource n are obtained as listed in TABLE 10:

TABLE 10

| k | Component CSI-RS resource index n | k" |
|---|---|---|
| k for antenna port number p = 15, 16 | 1, 3, 5, 7<br>2, 4, 6, 8 | 0<br>1 |
| k for antenna port number p = 17, 18 | 1, 3, 5, 7<br>2, 4, 6, 8 | 1<br>0 |

TABLE 10-continued

| k | Component CSI-RS resource index n | k" |
|---|---|---|
| k for antenna port number p = 19, 20 | 1, 3, 5, 7<br>2, 4, 6, 8 | 0<br>1 |
| k for antenna port number p = 21, 22 | 1, 3, 5, 7<br>2, 4, 6, 8 | 1<br>0 |

CDM Walsh cover to apply on the four REs [$w_p(0)$, $w_p(1)$, $w_p(2)$, $w_p(3)$] are obtained as:

TABLE 11

| Antenna port number (p) | CDM Walsh cover to apply on the four REs [$w_p(0)$, $w_p(1)$, $w_p(2)$, $w_p(3)$] |
|---|---|
| 15, 19, 23, 27 | [+1 +1 +1 +1] |
| 16, 20, 24, 28 | [+1 −1 +1 −1] |
| 17, 21, 25, 29 | [+1 +1 −1 −1] |
| 18, 22, 26, 30 | [+1 −1 −1 +1] |

The necessary conditions on $n_s$ is given by Table 6.10.5.2-2 in 3GPPTS36.211 for normal and extended cyclic prefix, respectively.

In one method, the UE is configured to report the CSI (PMI/CQI/RI, or BI/PMI/CQI/RI) estimated (measured) on the $N_{CSIRS}$ port CSI-RS, aggregated from the multiple component resources.

When BI/PMI/CQI/RI is reported, in particular, BI indicates those groups of antenna ports corresponding to the selected component resource, and PMI/CQI/RI is estimated with the CSI-RS on the selected component resource. In this case, number of antenna ports to derive the PMI is the same as the number of CSI-RS ports configured on the selected component resource.

In one method, the UE can be configured whether or not to report BI by a higher layer parameter, e.g., reportBI. If reportBI is configured (or if reportBI is TRUE), the UE is configured to report BI/PMI/CQI/RI according to some embodiments of the present disclosure. If reportBI is not configured (or if reportBI is FALSE), the UE is configured to report PMI/CQI/RI on the aggregated CSI-RS antenna ports.

In one method, the numbers of antenna ports configured for the $N_R$ up-to-8-port CSI-RS resources to comprise a composite CSI-RS resource are constrained to be all the same. When denoting the number of antenna ports configured for the up-to-8-port CSI-RS resource as $N_C$, the following relation hold: $N_{CSIRS}=N_C \cdot N_R$. This method is motivated to maintain signaling complexity and overhead small and to use the signaling method for both BF and NP CSI-RS based operations.

In one example, a 16-port composite CSI-RS resource is configured in terms of four 4 port CSI-RS resources; or two 8 port CSI-RS resources.

In another example, a 12-port composite CSI-RS resource is configured in terms of three 4 port CSI-RS resources.

In this case, the RRC information element (IE) of the composite CSI-RS requires only a single information field of a CSI-RS port count for all of the component CSI-RS resources. An example construction of the CompositeCSI-RS-ConfigNZP is shown below according to these embodiments. Below, the total number of antenna ports for the composite CSI-RS resource will be a product of the number configured with antennaPortsCount and the number of component CSI-RS resources (can be 1-4 in this example). It is noted that the UE can be configured with up to 4 CSI-RS resources to comprise a composite CSI-RS resource in this example.

In addition, a new field "CSI-RS-ResourceType" can be configured in the CompositeCSI-RS-ConfigNZP to indicate whether the UE should report PMI/CQI/RI only or BI/PMI/CQI/RI. If the UE is configured with NP CSI-RS, the UE reports PMI/CQI/RI; on the other hand, if the UE is configured with the BF CSI-RS, the UE reports BI/PMI/CQI/RI.

```
CompositeCSI-RS-ConfigNZP ::=    SEQUENCE {
    csi-RS-ConfigNZPId           CSI-RS-ConfigNZPId,
    antennaPortsCount            ENUMERATED {an1, an2, an4, an8},
    first-CSIRS-resource             resourceConfig,
    second-CSIRS-resource            optional(resourceConfig),
    third-CSIRS-resource         optional(resourceConfig),
    fourth-CSIRS-resource        optional(resourceConfig),
    CSI-RS-ResourceType          ENUMERATED{BF,NP},
    subframeConfig               INTEGER (0..154),
    scramblingIdentity           INTEGER (0..503),
    qcl-CRS-Info                 SEQUENCE {...
    ...
}
```

In some embodiments, the UE is not expected to be configured with the same resource index numbers (resource-Config numbers) for the component resources to comprise a composite CSI-RS resource.

In some embodiments, the composite CSI-RS resource is configured in terms of the legacy CSI-RS resources, i.e., CSI-RS-ConfigNZP, as shown below:

```
CompositeCSI-RS-ConfigNZP ::=    SEQUENCE {
    first-CSIRS-resource         CSI-RS-ConfigNZP,
    second-CSIRS-resource            optional(CSI-RS-ConfigNZP),
    third-CSIRS-resource         optional(CSI-RS-ConfigNZP),
    fourth-CSIRS-resource        optional(CSI-RS-ConfigNZP),
    CSI-RS-ResourceType          ENUMERATED{BF,NP},
}
```

Figure 21:
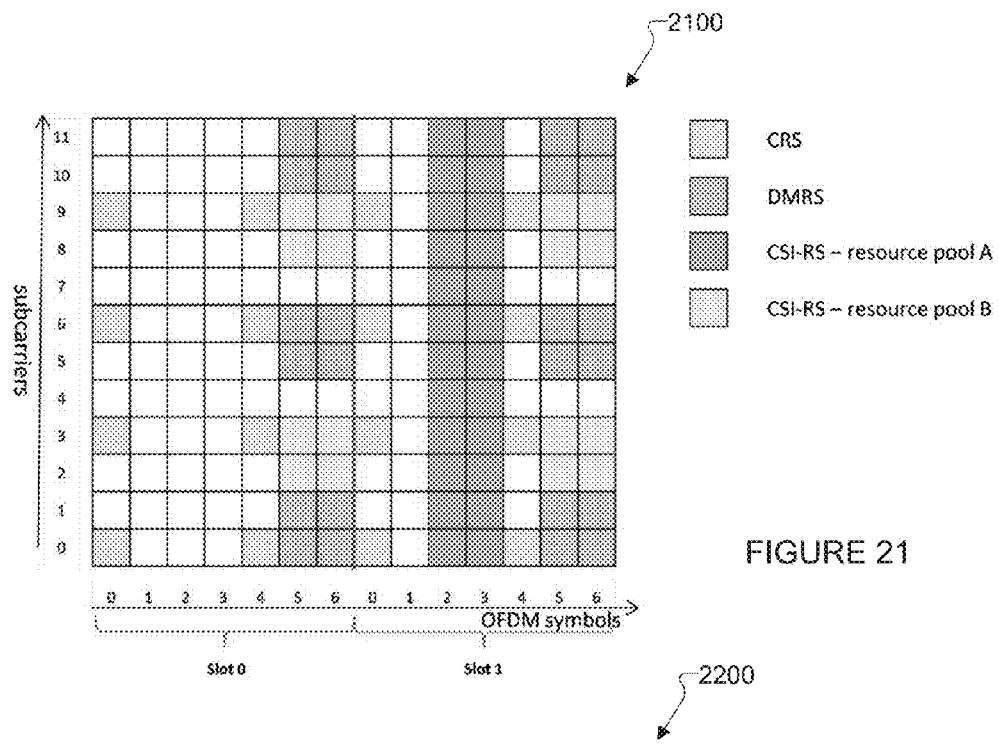
FIG. 21 illustrates CSI-RS resource pools according to embodiments of the present disclosure.

FIG. 21 illustrates CSI-RS resource pools 2100 according to embodiments of the present disclosure. The embodiment shown in FIG. 21 is for illustration only. Other embodiments could be used without departing from the scope of the present disclosure.

In some embodiments, a composite CSI-RS resource comprising $N_{CSIRS}$ ports is configured by means of two component resources, a first and a second component resource comprising $N_1$ and $N_2$ ports, where $N_{CSIRS}=N_1+N_2$.

The first and the second component resources are either respectively selected from a first and a second resource pools, or both selected from the first resource pool. Here, each resource pool comprises a number of CSI-RS configuration indices in TABLE 1.

In one method, for the power balancing and full power utilization, the first resource pool and the second resource pool can be constructed such that the OFDM symbols for CSI-RS RE mapping of the first component resource are different from those OFDM symbols of the second component resource. In addition, the first resource pool may comprise those CSI-RS resources on OFDM symbols 2 and 3 in slot 1, so that when both component resources are selected from the first resource pool CDM-4 can give full power utilization.

As shown in FIG. 21, two resource pools are formed, pools A and B. Pool A corresponds to CSI-RS resources whose CSI-RS are mapped onto OFDM symbols 2 and 3 in the second slot (slot 1) of a subframe. Pool B corresponds to CSI-RS resources whose CSI-RS are mapped onto OFDM symbols 5 and 6 in both slots (slots 0 & 1) of a subframe.

According to the principle, for $N_{CSIRS}=16$ and $N_{CSIRS}=12$ port mapping, it is proposed that: the first resource pool (resource pool A) comprises CSI-RS configuration index $\{1,2,3\}$ for $N_2=8$ CSI-RS ports; and the second resource pool (resource pool B) comprises CSI-RS configuration index $\{0,4\}$ for $N_1=8$ CSI-RS ports, wherein the resource index and corresponding resource mapping is based upon TABLE 1.

In one method, for 16-port mapping, CDM-4 Walsh covers are applied to multiplex 4-port CSI-RS across 4 CSI-RS REs of the two component resources on each of the first, the second, the third and the fourth subcarriers.

In one method, for 12-port mapping, CDM-4 Walsh covers are applied to multiplex 4-port CSI-RS across 4 CSI-RS REs of the two component resources on each of the first, the second and the third subcarriers.

In one example construction illustrated in FIG. 24 2-8, two legacy 8-port CSI-RS resources are aggregated for 16-port CSI-RS mapping, and CDM-4 is applied in the time domain, across those REs labeled with the same alphabet, one of 'A', 'B', 'C' and 'D'. For 12-port CSI-RS mapping, REs labeled with 'A', 'B' and 'C' can be used for the RE mapping.

Antenna port numbering and RE mapping for the aggregated resource can be performed according to TABLE 8 or TABLE 9. For the 12-port mapping, although the two S-port legacy resources are configured, it should be assumed that $N_{CSIRS,1}=N_{CSIRS,2}=6$ for the antenna port numbering and RE mapping purpose, so that CDM-4 is properly applied across the time domain.

In another method, CDM-4 Walsh covers are applied across each group of 4 CSI-RS REs of each 8-port component resource, wherein each 8-port component resource is partitioned into two groups. In one method, one CDM group comprises antenna ports $\{15, 16, 17, 18\}$ and the other CDM group comprises antenna ports $\{19, 20, 21, 22\}$. In another method, one CDM group comprises antenna ports $\{15, 16, 19, 20\}$ and the other comprises antenna ports $\{17, 18, 21, 22\}$.

In one method, the application of CDM-4 Walsh covers can be configured by an RRC parameter; when the parameter is configured CDM-4 is applied; otherwise CDM-2 is applied as in the legacy specifications.

Figure 22:
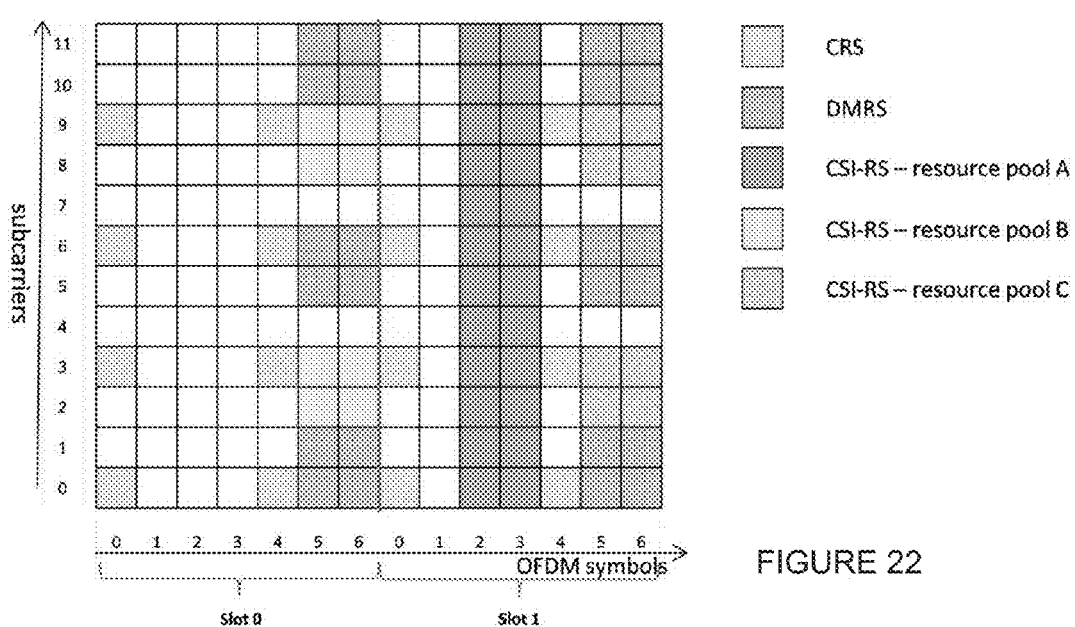
FIG. 22 illustrates formation of CSI-RS resource pools according to some embodiments of the present disclosure.

FIG. 22 illustrates formation 2200 of CSI-RS resource pools according to some embodiments of the present disclosure. The embodiment shown in FIG. 22 is for illustration only. Other embodiments could be used without departing from the scope of the present disclosure.

In these embodiments, the number of resource pools are three: a first, a second and a third resource pools denoted as resource pools A, B and C, wherein the three resource pools are three sets of CSI-RS resources respectively mapping onto three distinct pairs of OFDM symbols. Pool A corresponds to CSI-RS resources whose CSI-RS are mapped onto OFDM symbols 2 and 3 in the second slot (slot 1) of a subframe. Pool B corresponds to CSI-RS resources whose CSI-RS are mapped onto OFDM symbols 5 and 6 in the first slot (slot 0) of a subframe. Finally pool C corresponds to CSI-RS resources whose CSI-RS are mapped onto OFDM symbols 5 and 6 in the second slot (slot 1) of a subframe.

In these embodiments, the first component resource is selected from the first resource pool, and the second component resource is selected from the second and the third resource pools. Each resource pool comprises a number of CSI-RS configuration indices in TABLE 1 corresponding to these OFDM symbol pairs.

According to this principle, for $N_{CSIRS}=16$ port mapping, it is proposed that: the first resource pool comprises CSI-RS configuration index $\{1,2,3\}$ for $N_2=8$ CSI-RS ports; the second resource pool comprises CSI-RS configuration index 0 for $N_1=8$ CSI-RS ports; and the third resource pool comprises CSI-RS configuration index 4 for $N_1=8$ CSI-RS ports, wherein the resource index and corresponding resource mapping is based upon TABLE 1.

In some embodiments, a composite CSI-RS resource comprising $N_{CSIRS}=16$ ports is configured by means of $N_R=4$ component resources each comprising 4 ports, where $N_{CSI-RS}=4N_R$.

It would be eNB's implementation issue to allocate CSI-RS component resources for full power utilization. However, the standards specification would support options to ensure full power utilization, e.g., by allowing the CDM-4.

In one method, CDM-4 Walsh covers are applied to multiplex 4-port CSI-RS, across 4 CSI-RS REs of the first and the second component resources on each of the first and the second subcarriers; and across 4 CSI-RS REs of the third and the fourth component resources on each of the first and the second subcarriers.

In another method, CDM-4 Walsh covers are applied to multiplex 4-port CSI-RS, across 4 CSI-RS REs of each 4-port component resource.

For the power balancing and full power utilization, the first resource pool and the second resource pool can be constructed such that the OFDM symbols for CSI-RS RE mapping of the first and the third component resource are different from those OFDM symbols of the second and the fourth component resource. In addition, the first resource pool may comprise those CSI-RS resources on OFDM symbols 2 and 3 in slot 1, so that when both component resources are selected from the first resource pool CDM-4 can give full power utilization.

According to this principle, for $N_{CSIRS}=16$ port mapping (and also for $N_{CSIRS}=12$), it is proposed that: the first resource pool comprise CSI-RS configuration index $\{1, 2, 3, 6, 7, 8\}$ for $N_2=4$ CSI-RS ports; and the second resource pool comprise CSI-RS configuration index $\{0, 4, 5, 9\}$ for $N_1=4$ CSI-RS ports, wherein the resource index and corresponding resource mapping is based upon TABLE 1.

In addition, assuming that a composite resource comprises an $N_R$ number of component resources, it is proposed that a composite resource should comprise either the first and the third resources selected from the first resource pool; The second and the fourth resources selected from the second resource pool; or all the resources are selected from the first resource pool.

In some embodiments, a composite CSI-RS resource comprising $N_{CSIRS}=12$ ports is configured by means of $N_R=3$ component resources each comprising 4 ports, where $N_{CSI-RS}=4N_R$.

In one method, CDM-4 Walsh covers are applied to multiplex 4-port CSI-RS, across 4 CSI-RS REs of the first and the second component resources on each of the first and the second subcarriers; and across 4 CSI-RS REs of the third component resources.

In another method, CDM-4 Walsh covers are applied to multiplex 4-port CSI-RS, across 4 CSI-RS REs of each component resource.

In some embodiments, to ensure full-power utilization with CDM-4 application, the followings are proposed.

A 16-port CSI-RS resource comprises:
4×4-port legacy CSI-RS resources, wherein the first and the third resources are selected from the first resource pool; and the second and the fourth resources are selected from the second resource pool. CDM-4 is applied across the first and the second resources; and across the third and the fourth resources; or 4×4-port legacy CSI-RS resources, wherein all the four resources are selected from the first resource pool. CDM-4 is applied on the 4 CSI-RS REs comprising each resource; or 8×2-port legacy CSI-RS resources, wherein the first and the second resources are respectively selected from the first and the second pools. CDM-4 is applied across each group of 4 CSI-RS REs of each component CSI-RS resource; or 8×2-port legacy CSI-RS resources, wherein all the resources are selected from the first resource pool. CDM-4 is applied across the (2n−1)-th and the (2n)-th resources, n=1, . . . , 4.

A 12-port CSI-RS resource comprises:
3×4-port legacy CSI-RS resources, wherein all the three resources are selected from the first resource pool. CDM-4 is applied on 4 CSI-RS REs comprising each resource; or 4-port legacy CSI-RS resource and 8-port legacy CSI-RS resource, wherein both CSI-RS resources are selected from the first resource pool. CDM-4 is applied on 4-CSI-RS REs of the 4-port CSI-RS resource, and on each group of 4 CSI-RS REs of the 8-port CSI-RS resource.

8×2-port legacy CSI-RS resources, wherein the first and the second resources are respectively selected from the first and the second pools. CDM-4 is applied across each group of 4 CSI-RS REs of each component CSI-RS resource 8×2-port legacy CSI-RS resources, wherein all the resources are selected from the first resource pool. CDM-4 is applied across the (2n−1)-th and the (2n)-th resources, n=1, . . . , 3.

In some embodiments, those component resources to comprise 12-port CSI-RS resource can be selected from the first resource pool only. This is for ensuring full power utilization via CDM-4.

TABLE 12

16-port CSI-RS resource configuration options

| 16 port CSI-RS resource configuration options | Details |
|---|---|
| Option 1 | 4 × 4-port legacy CSI-RS resources<br>Alt 1: CDM-4 across the first and the second resources; and across the third and the fourth resources → full power utilization<br>Alt 2: CDM-4 across each CSI-RS resource → full power utilization |
| Option 2 | 2 × 8-port legacy CSI-RS resources<br>Alt 1: CDM-4 across the first and the second resources;<br>Alt 2: CDM-4 across each group of 4 REs of each CSI-RS resource → full power utilization |
| Option 3 | 8 × 2-port legacy CSI-RS resources<br>CDM-4 across (2n − 1)-th and (2n)-th CSI-RS resources, n = 1, . . . , 4 → full power utilization |

TABLET 13

12-port CSI-RS resource configuration options

| 12 port CSI-RS resource configuration options | Details |
|---|---|
| Option 1 | 3 × 4-port legacy CSI-RS resources<br>Alt 1: CDM-4 across the first and the second resources → full power utilization<br>Alt 2: CDM-4 across each CSI-RS resource |
| Option 2 | 2 × 8-port legacy CSI-RS resources<br>CDM-4 across the first and the second resources |
| Option 3 | 6 × 2-port legacy CSI-RS resources<br>CDM-4 across (2n − 1)-th and (2n)-th CSI-RS resources, n = 1, . . . , 3 → full power utilization |

TABLE 12 and TABLE 13 summarize 12 and 16 port CSI-RS resource configuration options according to some embodiments of the present disclosure.

Embodiment

Composite CSI-RS resource allocation via configuration of 2 component CSI-RS resources; utilization of CSI-RS resource pools and application of CDM-4.

Figure 23:
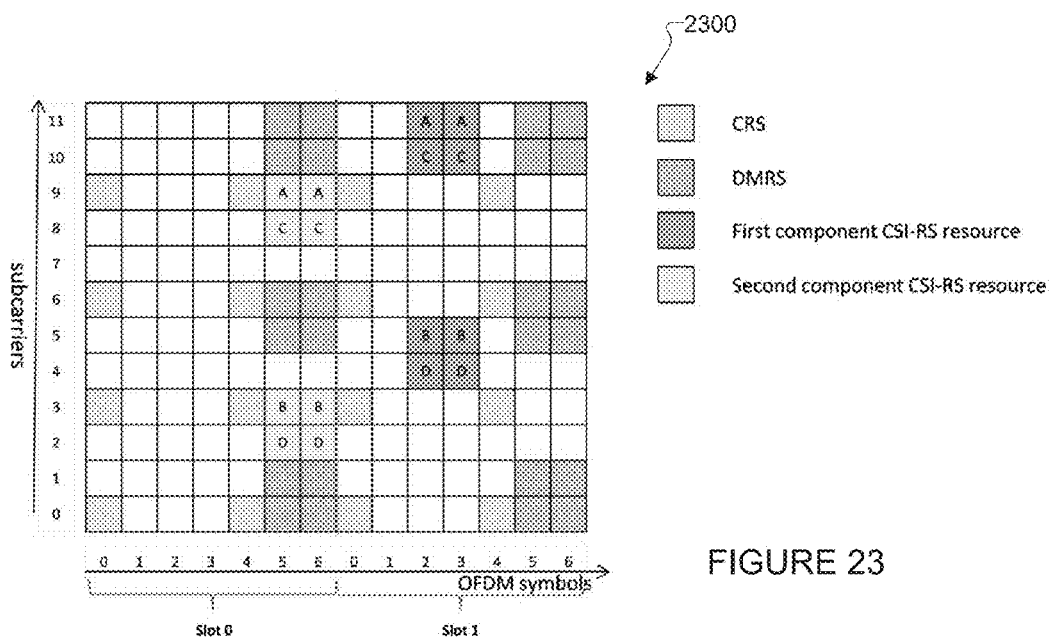
FIG. 23 illustrates the CSI-RS RE mapping 2300 of the composite CSI-RS resource configured this way according to some embodiments of the present disclosure.

In this example embodiment, a UE is configured with CSI-RS resource pools A and B according to FIG. 21. The UE is further configured with two component CSI-RS resources from the two resource pools as in the following:
  first-CSI-RS-resource=resourceConfig index 1 for 8-port CSI-RS (according to TABLE 1); and
  second-CSI-RS-resource=resourceConfig index 0 for 8-port CSI-RS (according to TABLE 1);

FIG. 23 illustrates the CSI-RS RE mapping 2300 of the composite CSI-RS resource configured this way according to some embodiments of the present disclosure. The embodiment shown in FIG. 23 is for illustration only. Other embodiments could be used without departing from the scope of the present disclosure. The composite CSI-RS are mapped onto 16 REs, according to those two component CSI-RS resources and TABLE 1.

When CDM-4 is configured, with Alt 1, four length-4 Walsh covers are used to multiplex each group of 4-port CSI-RS, wherein:
  A first group comprises a first pair of ports (i.e., ports 15, 16 labeled with an alphabet A in FIG. 23) from the first component CSI-RS resource and a first pair of ports (i.e., ports 15, 16 labeled with an alphabet A in FIG. 23) from the second component CSI-RS resource. Alternatively, when the CSI-RS ports are aggregated according to TABLE 6, the first group comprises ports 15, 16, 23, 24.
  A second group comprises a second pair of ports (i.e., ports 17, 18 labeled with an alphabet B in FIG. 23) from the first component CSI-RS resource and a second pair of ports (i.e., ports 17, 18 labeled with an alphabet B in FIG. 23) from the second component CSI-RS resource. Alternatively, when the CSI-RS ports are aggregated according to TABLE 5, the second group comprises ports 17, 18, 25, 26.
  A third group comprises a third pair of ports (i.e., ports 19, 20 labeled with an alphabet C in FIG. 23) from the first component CSI-RS resource and a third pair of ports (i.e., ports 19, 20 labeled with an alphabet C in FIG. 23) from the second component CSI-RS resource. Alternatively, when the CSI-RS ports are aggregated according to TABLE 6, the third group comprises ports 19, 20, 27, 28.
  A fourth group comprises a fourth pair of ports (i.e., ports 21, 22 labeled with an alphabet D in FIG. 23) from the first component CSI-RS resource and a fourth pair of ports (i.e., ports 21, 22 labeled with an alphabet D in FIG. 23) from the second component CSI-RS resource. Alternatively, when the CSI-RS ports are aggregated according to TABLE 6, the fourth group comprises ports 21, 22, 29, 30.

In FIG. 23, those 4-port CSI-RS RE mapping 2300 multiplexed in each group of 4 CSI-RS REs are labeled with the same alphabet in {A, B, C, D}.

Embodiment

Composite CSI-RS resource allocation via configuration of 4 component CSI-RS resources; utilization of CSI-RS resource pools and application of CDM-4.

Figure 24:
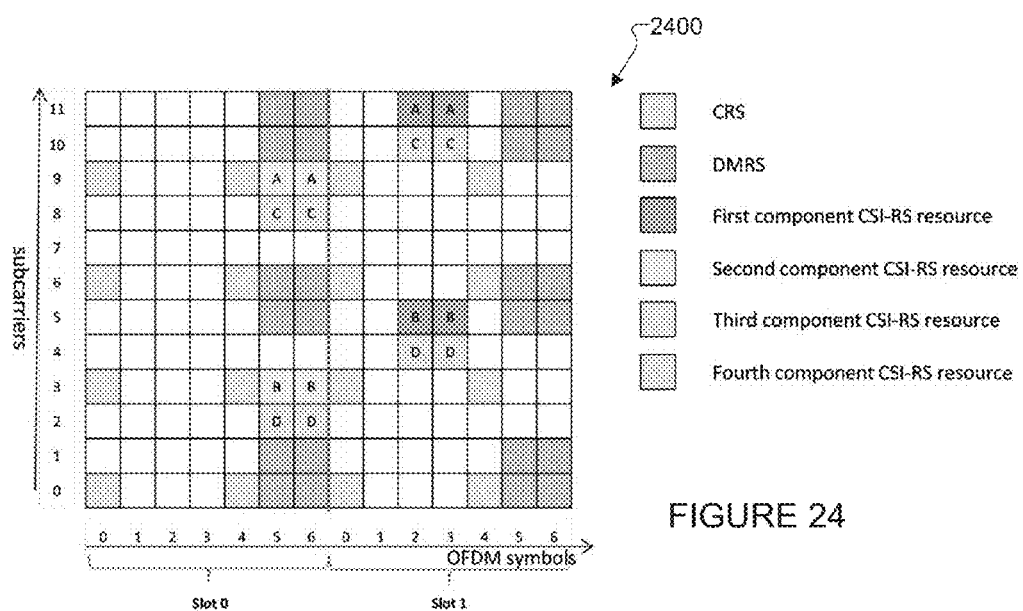
FIG. 24 illustrates the CSI-RS RE mapping of the composite CSI-RS resource configured this way according to some embodiments of the present disclosure.

In this example embodiment, a UE is configured with CSI-RS resource pools A and B according to FIG. 21. The UE is further configured with four component CSI-RS resources from the two resource pools as in the following:
  first-CSI-RS-resource=resourceConfig index 1 for 4-port CSI-RS (according to TABLE 1);
  second-CSI-RS-resource=resourceConfig index 0 for 4-port CSI-RS (according to TABLE 1);
  third-CSI-RS-resource=resourceConfig index 6 for 4-port CSI-RS (according to TABLE 1);
  fourth-CSI-RS-resource=resourceConfig index 5 for 4-port CSI-RS (according to TABLE 1);

FIG. 24 illustrates the CSI-RS RE mapping of the composite CSI-RS resource configured this way according to some embodiments of the present disclosure. The embodiment shown in FIG. 24 is for illustration only. Other embodiments could be used without departing from the scope of the present disclosure.

The composite CSI-RS are mapped onto 16 REs, according to those four component CSI-RS resources and TABLE 1.

When CDM-4 is configured, with Alt 1, four length-4 Walsh covers are used to multiplex each group of 4-port CSI-RS, wherein:
  A first group comprises a first pair of ports (i.e., ports 15, 16 labeled with an alphabet A in FIG. 24) from the first component CSI-RS resource and a first pair of ports (i.e., ports 15, 16 labeled with an alphabet A in FIG. 24) from the second component CSI-RS resource. Alternatively, when the CSI-RS ports are aggregated according to TABLE 4, the first group comprises ports 15, 16, 19, 20.

A second group comprises a second pair of ports (i.e., ports 17, 18 labeled with an alphabet B in FIG. 24) from the first component CSI-RS resource and a second pair of ports (i.e., ports 17, 18 labeled with an alphabet B in FIG. 24) from the second component CSI-RS resource. Alternatively, when the CSI-RS ports are aggregated according to TABLE 2-3, the second group comprises ports 17, 18, 21, 22.

A third group comprises a first pair of ports (i.e., ports 15, 16 labeled with an alphabet C in FIG. 24) from the third component CSI-RS resource and a first pair of ports (i.e., ports 19, 20 labeled with an alphabet C in FIG. 24) from the fourth component CSI-RS resource. Alternatively, when the CSI-RS ports are aggregated according to TABLE 4, the third group comprises ports 23, 24, 27, 28.

A fourth group comprises a second pair of ports (i.e., ports 17, 18 labeled with an alphabet D in FIG. 24) from the third component CSI-RS resource and a second pair of ports (i.e., ports 17, 18 labeled with an alphabet D in FIG. 24) from the fourth component CSI-RS resource. Alternatively, when the CSI-RS ports are aggregated according to TABLE 4, the fourth group comprises ports 25, 26, 29, 30.

In FIG. 24, those 4-port CSI-RS multiplexed in each group of 4 CSI-RS REs are labeled with the same alphabet in {A, B, C, D}.

Embodiment

Composite CSI-RS resource allocation via configuration of 8 component CSI-RS resources; utilization of CSI-RS resource pools and application of CDM-4

Figure 25:
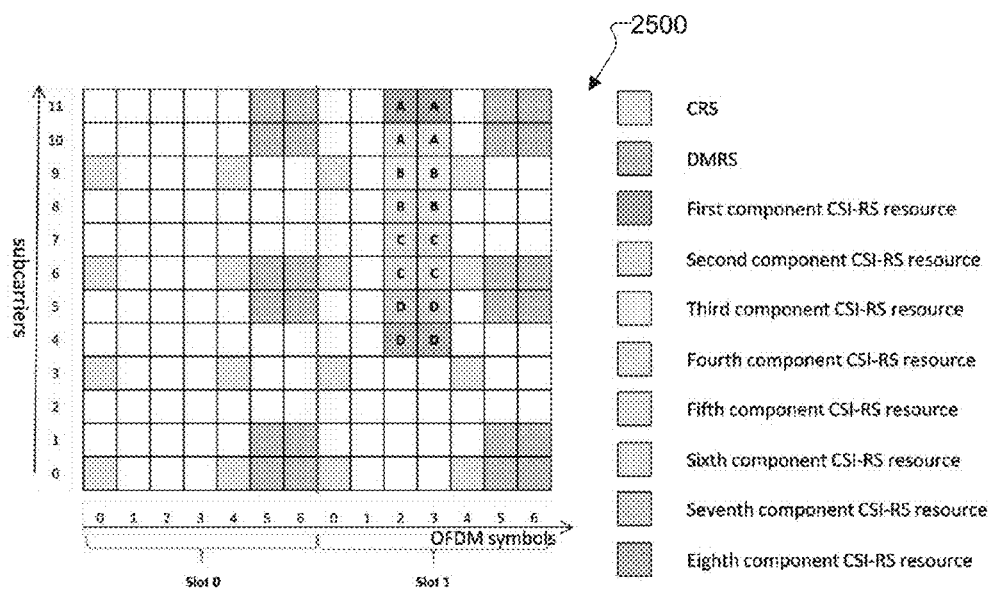
FIG. 25 illustrates the CSI-RS RE mapping 2500 of the composite CSI-RS resource configured this way according to some embodiments of the present disclosure.

In this example embodiment, a UE is configured with CSI-RS resource pools A and B according to FIG. 21. The UE is further configured with eight component CSI-RS resources as in the following:

first-CSI-RS-resource=resourceConfig index 1 for 2-port CSI-RS (according to TABLE 1);
second-CSI-RS-resource=resourceConfig index 6 for 2-port CSI-RS (according to TABLE 1);
third-CSI-RS-resource=resourceConfig index 2 for 2-port CSI-RS (according to TABLE 1);
fourth-CSI-RS-resource=resourceConfig index 7 for 2-port CSI-RS (according to TABLE 1);
fifth-CSI-RS-resource=resourceConfig index 3 for 2-port CSI-RS (according to TABLE 2-1);
sixth-CSI-RS-resource=resourceConfig index 8 for 2-port CSI-RS (according to TABLE 1);
seventh-CSI-RS-resource=resourceConfig index 12 for 2-port CSI-RS (according to TABLE 1);
eighth-CSI-RS-resource=resourceConfig index 13 for 2-port CSI-RS (according to TABLE 1);

FIG. 25 illustrates the CSI-RS RE mapping 2500 of the composite CSI-RS resource configured this way according to some embodiments of the present disclosure. The embodiment shown in FIG. 25 is for illustration only. Other embodiments could be used without departing from the scope of the present disclosure.

The composite CSI-RS are mapped onto 16 REs, according to those eight component CSI-RS resources and TABLE 1. The embodiment shown in FIG. 25 is for illustration only. Other embodiments could be used without departing from the scope of the present disclosure.

When CDM-4 is configured, four length-4 Walsh covers are used to multiplex each group of 4-port CSI-RS, wherein:

A first group comprises a pair of REs (labeled with an alphabet A) of the first component CSI-RS resource and a pair of REs (labeled with an alphabet A) of the second component CSI-RS resource. When the CSI-RS ports are aggregated, the first group is for ports 15, 16, 17, 18.

A second group comprises a pair of REs (labeled with an alphabet B) of the third component CSI-RS resource and a pair of REs (labeled with an alphabet B) of the fourth component CSI-RS resource. When the CSI-RS ports are aggregated, the second group is for ports 19, 20, 21, 22.

A third group comprises a pair of REs (labeled with an alphabet C) of the fifth component CSI-RS resource and a pair of REs (labeled with an alphabet C) of the sixth component CSI-RS resource. When the CSI-RS ports are aggregated, the third group is for ports 23, 24, 25, 26.

A fourth group comprises a pair of REs (labeled with an alphabet D) of the seventh component CSI-RS resource and a pair of REs (labeled with an alphabet D) of the eighth component CSI-RS resource. When the CSI-RS ports are aggregated, the first group is for ports 27, 28, 29, 30.

In FIG. 25, those 4-port CSI-RS multiplexed in each group of 4 CSI-RS REs are labeled with the same alphabet in {A, B, C, D}.

Figure 27:
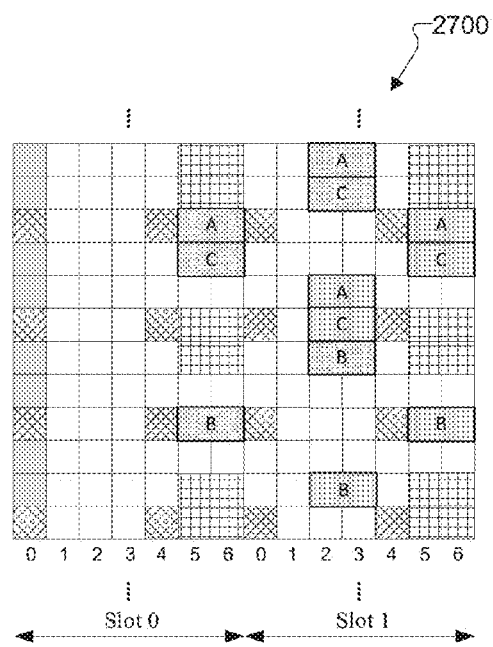

FIG. 26 and FIG. 27 illustrate alternative CSI-RS mapping patterns 2600, 2700 generated according to some embodiments of the present disclosure. FIG. 26 illustrates an alternative per-PRB-pair 12 or 16-port CSI-RS mapping patterns. FIG. 27 illustrates an alternative per-PRB-pair 12-port CSI-RS mapping patterns. The embodiments shown in FIGS. 26 and 27 are for illustration only. Other embodiments could be used without departing from the scope of the present disclosure.

For each of the first and the second CSI-RS resource in the figure, four REs are grouped together for a port group X and used for CDM multiplexing of CSI-RS of four APs comprising the port group X. For example, when CSI-RS for antenna ports a, b, c, d are CDM multiplexed on those four REs labeled with X, the walsh covers are applied as in the following TABLE 14:

TABLE 14

| Antenna port number | CDM Walsh cover to apply on the four REs |
|---|---|
| a | [+1 +1 +1 +1] |
| b | [+1 −1 +1 −1] |
| c | [+1 +1 −1 −1] |
| d | [+1 −1 −1 +1] |

This pattern allows full-power utilization, and it does not suffer from 9 dB inter-modulation distortion issue.

In some embodiments, antenna port numbers to comprise each of port groups A, B, C and D to comprise 4 CDM groups (e.g., as in FIG. 26 2-11) are either implicitly or explicitly configured to a UE.

In one method, the UE is configured with a higher layer parameter to explicitly indicate antenna port numbers to comprise each port group for a configured CSI-RS resource with $N_{CSIRS}$ CSI-RS ports. One way of facilitating this method is to specify something similar to TABLE 15.

TABLE 15

| CSI-RS port group mapping configuration | |
|---|---|
| Value of higher layer parameter | CSI-RS Port group mapping |
| A first value | A = A$_1$ |
| | B = B$_1$ |
| | C = C$_1$ |
| | D = D$_1$ |
| A second value | A = A$_2$ |
| | B = B$_2$ |
| | C = C$_2$ |
| | D = D$_2$ |
| (A third value) | ( . . . ) |

This method is beneficial to cope with different antenna configurations with the same number of antenna ports, and the same component DFT codebooks. For example, a same PMI reporting procedure and same DFT component codebooks can be used for 16-port config A and 16-port config B; however careful mapping of CSI-RS onto REs may be beneficial for coping with UE mobility and frequency selectivity.

In one example, the higher layer parameter is the parameter of CSI reference signal configuration in TABLE 1. According to the proposed method, if 12 or 16 ports are configured, CSI reference signal configuration indicates CSI-RS port group mapping as well as (k',l') and slot number n which is a distinctive feature of the proposed method as compared to TABLE 1.

In another example, the higher layer parameter is a newly introduced parameter configured per CSI process, which indicates whether an array is a fat or a tall array.

In another method, the UE is configured a different CSI-RS port group mapping dependent upon an implicit condition. One way of facilitating this method is to specify something similar to TABLE 16.

TABLE 16

| CSI-RS port group mapping configuration | |
|---|---|
| An implicit condition | CSI-RS Port group mapping |
| A first condition | A = A$_1$ |
| | B = B$_1$ |
| | C = C$_1$ |
| | D = D$_1$ |
| A second condition | A = A$_2$ |
| | B = B$_2$ |
| | C = C$_2$ |
| | D = D$_2$ |
| (A third condition) | ( . . . ) |

When the UE has medium to high mobility, CDM spreading across multiple separate OFDM symbols may result in degraded CSI estimation performance for X-pol co-phase, which tends to vary in subband and frequency-selective manner. Hence, we may want to group the antenna ports corresponding to co-pol antennas in a single dimension in a same port group, rather than mixing both pol antennas in a same port group. In addition, we also want to keep CSI-RS REs for the two port groups for a row comprising X-pol antenna ports on nearby subcarriers so that frequency-selective X-pol co-phase components are reliably estimated per group of nearby subcarriers. Keeping this discussion in mind, in one method, the following port group assignment is proposed when 12 or 16 ports are configured, where the antenna numbering is done according to FIGS. 5A to 5D (or FIGS. 28A to 28D), with α=15:

TABLE 17

| Number of configured CSI-RS ports | CSI-RS Port group mapping |
|---|---|
| 12 | A = {15, 16, 17} |
| | B = {18, 19, 20} |
| | C = {21, 22, 23} |
| | D = {24, 25, 26} |
| 16 | A = {15, 16, 17, 18} |
| | B = {19, 20, 21, 22} |
| | C = {23, 24, 25, 26} |
| | D = {27, 28, 29, 30} |

In the above method, CSI-RS REs for A and C are on two adjacent subcarriers, and they are used for the two groups of differently polarized antennas on a linear array (e.g., for a same row), so that X-pol co-phase components are reliably estimated.

In another method, in order to keep the nested property with the legacy port mapping, the following port group assignment is proposed, e.g., assuming the CSI-RS RE mapping pattern illustrated in FIG. 26:

TABLE 18

| Number of configured CSI-RS ports | CSI-RS Port group mapping | |
|---|---|---|
| 12 | Alt 1: A = {15, 16, 23, 24} | ; or A = {15, 16, 19, 20} |
| | B = {17, 18, 25, 26} | B = {17, 18, 21, 22} |
| | C = {19, 20} | C = {23, 24} |
| | D = {21, 22} | D = {25, 26} |
| | Alt 2 (power balancing option 1): | A = {15, 16, 23} |
| | | B = {17, 18, 24} |
| | | C = {19, 20, 25} |
| | | D = {21, 22, 26} |
| 16 | A = {15, 16, 23, 24} | |
| | B = {17, 18, 25, 26} | |
| | C = {19, 20, 27, 28} | |
| | D = {21, 22, 29, 30} | |

In another method, in order to minimize the number of REs used for 12-port CSI-RS mapping, the nested property with the legacy port mapping, the following port group assignment is proposed, e.g., assuming the CSI-RS RE mapping pattern illustrated in FIGURE

A={15,16,21,22}
27: B={17,18,23,24}.
C={19,20,25,26}

In some embodiments, CSI-RS resource configuration is provided by TABLE 19, when number of configured CSI-RS ports (for a CSI process or for a CSI-RS configuration) is 12 or 16. Two RE groups, i.e., RE groups g∈{0,1}, are configured in TABLE 19, to indicate the configured CSI-RS RE group contained in a pair of consecutive OFDM symbols according to FIG. 26.

TABLE 19

| CSI-RS resource configuration when number of CSI-RS is 12 or 16 | | | |
|---|---|---|---|
| | Number of CSI reference signals configured 12 or 16 | | |
| CSI reference signal configuration | RE group 0: (k', l') and n$_s$ mod2 | RE group 1: (k', l') and n$_s$ mod2 | Corresponding RE mapping FIG. (informative) |
| 0 | (9, 5) and 0 | (11, 2) and 1 | FIG. 26A |
| 1 | (7, 2) and 1 | (9, 5) and 1 | FIG. 26A |
| x | (9, 5) and 0 | (9, 2) and 1 | FIG. 26B |
| y | (9, 5) and 0 | (9, 5) and 1 | FIG. 26C |

In subframes configured for CSI reference signal transmission, if the number of the configured CSI-RS ports is 12 or 16, reference signal sequence $r_{l,n_s}(m)$ shall be mapped to complex-valued modulation symbols $a_{k,l}^{(p)}$ used as reference symbols on antenna port p according to:

$$a_{k,l}^{(p)} = w_p(g \cdot 2 + l''') \cdot r_{l,n_s}(m')$$

for each RE group $g \in \{0,1\}$, where:

$$k = k' + 12m + \begin{cases} -0 & \text{for } p \in A = \{a_1, a_2, a_3, a_4\}, \text{normal cyclic prefix} \\ -6 & \text{for } p \in B = \{b_1, b_2, b_3, b_4\}, \text{normal cyclic prefix} \\ -1 & \text{for } p \in C = \{c_1, c_2, c_3, c_4\}, \text{normal cyclic prefix} \\ -7 & \text{for } p \in D = \{d_1, d_2, d_3, d_4\}, \text{normal cyclic prefix} \end{cases}$$

$$l = l' + l''$$
$$l'' = 0, 1$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$

TABLE 20

| Antenna port number | $w_p(l''')$, $l''' = 2g + l''$ |
|---|---|
| $a_1, b_1, c_1, d_1$ | [+1 +1 +1 +1] |
| $a_2, b_2, c_2, d_2$ | [+1 −1 +1 −1] |
| $a_3, b_3, c_3, d_3$ | [+1 +1 −1 −1] |
| $a_4, b_4, c_4, d_4$ | [+1 −1 −1 +1] |

In one alternative embodiment, $l'''$ to be used for $w_p(l''')$, $l'''=2g+l''$ as an argument may be circularly shifting over PRBs to power balance across OFDM symbols, i.e., $w_p(l''')$, $l'''=(2g+l''+m)\mod 4$.

In one method, a UE can be configured with total 12 or 16 (or more) port CSI-RS resource for class A reporting, with either
- (type A resource) a composite CSI-RS resource comprising multiple legacy CSI-RS resources according to some embodiments of the present disclosure (e.g., embodiments related to TABLE 10), or
- (type B resource) a single CSI-RS resource that configures 12 or 16-port CSI-RS RE mapping. For type B resource mapping, CDM-4 is applied for each group of 4-port CSI-RS as in some embodiments of the present disclosure.

In another method, a UE can be configured with total 12 or 16 (or more) port CSI-RS resource for class A reporting, with either
- (type A resource) a composite CSI-RS resource comprising multiple legacy CSI-RS resources according to some embodiments of the present disclosure and CDM-2 is used as in the legacy resource; or
- (type B' resource) a composite CSI-RS resource comprising multiple 8-port CSI-RS resources according to some embodiments and CDM-4 is applied and the selection of the CSI-RS resources can be constrained according to some embodiments.

Type-A or type-B (or B') is configured by higher-layer (RRC) signaling.

In these methods, eNB can configure type A resource for flexible resource assignment; type B and type B' resources for full power utilization.

FIGS. 28A to 28D illustrates antenna configurations and antenna numbering 2800, 2805, 2810 and 2015 according to some embodiments of the present disclosure. Similarly to corresponding embodiments associated with FIGS. 5A to 5D, cross pol (or X-pol) antenna array is considered, and 4×2, 2×4, 3×2 and 2×3 X-pol arrays are considered in FIGS. 28A to 28D.

Antenna Number Assignment

In FIGS. 28A to 28D, antennas are indexed with integer numbers, 0, 1, . . . , 15 for 16-port configurations (FIGS. 28A and 28B), and 0, . . . , 11 for 12-port configurations (FIGS. 28C and 28D). The embodiments shown in FIGS. 28A to 28D are for illustration only. Other embodiments could be used without departing from the scope of the present disclosure.

In fat arrays (such as 12-port config A and 16-port config A), antenna numbers are assigned such that:
- For a first row, consecutive numbers are assigned for all the antenna elements for a first polarization, and then proceed to a second polarization of the same row; and
- Once all the antenna ports are assigned in the first row with numbers, then the next consecutive numbers are assigned to a second row, according to the same manner used for the first row.

For example, in FIGS. 28A to 28D, antenna numbers 0-7 are assigned for a first row, and 8-15 are assigned for a second row; and antenna numbers 0-3 are assigned for a first polarization and 4-7 are assigned for a second polarization.

Similarly to FIGS. 5A to 5D, antenna numbers in tall arrays (such as 12-port config B and 16-port config B) are obtained by simply rotating the fat antenna arrays (such as 12-port config A and 16-port config A) by 90 degrees.

PMI Feedback Precoder Generation According to the Antenna Numbering

In some embodiments, a UE is configured to report a PMI feedback precoder according to the antenna numbers in FIGS. 28A to 28D.

In one example, a rank-1 precoder, $W_{m,n,p}$, which is an $N_{CSIRS} \times 1$ vector, to be reported by the UE has the following form:

$$W_{m,n,p} = [w_0 \quad w_1 \quad \ldots \quad w_{N_{CSIRS}-1}]^t = \frac{1}{\sqrt{N_{CSIRS}}} v_m \otimes \begin{bmatrix} u_n \\ \varphi_p u_{n'} \end{bmatrix},$$

wherein:
- $N_{CSIRS}$=number of configured CSI-RS ports in a CSI-RS resource, e.g., 12, 16, etc.
- $u_n$ is a N×1 oversampled DFT vector for a first dimension, whose oversampling factor is $S_N$.
- $v_m$ is a M×1 oversampled DFT vector for a second dimension, whose oversampling factor is $S_M$.
- $N \geq M$, in one alternative, $(N,M) \in \{(4,2), (4,3)\}$; in another alternative, $(N,M) \in \{(4,2), (4,3), (2,2)\}$
- $\phi_p$ is a co-phase, e.g., in a form of $$e^{\frac{2\pi p}{4}},$$

p=0, 1, 2, 3.

Here, example set of oversampling factors that can be configured for $S_N$ and $S_M$ are 4 and 8; and m, m' $\in \{0, 1, \ldots, S_M M\}$, and n, n' $\in \{0, 1, \ldots, S_N N\}$. In a special case, m=m' and n=n'.

FIG. 29 illustrates precoder weight application 2900 to antenna configurations according to embodiments of the present disclosure. The embodiment shown in FIG. 29 is for illustration only. Other embodiments could be used without departing from the scope of the present disclosure.

When any of 16-port config A and B is used at the eNB with configuring $N_{CSIRS}=16$ to the UE, a submatrix $v_m \otimes u_n$ of $W_{m,n,p}$ corresponds to a precoder applied on 8 co-pol elements, whose antenna numbers are 0 through 7. Given the antenna configuration, M=2 and N=4 should be configured for $v_m$ and $u_n$.

If 16-port config A is used, $u_n$ is a 4×1 vector representing a horizontal DFT beam and $v_m$ is a 2×1 vector representing a vertical DFT beam.

If 16-port config B is used, $u_n$ is a 4×1 vector representing a vertical DFT beam and $v_m$ is a 2×1 vector representing a horizontal DFT beam.

Denoting $$v_m = \begin{bmatrix} 1 & e^{j\frac{2\pi m}{MS_M}} \end{bmatrix},$$

precoding weights to be applied to antenna port numbers 0 through 7 are $$\begin{bmatrix} u_n \\ \varphi_p u_{n'} \end{bmatrix},$$

and the precoding weights to be applied to antenna ports 8 through 15 are $$\begin{bmatrix} u_n \\ \varphi_p u_{n'} \end{bmatrix} e^{j\frac{2\pi m}{MS_M}}$$

with an appropriate power normalization factor. This method of precoding weight application is illustrated in FIG. 29.

It is noted that the precoding weight assignment on the antennas can be similarly illustrated for 12-port config A and B, to the case of 16-port config A and B.

UE assumption for CQI derivation purpose can be defined as in the same way as the embodiments associated with FIG. 5A to 5D.

The subframe configuration period $T_{CSI-RS}$ and the subframe offset $\Delta_{CSI-RS}$ for the occurrence of CSI reference signals are listed in TABLE 21. The parameter $I_{CSI-RS}$ can be configured separately for CSI reference signals for which the UE shall assume non-zero and zero transmission power. Subframes containing CSI reference signals shall satisfy $(10n_f + \lfloor n_s/2 \rfloor \Delta_{CSI-RS}) \mod T_{CSI-RS}=0$.

TABLE 21

3-2 CSI reference signal subframe configuration

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

In some embodiments, a composite CSI-RS resource is configured to a UE, with signaling a number ($N_R$) of up-to-8-port component CSI-RS resources in the higher layer. The number of CSI-RS ports for the composite CSI-RS resource is denoted by $N_{CSIRS}$, for example, $N_{CSIRS}=8$, 12 or 16. This composite CSI-RS resource can be used for non-precoded (NP) CSI-RS operation.

In some embodiments, the followings may be agreed for CSI-RS resource aggregation.

Working Assumptions:
  For 12 or 16 ports, a CSI-RS resource for class A CSI reporting is composed as an aggregation of K CSI-RS configurations.
    $\Sigma_k N_k \in \{12,16\}$
    Either CDM-2 or CDM-4 per CSI-RS resource can be configured for a UE
    No need to send LS to RAN4 to change 6 dB power boosting assumption for CSI-RS transmission
  RRC configuration parameters include:
    A list of K CSI-RS resource configurations;
      In case of CDM-2, the CSI-RS resource configurations indicate CSI-RS RE locations according to legacy resource configurations in 36.211
        » $N_k \in \{2, 4, 8\}$, and the same $N_k=N$ used for all k
        One or more values from $\{2, 4, 8\}$ can be down-selected
      FFS: In case of CDM-4, the CSI-RS resource configurations indicate CSI-RS RE locations:
    A single set of subordinate parameters that will commonly apply to all resources within Rel-13 CSI-RS resource
      number of antenna ports (N),
      subframe config.,
      scrambling ID,
      QCL info.

Agreements:
  12 and 16 Port CSI-RS construction for CDM-2
    For 16 port construction:
      Working assumption (N,K)=(8,2), (2,8)
    For 12 port construction:
      Working assumption (N,K)=(4,3), (2,6)
  CSI-RS RE mapping details for CDM-2
    The ports of the aggregated resource correspond to the ports of component resources according to the following:
      The aggregated port numbers are 15, 16, ... 30 (for 16 CSI-RS ports)
      The aggregated port numbers are 15, 16, ... 26 (for 12 CSI-RS ports)
      FFS: The aggregated port number is given by n=(k−1)*N+p, p=15, ... , 14+N,
        k (=1, ... ,K) correspond to the k-th CSI-RS configuration.
  Working assumption CSI-RS RE mapping details for CDM-4
    Full-port CSI-RS can be mapped in each OFDM symbol used for CSI-RS mapping.
    CDM RE set construction
      Alt 1: time domain only (4 OFDM symbols)
      Alt 2: time and frequency domain (2 subcarriers×2 OFDM symbols)
      Down-selection or merging of the two alternatives FFS According to the proposed port mapping equation of n=(k−1)*N+p, p=15, ... , 14+N, with N=8, 16 antenna ports and REs are selected according to the following example:

Example 1

If two 8-port CSI-RS are aggregated to comprise a 16-port CSI-RS, REs for antenna ports 15-23 of the first component CSI-RS resource are used to map antenna ports 15-23 of the aggregated CSI-RS resource, and REs for antenna ports 15-23 of the second component CSI-RS resource are used to map antenna ports 24-30 of the aggregated CSI-RS resource.

In a particular case in which two 8-port CSI-RS are aggregated to comprise a 12-port CSI-RS, 12 antenna ports and REs are selected according to the following example:

Example 2

If two 8-port CSI-RS are aggregated to comprise a 12-port CSI-RS, REs for antenna ports 15-20 of the first component CSI-RS resource are used to map antenna ports 15-20 of the aggregated CSI-RS resource, and REs for antenna ports 15-20 of the second component CSI-RS resource are used to map antenna ports 21-26 of the aggregated CSI-RS resource. The rest of the CSI-RS REs of the two component CSI-RS resources can be used for PDSCH RE mapping for those UEs configured with the aggregated CSI-RS resource.

In this case, the RRC information element (IE) of the composite CSI-RS requires only a single information field of a CSI-RS port count for all of the component CSI-RS resources. An example construction of the CompositeCSI-RS-ConfigNZP is shown below according to these embodiments. Below, the total number of antenna ports for the composite CSI-RS resource will be a product of the number configured with antennaPortsCount and the number of component CSIRS resources (can be 1-4 in this example).

```
NZP-CSI-RS-R13 ::=      SEQUENCE {
    csi-RS-ConfigNZPId          CSI-RS_ConfigNZPId,
    antennaPortsCount           ENUMERATED {an1, an2, an4, an8},
    CDMtype                     ENUMERATED {cdm2,cdm4}
    NZP-CSI-RS-Configuration-List   List of (resourceConfig),
    subframeConfig              INTEGER (0..154),
    scramblingIdentity          INTEGER (0..503),
    qcl-CRS-Info                SEQUENCE {...
    ...
}
```

In some embodiments, the UE is not expected to be configured with the same resource index numbers (resourceConfig numbers) for the component resources to comprise a composite CSI-RS resource.

The number of CSI-RS antenna ports of a R13 NZP CSI-RS resource is determined as a product of two numbers: antennaPortCount and number of resourceConfig's in the NZP-CSI-RS-Configuration-List. In case NZP-CSI-RS-Configuration-List is a bitmap of size 32, the number of resourceConfig's will correspond to number of 1's in the bitmap.

Figure 30:
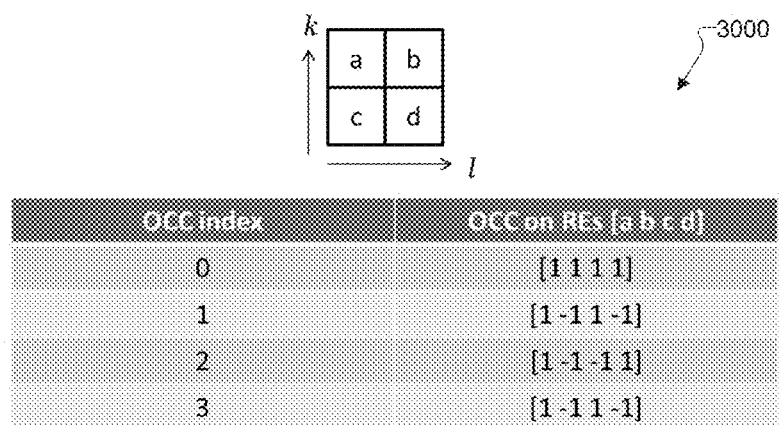
FIG. 30 illustrates OCC application 3000 to 2×2 REs according to some embodiments of the present disclosure.

When cdm4 is configured, the UE is further configured to apply CDM-4 OCC in the 2×2 REs in time and frequency as illustrated in FIG. 30.

Figure 31:
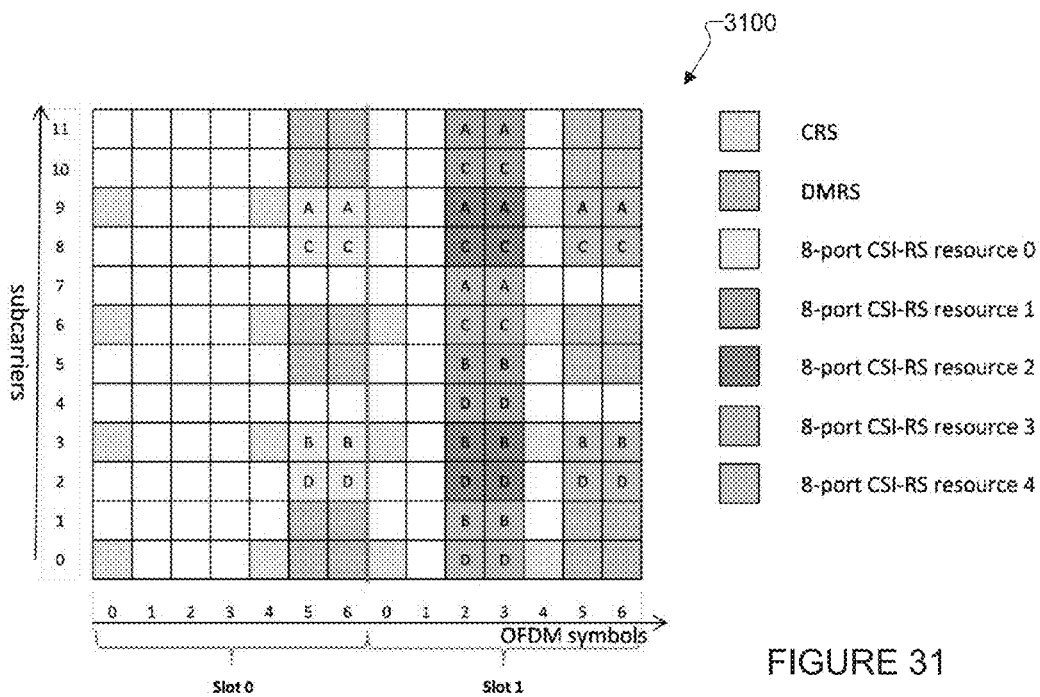
FIG. 31 illustrates 12 or 16 port CSI-RS resource mapping with aggregating 8-port legacy CSI-RS resources according to embodiments of the present disclosure.

FIG. 30 illustrates OCC application 3000 to 2×2 REs according to some embodiments of the present disclosure. The embodiment shown in FIG. 31 is for illustration only. Other embodiments could be used without departing from the scope of the present disclosure.

Embodiment

2×(legacy 8-port resources) CDM group formation method for 16-port NZP CSI-RS resource TABLE 22 illustrates two methods according to some embodiments of the present disclosure: Alt 1 and Alt 2. The methods are for constructing each group of CDM-4 REs for the 16 port mapping used for a R13 NZP CSI-RS resource.

According to these methods, two sets of legacy CSI-RS ports to comprise a CDM-4 RE group are {15, 16, 19, 20} and {17, 18, 21, 22}.

In one method, TABLE 3-3 is used for normal CP. According to these methods, for normal CP, a CDM group comprises 2×2 REs adjacent in time and frequency, with two consecutive numbers respectively for l and k.

According to Alt 1, the OCCs for the first two CSI-RS ports in each CDM-4 RE group are the same as the corresponding legacy OCCs with CDM-2, which are [1 1] and [1 −1]. Hence, backward compatibility can be kept and hence legacy UEs can access those CSI-RS antenna ports (i.e., APs 15-18 and 23-26 according to CDM-2 CSI-RS port mapping).

According to Alt 2, consecutive antenna port numbers are allocated to each CDM-4 RE group for simplicity, but in this case backward compatibility is not kept.

TABLE 22

3-1 CDM-4 OCC and RE mapping for 16 port mapping

| A set of CSI-RS ports for a CDM-4 RE group in a R13 NZP CSI-RS resource | Corresponding CSI-RS ports, p | Corresponding OCC indices | RE locations |
|---|---|---|---|
| P$_1$ | Alt 1: 15, 16, 19, 20<br>Alt 2: 15, 16, 17, 18 | 0, 1, 2, 3 | RE locations for antenna ports p ∈ {15, 16, 19, 20} for CDM-2 aggregated resource |
| P$_2$ | Alt 1: 17, 18, 21, 22<br>Alt 2: 19, 20, 21, 22 | 0, 1, 2, 3 | RE locations for antenna ports p ∈ {17, 18, 21, 22} for CDM-2 aggregated resource |
| P$_3$ | Alt 1: 23, 24, 27, 28<br>Alt 2: 23, 24, 25, 26 | 0, 1, 2, 3 | RE locations for antenna ports p ∈ {23, 24, 27, 28} for CDM-2 aggregated resource |
| P$_4$ | Alt 1: 25, 26, 29, 30<br>Alt 2: 27, 28, 29, 30 | 0, 1, 2, 3 | RE locations for antenna ports p ∈ {25, 26, 29, 30} for CDM-2 aggregated resource |

TABLE 23 illustrates a method according to some embodiments of the present disclosure. The method is for constructing each group of CDM-4 REs for the 16 port mapping used for a R13 NZP CSI-RS resource. In one method, TABLE 23 is used for extended CP.

According to this methods, two sets of legacy CSI-RS ports to comprise a CDM-4 RE group are {15, 16, 17, 18} and {19, 20, 21, 22}.

According to this method, for extended CP, a CDM group comprises 2×2 REs adjacent in time with two consecutive l numbers, and close in frequency with two k numbers whose difference is 3.

TABLE 23

CDM-4 OCC and RE mapping for 16 port mapping

| A set of CSI-RS ports for a CDM-4 RE group in a R13 NZP CSI-RS resource | Corresponding CSI-RS ports, p | Corresponding OCC indices | RE locations |
|---|---|---|---|
| $P_1$ | 15, 16, 17, 18 | 0, 1, 2, 3 | RE locations for antenna ports $p \in \{15, 16, 17, 18\}$ for CDM-2 aggregated resource |
| $P_2$ | 19, 20, 21, 22 | 0, 1, 2, 3 | RE locations for antenna ports $p \in \{19, 20, 21, 22\}$ for CDM-2 aggregated resource |
| $P_3$ | 23, 24, 25, 26 | 0, 1, 2, 3 | RE locations for antenna ports $p \in \{23, 24, 25, 26\}$ for CDM-2 aggregated resource |
| $P_4$ | 27, 28, 29, 30 | 0, 1, 2, 3 | RE locations for antenna ports $p \in \{27, 28, 29, 30\}$ for CDM-2 aggregated resource |

A CDM Group Formation Method for 12-Port NZP CSI-RS Resource: 2×(Legacy S-Port Resources)

TABLE 24 illustrates two methods, Alt 1 and Alt 2, to construct each group of CDM-4 REs for the 12 port mapping used for constructing a 16-port R13 NZP CSI-RS resource.

Alt 1 and Alt 2 are constructed similarly to TABLE 22, with two differences: the $3^{rd}$ CDM group comprises {23, 24, 25, 26}, so that the 12-port resource has only 12 REs; The $4^{th}$ CDM group can be used for PDSCH RE mapping, for those UEs configured with the R13 NZP CSI-RS resource.

TABLE 24

CDM-4 OCC and RE mapping for 12 port mapping

| A set of CSI-RS ports for a CDM-4 RE group in a R13 NZP CSI-RS resource | CSI-RS ports for a CDM-4 RE group in a R13 NZP CSI-RS resource, p | OCC indices | RE locations |
|---|---|---|---|
| $P_1$ | Alt 1: 15, 16, 19, 20<br>Alt 2: 15, 16, 17, 18 | 0, 1, 2, 3 | RE locations for antenna ports $p \in \{15, 16, 19, 20\}$ for CDM-2 aggregated resource |
| $P_2$ | Alt 1: 17, 18, 21, 22<br>Alt 2: 19, 20, 21, 22 | 0, 1, 2, 3 | RE locations for antenna ports $p \in \{17, 18, 21, 22\}$ for CDM-2 aggregated resource |
| $P_3$ | Alt 1, Alt 2:<br>23, 24, 25, 26 | 0, 1, 2, 3 | RE locations for antenna ports $p \in \{23, 24, 27, 28\}$ for CDM-2 aggregated resource |

RE locations for antenna ports $p \in \{25, 26, 29, 30\}$ for CDM-2 aggregated resource can be used for PDSCH RE mapping for those UEs configured with the R13 NZP CSI-RS resource TABLE 25 illustrates a method according to some embodiments of the present disclosure. The method is for constructing each group of CDM-4 REs for the 12 port mapping used for a R13 NZP CSI-RS resource. In one method, TABLE 25 is used for extended CP.

According to this method, for extended CP, a CDM group comprises 2×2 REs adjacent in time with two consecutive l numbers, and close in frequency with two k numbers whose difference is 3.

TABLE 25

CDM-4 OCC and RE mapping for 12 port mapping

| A set of CSI-RS ports for a CDM-4 RE group in a R13 NZP CSI-RS resource | CSI-RS ports for a CDM-4 RE group in a R13 NZP CSI-RS resource, p | OCC indices | RE locations |
|---|---|---|---|
| $P_1$ | 15, 16, 17, 18 | 0, 1, 2, 3 | RE locations for antenna ports $p \in \{15, 16, 17, 18\}$ for CDM-2 aggregated resource |
| $P_2$ | 19, 20, 21, 22 | 0, 1, 2, 3 | RE locations for antenna ports $p \in \{19, 20, 21, 22\}$ for CDM-2 aggregated resource |
| $P_3$ | 23, 24, 25, 26 | 0, 1, 2, 3 | RE locations for antenna ports $p \in \{23, 24, 25, 26\}$ for CDM-2 aggregated resource |

RE locations for antenna ports $p \in \{27, 28, 29, 30\}$ for CDM-2 aggregated resource can be used for PDSCH RE mapping for those UEs configured with the R13 NZP CSI-RS resource.

RE Mapping of R13 NZP CSI-RS (k',l')'s for CSI-RS RE mapping is obtained per component CSI-RS resource n, according to TABLE 3-1, and are denoted as $(k_n',l_n')$.

l indices for the antenna ports in a R13 NZP CSI-RS resource corresponding to component CSI-RS resource n are obtained according to:

$$l = l_n' + \begin{cases} l'' & \text{CSI reference signal configurations 0-19, normal cyclic prefix} \\ 2l' & \text{CSI reference signal configurations 20-31, normal cyclic prefix} \\ l'' & \text{CSI reference signal configurations 0-27, extended cyclic prefix} \end{cases} ; \text{and}$$

$l'' = 0, 1.$ k indices for the antenna ports p in a R13 NZP CSI-RS resource corresponding to component CSI-RS resource n are obtained according to:

$$k = k_n' - k'' + 12m + \begin{cases} -0 & \text{for } p \in P_1 \cup P_3 \\ -6 & \text{for } p \in P_2 \cup P_4 \end{cases}$$

$$k'' = \begin{cases} 0, 1 & \text{for normal } CP \\ 0, 3 & \text{for normal } CP \end{cases}.$$

In subframes configured for CSI reference signal transmission, the reference signal sequence $r_{l,n_s}(m)$ shall be mapped to complex-valued modulation symbols $a_{k,l}^{(p)}$ used as reference symbols on antenna port p, according to:

$$a_{k,l}^{(p)} = w_p(i) \cdot r_{l,n_s}(m')$$

where $i = 2(k'' \bmod 2) + l''$ $m = 0, 1, \ldots, N_{RB}^{DL} - 1$ $m' = m + \left\lfloor \frac{N_{RB}^{max,DL} - N_{RB}^{DL}}{2} \right\rfloor.$ OCCs to apply on the four REs $[w_p(0), w_p(1), w_p(2), w_p(3)]$ are according to the following TABLE 26:

TABLE 26

OCC mapping

| OCC index | CDM Walsh cover to apply on the four REs $[w_p(0), w_p(1), w_p(2), w_p(3)]$ |
|---|---|
| If corresponding OCC index for antenna port p is 0: | [+1 +1 +1 +1] |
| If corresponding OCC index for antenna port p is 1: | [+1 −1 +1 −1] |
| If corresponding OCC index for antenna port p is 2: | [+1 +1 −1 −1] |
| If corresponding OCC index for antenna port p is 3: | [+1 −1 −1 +1] |

Embodiment

3× or 4×(4-Port Resources)

In this embodiment, when a UE is configured with cdm2, the UE is configured to select (k',l') pairs according to TABLE 3-1, but when the UE is configured with cdm4, the UE is configured to select (k',l') according to TABLE 27, so that the corresponding 4-port REs are always 2×2 adjacent REs in time and frequency. In the revised table of TABLE 3-8, bottom rows (shaded) of the two row sections are modified.

TABLE 27

A new CSI-RS RE mapping table for 4-port mapping

| | | 4 | |
|---|---|---|---|
| | CSI-RS config | (k', l') | $n_s$ mod 2 |
| Frame structure type 1 and 2 | 0 | (9, 5) | 0 |
| | 1 | (11, 2) | 1 |
| | 2 | (9, 2) | 1 |
| | 3 | (7, 2) | 1 |
| | 4 | (9, 5) | 1 |
| | 5 | (3, 5) | 0 |
| | 6 | (5, 2) | 1 |
| | 7 | (3, 2) | 1 |
| | 8 | (1, 2) | 1 |
| | 9 | (3, 5) | 1 |

TABLE 27-continued

A new CSI-RS RE mapping table for 4-port mapping

| | | 4 | |
|---|---|---|---|
| | CSI-RS config | (k', l') | $n_s$ mod 2 |
| Frame structure type 2 only | 20 | (11, 1) | 1 |
| | 21 | (9, 1) | 1 |
| | 22 | (7, 1) | 1 |
| | 23 | (5, 1) | 1 |
| | 24 | (3, 1) | 1 |
| | 25 | (1, 1) | 1 |

(k',l')'s for CSI-RS RE mapping is obtained per component CSI-RS resource n, according to TABLE 27, and are denoted as $(k_n', l_n')$.

l indices for the antenna ports in a R13 NZP CSI-RS resource corresponding to component CSI-RS resource n are obtained according to:

$$l = l_n' + \begin{cases} l'' & \text{CSI reference signal configurations 0-19, normal cyclic prefix} \\ 2l' & \text{CSI reference signal configurations 20-31, normal cyclic prefix} \\ l'' & \text{CSI reference signal configurations 0-27, extended cyclic prefix} \end{cases} ; \text{and}$$

$$l'' = 0, 1.$$

k indices for the antenna ports p in a R13 NZP CSI-RS resource corresponding to component CSI-RS resource n are obtained according to:

$$k = k_n' - k'' + 12m$$

$$k'' = 0, 1$$

In subframes configured for CSI reference signal transmission, the reference signal sequence $r_{l,n_s}(m)$ shall be mapped to complex-valued modulation symbols $a_{k,l}^{(p)}$ used as reference symbols on antenna port p, according to:

$$a_{k,l}^{(p)} = w_p(i) \cdot r_{l,n_s}(m')$$

where $$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor.$$

OCCs to apply on the four REs $[w_p(0), w_p(1), w_p(2), w_p(3)]$ are according to TABLE 26.

For a 16-port R13 NZP CSI-RS resource, four 4-port resources are configured according to TABLE 27. For a 12-port R13 NZP CSI-RS resource, three 4-port resources are configured according to TABLE 27. The antenna port and RE mapping of the R13 NZP CSI-RS resource can be done according to TABLE 28 for 12 and 16 port cases. For 16-port CSI-RS resource, all the 4 CDM groups are used; for 12-port CSI-RS resource, only 3 CDM groups are used.

TABLE 28

CDM-4 OCC and RE mapping for 12 and 16 port mapping

| A set of CSI-RS ports for a CDM-4 RE group in a R13 NZP CSI-RS resource | Corresponding CSI-RS ports p | Corresponding OCC indices | RE locations |
|---|---|---|---|
| $P_1$ | 15, 16, 17, 18 | 0, 1, 2, 3 | RE locations for antenna ports p' ∈ {15, 16, 17, 18} for a first 4-port resource |
| $P_2$ | 19, 20, 21, 22 | 0, 1, 2, 3 | RE locations for antenna ports p' ∈ {15, 16, 17, 18} for a second 4-port resource |
| $P_3$ | 23, 24, 25, 26 | 0, 1, 2, 3 | RE locations for antenna ports p' ∈ {15, 16, 17, 18} for a third 4-port resource |
| $P_4$ | 27, 28, 29, 30 | 0, 1, 2, 3 | RE locations for antenna ports p' ∈ {15, 16, 17, 18} for a fourth 4-port resource |

For specifying CDM-4 CSI-RS RE mapping, for full flexibility, it is proposed to aggregate legacy CSI-RS resources without imposing restriction on the pool of the legacy CSI-RS resources. This may imply that some CSI-RS patterns constructed with the resource aggregation and CDM-4 do not achieve full power utilization, but achieves less power loss than the CDM-2 counterpart. In addition, to maximize the number of full-power achieving CSI-RS patterns, it is proposed that both CDM-T (in time domain only) and CDM-TF (in time and frequency domain) should be supported.

Based upon these design principles, the following combination is proposed for constructing 12- and 16-port CSI-RS resources:

12-port CSI-RS: (N,K)=(4,3), (8,2)
16-port CSI-RS: (N,K)=(4,4), (8,2).
8-port Resource Aggregation
FIG. 31 illustrates 12 or 16 port CSI-RS resource mapping 3100 with 2×(8-port legacy resources) according to embodiments of the present disclosure. The embodiment shown in FIG. 31 is for illustration only. Other embodiments could be used without departing from the scope of the present disclosure.

In some embodiments, when component legacy CSI-RS resources have 8 ports, CDM-4 is applied across the 4 REs composed of two REs on the n-th subcarrier of the first resource and two REs on the n-th subcarrier of the second resource, where n=1, 2, 3, 4 for 16-port case and n=1, 2, 3 for 12-port case. In particular, in the 12-port cases, the REs belonging to n=4 can be used for PDSCH mapping for those UEs configured with the 12-port CSI-RS. When this mapping method is used, full-power utilization is achieved with both CDM-T and CDM-TF. This proposal is illustrated in FIG. 3-4. In the figure, two legacy 8-port CSI-RS resources can be aggregated for 12- or 16-port CSI-RS mapping, and CDM-4 is applied across those REs labeled with the same alphabet, i.e., one of 'A', '13', 'C' and 'D'. For 12-port CSI-RS mapping, REs labeled with 'A', 'B' and 'C' can be used for the RE mapping.

The time frequency resources for p'∈{15,16,17,18,19,20, 21,22} are determined according to the legacy specification, for the two 8-port CSI-RS resources. Note that in this case 4 REs will be associated with each of p'∈{15,16}, p'∈{17, 18}, p'∈{19,20} and p'∈{21,22}.

Antenna ports p of the aggregated resource is related to p' according to the following:

For 16 ports: p=nN+, p'∈{15,16,17,18,19,20,21,22}, where n=0,1 and N=8
  Note that in this case four antenna ports will be associated with each of p'∈{15,16}, p'∈{17,18}, p'∈{19,20} and p'∈{21,22}.
For 12 ports: p=nN+, p'∈{15,16,17,18,19,20}, where n=0,1 and N=6.
  Note that in this case four antenna ports will be associated with each of p'∈{15,16}, p'∈{17,18}, p'∈{19,20}.

A CDM group is composed of four antenna ports and four REs corresponding to each of p'∈{15,16}, p' c{17,18}, p'∈{19,20} and p'∈{21,22} in case of 16 ports. In case of 12 ports, CSI-RS on the last CDM group associated with p'∈{21,22} will have a zero power.

The $1^{st}$ and the $2^{nd}$ REs of the CDM group correspond to the two REs from the first resource; and the $3^{rd}$ and the $4^{th}$ REs of the CDM group correspond to the two REs from the second resource.

OCCs 0, 1, 2, 3 are respectively assigned to p∈{a, a+1, a+N, a+N+1} (or p'∈{a, a+1} of the first and the second resources), where a∈{15,17,19,21} for 16 ports and a∈{15, 17,19} for 12 ports.

In subframes configured for CSI reference signal transmission, the reference signal sequence $r_{l,n_s}(m)$ shall be mapped to complex-valued modulation symbols $a_{k,l}^{(p')}$ used as reference symbols on antenna port p according to:

$$a_{k,l}^{(p)} = w_{p'}(l''') \cdot r_{l,n_s}(m')$$

where $$k = k' + 12m + \begin{cases} -0 & \text{for } p' \in \{15, 16\}, \text{ normal cyclic prefix} \\ -6 & \text{for } p' \in \{17, 18\}, \text{ normal cyclic prefix} \\ -1 & \text{for } p' \in \{19, 20\}, \text{ normal cyclic prefix} \\ -7 & \text{for } p' \in \{21, 22\}, \text{ normal cyclic prefix} \\ -0 & \text{for } p' \in \{15, 16\}, \text{ extended cyclic prefix} \\ -3 & \text{for } p' \in \{17, 18\}, \text{ extended cyclic prefix} \\ -6 & \text{for } p' \in \{19, 20\}, \text{ extended cyclic prefix} \\ -9 & \text{for } p' \in \{21, 22\}, \text{ extended cyclic prefix} \end{cases} ; \text{ and}$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

$$l = l' + \begin{cases} l'' & \text{CSI reference signal configurations 0-19, normal cyclic prefix} \\ 2l' & \text{CSI reference signal configurations 20-31, normal cyclic prefix} \\ l'' & \text{CSI reference signal configurations 0-27, extended cyclic prefix} \end{cases} ;$$

$$l'' = 0, 1$$

$$l''' = \begin{cases} l'', & \text{for the 1st resource} \\ l'' + 2, & \text{for the 2nd resource} \end{cases}$$

8-Port Resource Aggregation Alternative Embodiment

In some embodiments, when component legacy CSI-RS resources have 8 ports, CDM-4 is applied across the 4 REs corresponding to antenna ports p'∈{a, a+1, a+4, a+5}, a∈{15, 17}, of each component Rel-12 CSI-RS resource. In particular, in the 12-port cases, the REs belonging to p'∈{17, 18,21, 22} of the second component resource will have zero-power CSI-RS.

The time frequency resources for p'∈{15,16,17,18,19,20, 21,22} are determined according to the legacy specification, for the two 8-port CSI-RS resources.

Antenna ports p of the aggregated resource is related to p' according to the following:

TABLE 29

CDM-4 OCC and RE mapping

| A set of CSI-RS ports for a CDM-4 RE group in a R13 NZP CSI-RS resource | CSI-RS ports in the aggregated resource: p | Corresponding OCC indices | RE locations |
| --- | --- | --- | --- |
| $P_1$ | 15, 16, 17, 18 | 0, 1, 2, 3 | RE locations for antenna ports p' ∈ {15, 16, 19, 20} of the $1^{st}$ component resource |

TABLE 29-continued

CDM-4 OCC and RE mapping

| A set of CSI-RS ports for a CDM-4 RE group in a R13 NZP CSI-RS resource | CSI-RS ports in the aggregated resource: p | Corresponding OCC indices | RE locations |
|---|---|---|---|
| $P_2$ | 19, 20, 21, 22 | 0, 1, 2, 3 | RE locations for antenna ports p' ∈ {17, 18, 21, 22} of the $1^{st}$ component resource |
| $P_3$ | 23, 24, 25, 26 | 0, 1, 2, 3 | RE locations for antenna ports p' ∈ {15, 16, 19, 20} of the $2^{nd}$ component resource |
| $P_4$ | 27, 28, 29, 30 | 0, 1, 2, 3 | RE locations for antenna ports p' ∈ {17, 18, 21, 22} of the $1^{st}$ component resource |

In particular, for the 12-port case, CSI-RS ports 27,28, 29,30 will have zero power.

4-Port Resource Aggregation

Figure 32:
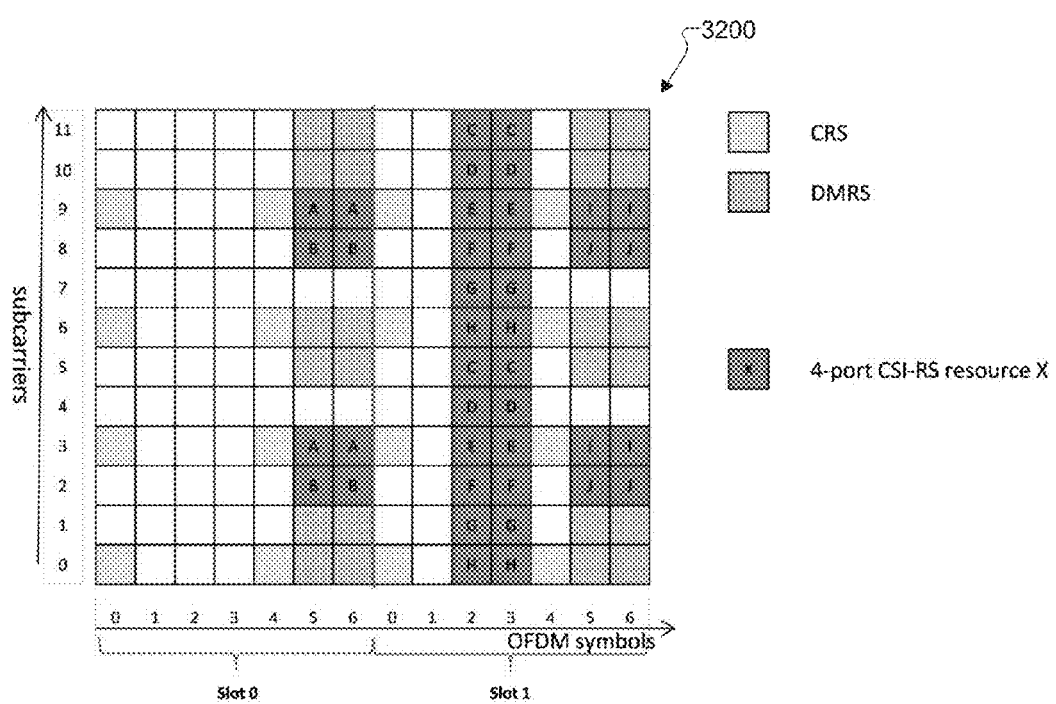
FIG. 32 illustrates 12 or 16 port CSI-RS resource mapping with aggregating 4-port legacy CSI-RS resources according to embodiments of the present disclosure.

FIG. 32 illustrates 12 or 16 port CSI-RS resource mapping 3200 with (3 or 4)×(4-port legacy resources) according to embodiments of the present disclosure.

When component legacy CSI-RS resources have four ports, CDM-4 should be applied across 4 REs corresponding to each component legacy CSI-RS resource. When this mapping method is used, full-power utilization is achieved with CDM-TF only. This proposal is illustrated in FIG. 32. In the figure, each alphabet, i.e., one of 'A', 'B', . . . , 'J', corresponds to a legacy 4-port CSI-RS resource. Three and four legacy 4-port CSI-RS resources can be aggregated respectively for 12- or 16-port CSI-RS mapping, and CDM-4 is applied across those REs labeled with the same alphabet.

Time frequency resources for the antenna port numbers p=nN+p' of the aggregated CSI-RS resource correspond to those four REs for the n-th CSI-RS resource with p'∈{15, 16,17,18}, where n∈{0,1,2,3}. Note that antenna ports p∈{a, a+1, a+2, a+3} of the aggregated CSI-RS resource will be mapped to four REs used for antenna ports p'∈{15,16,17,18} of the $1^{st}$, $2^{nd}$, $3^{rd}$ and $4^{th}$ CSI-RS resources, respectively for α=15,19,23,27.

A CDM group is composed of four antenna ports p∈{a, a+1, a+2, a+3} and the corresponding time frequency resources, for each a∈{15,19,23,27}.

The $1^{st}$ and the $2^{nd}$ REs of the CDM group correspond to the two REs for p'∈{15,16}; and the $3^{rd}$ and the $4^{th}$ REs of the CDM group correspond to the two REs for p'∈{17,18}

OCCs 0, 1, 2, 3 are respectively assigned to p=a, a+1, a+2, a+3 for each a∈{15,19,23,27}.

In one alternative, this can be captured in the following way, in which legacy 4-port resource mapping is used for each component resource.

In subframes configured for CSI reference signal transmission, the reference signal sequence $r_{l,n_s}(m)$ shall be mapped to complex-valued modulation symbols $a_{k,l}^{(p')}$ used as reference symbols on antenna port p according to:

$$a_{k,l}^{(p)} = w_{p''}(i) \cdot r_{l,n_s}(m')$$

where $$m = 0, 1, \ldots, N_{RB}^{DL} - 1$$

$$m' = m + \left\lfloor \frac{N_{RB}^{max,DL} - N_{RB}^{DL}}{2} \right\rfloor; \text{ and}$$

$$k = k' + 12m - 6k''$$

$$l = l' + \begin{cases} l'' & \begin{array}{l} CSI \text{ reference} \\ \text{signal configurations 0-19, normal cyclic prefix} \end{array} \\ 2l'' & \begin{array}{l} CSI \text{ reference} \\ \text{signal configurations 20-31, normal cyclic prefix} \end{array} \\ l'' & \begin{array}{l} CSI \text{ reference} \\ \text{signal configurations 0-27, extended cyclic prefix} \end{array} \end{cases};$$

$$l'' = 0, 1$$

$$k'' = 0, 1$$

$$i = 2k'' + l''$$

In another alternative, this can be captured with replacing $$k = \begin{cases} k' + 12m - k'' & \text{if } k' \text{ is odd} \\ k' - 5 + 12m - k'' & \text{if } k' \text{ is even} \end{cases}$$

with k=k'+12m−6k" in the above formulation. In this case, a new 4-port resource mapping is used for each component resource so that each 4-port resource comprises 2×2 time-frequency adjacent REs.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A mobile station comprising:
a receiver configured to receive a signal including a complex-valued modulation symbol $a_{k,l}^{(p')}$ from a base station;
a processor configured to extract the complex-valued modulation symbol $a_{k,l}^{(p')}$ from the signal,
wherein in response to being configured with code-division multiplex-4 (CDM-4), the complex-valued modulation symbol $a_{k,l}^{(p')}$ is mapped using a reference signal sequence $r_{l,n_s}(m$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m - \begin{cases} k'' & \text{for } p' \in \{15, 16, 19, 20\}, \text{ normal cyclic prefix, } N_{ports}^{CSI} = 8 \\ k'' + 6 & \text{for } p' \in \{17, 18, 21, 22\}, \text{ normal cyclic prefix, } N_{ports}^{CSI} = 8 \\ 6k'' & \text{for } p' \in \{15, 16, 17, 18\}, \text{ normal cyclic prefix, } N_{ports}^{CSI} = 4 \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \end{cases}$$

$l'' = 0, 1$ $k'' = 0, 1$ for normal cyclic prifix $i = 2k'' + l''$ $m = 0, 1, \ldots, N_{RB}^{DL} - 1$ $$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource, $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource, $N_{ports}^{CSI-RS}$ is 8 and the number of CSI-RS resources, $N_{res}^{CSI-RS}$ is 2.

2. The mobile station of claim 1, wherein when the total number of CSI-RS antenna ports is 12, CSI-RS antenna ports p'=15, 16, 17 and 18 are assigned with Orthogonal Covering Code (OCC) indices 0, 1, 2 and 3, respectively,
wherein the sequence $w_{p'}(i)$ is identified according to a following table:

| OCC index | [$w_{p'}(0)$ $w_{p'}(1)$ $w_{p'}(2)$ $w_{p'}(3)$] |
| --- | --- |
| 0 | [1 1 1 1] |
| 1 | [1 −1 1 −1] |
| 2 | [1 1 −1 −1] |
| 3 | [1 −1 −1 1]. |

3. The mobile station of claim 1, wherein when the total number of CSI-RS antenna ports is 16, CSI-RS antenna ports p'=15, 16, 19 and 20 are assigned with Orthogonal Covering Code (OCC) indices 0, 1, 2 and 3, respectively and CSI-RS antenna ports 17, 18, 21 and 22 are assigned with OCC indices 0, 1, 2 and 3, respectively,
wherein the sequence $w_{p'}(i)$ is identified according to a following table:

| OCC index | [$w_{p'}(0)$ $w_{p'}(1)$ $w_{p'}(2)$ $w_{p'}(3)$] |
| --- | --- |
| 0 | [1 1 1 1] |
| 1 | [1 −1 1 −1] |
| 2 | [1 1 −1 −1] |
| 3 | [1 −1 −1 1]. |

4. The mobile station of claim 1, wherein an antenna port number p is determined based on a number of the CSI-RS antenna port number p', according to $p = p' + iN_{ports}^{CSI-RS}$, where $p' \in \{15, 16, \ldots, 15 + N_{ports}^{CSI-RS} - 1\}$, wherein i=n−1 and $n \in \{1, \ldots, N_{res}^{CSI-RS}\}$.

5. A method comprising:
receiving a signal including a complex-valued modulation symbol $a_{k,l}^{(p')}$ from a base station; and
extracting the complex-valued modulation symbol $a_{k,l}^{(p')}$ from the signal,
wherein in response to being configured with code-division multiplex-4 (CDM-4), the complex-valued modulation symbol $a_{k,l}^{(p')}$ is mapped using a reference signal sequence $r_{l,n_s}(m')$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m - \begin{cases} k'' & \text{for } p' \in \{15, 16, 19, 20\}, \text{ normal cyclic prefix, } N_{ports}^{CSI} = 8 \\ k'' + 6 & \text{for } p' \in \{17, 18, 21, 22\}, \text{ normal cyclic prefix, } N_{ports}^{CSI} = 8 \\ 6k'' & \text{for } p' \in \{15, 16, 17, 18\}, \text{ normal cyclic prefix, } N_{ports}^{CSI} = 4 \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \end{cases}$$

$l'' = 0, 1$ $k'' = 0, 1$ for normal cyclic prifix $i = 2k'' + l''$ $m = 0, 1, \ldots, N_{RB}^{DL} - 1$ $$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource, $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource, $N_{ports}^{CSI-RS}$ is 8 and the number of CSI-RS resources, $N_{res}^{CSI-RS}$ is 2.

6. The method of claim 5, wherein when the total number of CSI-RS antenna ports is 12, CSI-RS antenna ports p'=15, 16, 17 and 18 are assigned with Orthogonal Covering Code (OCC) indices 0, 1, 2 and 3, respectively, wherein the sequence $w_{p'}(i)$ is identified according to a following table:

| OCC index | [$w_{p'}(0)$ $w_{p'}(1)$ $w_{p'}(2)$ $w_{p'}(3)$] |
|---|---|
| 0 | [1 1 1 1] |
| 1 | [1 −1 1 −1] |
| 2 | [1 1 −1 −1] |
| 3 | [1 −1 −1 1]. |

7. The method of claim 5, wherein when the total number of CSI-RS antenna ports is 16, CSI-RS antenna ports p'=15, 16, 19 and 20 are assigned with Orthogonal Covering Code (OCC) indices 0, 1, 2 and 3, respectively and CSI-RS antenna ports p'=17, 18, 21 and 22 are assigned with OCC indices 0, 1, 2 and 3, respectively, wherein the sequence $w_{p'}(i)$ is identified according to a following table:

| OCC index | [$w_{p'}(0)$ $w_{p'}(1)$ $w_{p'}(2)$ $w_{p'}(3)$] |
|---|---|
| 0 | [1 1 1 1] |
| 1 | [1 −1 1 −1] |
| 2 | [1 1 −1 −1] |
| 3 | [1 −1 −1 1]. |

8. The method of claim 5, wherein antenna port number p is determined based on a number of CSI-RS antenna port number p', according to $p=p'+iN_{ports}^{CSI-RS}$, where $p' \in \{15, 16, \ldots, 15+N_{ports}^{CSI-RS}-1\}$, wherein i=n−1 and $n \in \{1, \ldots, N_{res}^{CSI-RS}\}$.

9. A base station comprising:

a processor configured to:

generate a reference signal sequence for a plurality of subcarriers and OFDM symbols; and in response to being configured with code-division multiplex-4 (CDM-4), map a reference signal sequence $r_{l,n_s}(m')$ to a complex-valued modulation symbol $a_{k,l}^{(p')}$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m - \begin{cases} k'' & \text{for } p' \in \{15, 16, 19, 20\}, \text{ normal cyclic prefix}, N_{ports}^{CSI} = 8 \\ k'' + 6 & \text{for } p' \in \{17, 18, 21, 22\}, \text{ normal cyclic prefix}, N_{ports}^{CSI} = 8 \\ 6k'' & \text{for } p' \in \{15, 16, 17, 18\}, \text{ normal cyclic prefix}, N_{ports}^{CSI} = 4 \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \end{cases}$$

$l'' = 0, 1$ $k'' = 0, 1$ for normal cyclic prifix $i = 2k'' + l''$ $m = 0, 1, \ldots, N_{RB}^{DL} - 1$ $$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total ports number of antenna ports is 12, a number of CSI-RS antenna ports per resource, $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource, $N_{ports}^{CSI-RS}$ is 8 and the number of CSI-RS resources, $N_{REs}^{CSI-RS}$ is 2.

10. The base station of claim 9, wherein when the total number of CSI-RS antenna ports is 12, CSI-RS antenna ports p'=15, 16, 17 and 18 are assigned with Orthogonal Covering Code (OCC) indices 0, 1, 2 and 3, respectively, wherein the sequence $w_{p'}(i)$ is identified according to a following table:

| OCC index | [$w_{p'}(0)$ $w_{p'}(1)$ $w_{p'}(2)$ $w_{p'}(3)$] |
|---|---|
| 0 | [1 1 1 1] |
| 1 | [1 −1 1 −1] |
| 2 | [1 1 −1 −1] |
| 3 | [1 −1 −1 1]. |

11. The base station of claim 9, wherein when the total number of CSI-RS antenna ports is 16, CSI-RS antenna ports p'=15, 16, 19 and 20 are assigned with Orthogonal Covering Code (OCC) indices 0, 1, 2 and 3, respectively and CSI-RS antenna ports p'=17, 18, 21 and 22 are assigned with OCC indices 0, 1, 2 and 3, respectively, wherein the sequence $w_{p'}(i)$ is identified according to a following table:

| OCC index | [$w_{p'}(0)$ $w_{p'}(1)$ $w_{p'}(2)$ $w_{p'}(3)$] |
|---|---|
| 0 | [1 1 1 1] |
| 1 | [1 −1 1 −1] |
| 2 | [1 1 −1 −1] |
| 3 | [1 −1 −1 1]. |

12. The base station of claim 9, wherein antenna port number p is determined based on a number of CSI-RS antenna port number p', according to $p=p'+iN_{ports}^{CSI-RS}$, where $p' \in \{15, 16, \ldots, 15+N_{ports}^{CSI-RS}-1\}$, wherein $i=n-1$ and $n \in \{1, \ldots, N_{res}^{CSI-RS}\}$.

13. A method comprising:
generating a reference signal sequence for a plurality of subcarriers and OFDM symbols; and
in response to being configured with code-division multiplex-4 (CDM-4), mapping a reference signal sequence $r_{l,n_s}(m')$ to a complex-valued modulation symbol $a_{k,l}^{(p')}$ according to:

$$a_{k,l}^{(p')} = w_{p'}(i) \cdot r_{l,n_s}(m')$$

where p' is a CSI-RS antenna port number per CSI-RS resource and $w_{p'}(i)$ is a sequence to apply on resource elements, and $$k = k' + 12m -$$

$$\begin{cases} k'' & \text{for } p' \in \{15, 16, 19, 20\}, \text{ normal cyclic prefix}, N_{ports}^{CSI} = 8 \\ k'' + 6 & \text{for } p' \in \{17, 18, 21, 22\}, \text{ normal cyclic prefix}, N_{ports}^{CSI} = 8 \\ 6k'' & \text{for } p' \in \{15, 16, 17, 18\}, \text{ normal cyclic prefix}, N_{ports}^{CSI} = 4 \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \end{cases}$$

$$l'' = 0, 1$$

$$k'' = 0, 1 \text{ for normal cyclic prifix}$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor,$$

wherein $N_{ports}^{CSI}$ is a number of CSI-RS antenna ports per resource, wherein when a total number of antenna ports is 12, a number of CSI-RS antenna ports per resource, $N_{ports}^{CSI-RS}$ is 4 and number of CSI-RS resources, $N_{res}^{CSI-RS}$ is 3, and when the total number of CSI-RS antenna ports is 16, the number of CSI-RS antenna ports per resource, $N_{ports}^{CSI-RS}$ is 8 and the number of CSI-RS resources, $N_{res}^{CSI-RS}$ is 2.

14. The method of claim 13, wherein when the total number of CSI-RS antenna ports is 12, CSI-RS antenna ports p'=15, 16, 17 and 18 are assigned with Orthogonal Covering Code (OCC) indices 0, 1, 2 and 3, respectively,
wherein the sequence $w_{p'}(i)$ is identified according to a following table:

| OCC index | $[w_{p'}(0)\ w_{p'}(1)\ w_{p'}(2)\ w_{p'}(3)]$ |
|---|---|
| 0 | [1 1 1 1] |
| 1 | [1 −1 1 −1] |
| 2 | [1 1 −1 −1] |
| 3 | [1 −1 −1 1]. |

15. The method of claim 13, wherein when the total number of CSI-RS antenna ports is 16, CSI-RS antenna ports p'=15, 16, 19 and 20 are assigned with Orthogonal Covering Code (OCC) indices 0, 1, 2 and 3, respectively and CSI-RS antenna ports p'=17, 18, 21 and 22 are assigned with OCC indices 0, 1, 2 and 3, respectively,
wherein the sequence $w_{p'}(i)$ is identified according to a following table:

| OCC index | $[w_{p'}(0)\ w_{p'}(1)\ w_{p'}(2)\ w_{p'}(3)]$ |
|---|---|
| 0 | [1 1 1 1] |
| 1 | [1 −1 1 −1] |
| 2 | [1 1 −1 −1] |
| 3 | [1 −1 −1 1]. |

16. The method of claim 13, wherein antenna port number p is determined based on a number of CSI-RS antenna port number p', according to $p=p'+iN_{ports}^{CSI-RS}$, where $p' \in \{15, 16, \ldots, 15+N_{ports}^{CSI-RS}-1\}$, wherein $i=n-1$ and $n \in \{1, \ldots, N_{res}^{CSI-RS}\}$.

* * * * *